US008458052B2

(12) United States Patent
Libman

(10) Patent No.: US 8,458,052 B2
(45) Date of Patent: *Jun. 4, 2013

(54) SYSTEM AND METHOD FOR AUTOMATED GENERATION OF COMMUNICATIONS INVOLVING PRODUCTS OR SERVICES

(75) Inventor: Richard Marc Libman, Scottsdale, AZ (US)

(73) Assignee: Phoenix Licensing, LLC, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/191,428

(22) Filed: Jul. 26, 2011

(65) Prior Publication Data

US 2011/0282737 A1 Nov. 17, 2011

Related U.S. Application Data

(60) Division of application No. 11/737,735, filed on Apr. 19, 2007, now Pat. No. 7,991,649, which is a continuation of application No. 11/182,386, filed on Jul. 15, 2005, now Pat. No. 8,234,184, which is a continuation of application No. 09/354,802, filed on Jul. 16, 1999, now Pat. No. 6,999,938, which is a continuation of application No. 08/834,240, filed on Apr. 15, 1997, now Pat. No. 6,076,072, which is a continuation of application No. 08/661,004, filed on Jun. 10, 1996, now Pat. No. 5,987,434.

(51) Int. Cl.
*G06Q 30/00* (2012.01)

(52) U.S. Cl.
USPC ..... 705/26.7; 705/14.4; 705/14.49; 705/26.1; 705/36 R

(58) Field of Classification Search
USPC . 705/14.4, 14.49, 14.52–14.53, 14.66–14.67, 705/26.1–27.2, 36 R
See application file for complete search history.

(56) References Cited

U.S. PATENT DOCUMENTS 4,088,981 A 5/1978 Gott
4,121,818 A 10/1978 Riley
(Continued)

FOREIGN PATENT DOCUMENTS

AU 55282/94 9/1994
CA 2 282 873 3/2001
(Continued)

OTHER PUBLICATIONS

ANB-AMRO, ABN-AMRO Mortgage Acceleration Offer Letter, 2 pages, dated Jul. 29, 2002, earliest date for letters/process of this type unknown but possibly early 1990's (unconfirmed).

(Continued)

*Primary Examiner* — William Allen
(74) *Attorney, Agent, or Firm* — Berry & Associates P.C.

(57) ABSTRACT

A system for automatically preparing customized replies in response to communications from a plurality of clients. To facilitate automation and tracking, each original communication to the client (or each original response from the client) is tagged with a unique label, and replies to client responses are each correspondingly labeled. The system provides individualized replies to each of a variety of response options that a client might exercise in response to a received communication, whether an original communication or a reply to a previous response. The system is applicable to mass marketing communications, and is particularly well suited to the generation of personalized replies to each and every one of a multitude (tens of thousands and up to millions) of communications from clients. The system is also capable of continuing to generate replies to follow-up responses from clients and to thereby maintain an ongoing "conversation" until the client makes a purchase decision, or no longer responds. Communications may be delivered through a variety of means, such as the internet, the mails, by facsimile, on a host communication, etc.

20 Claims, 29 Drawing Sheets

U.S. PATENT DOCUMENTS

| | | |
|---|---|---|
| 4,221,086 A | 9/1980 | Berman |
| 4,237,799 A | 12/1980 | Berman |
| 4,484,304 A | 11/1984 | Anderson |
| 4,567,359 A | 1/1986 | Lockwood .................... 235/381 |
| 4,751,640 A | 6/1988 | Lucas et al. |
| 4,752,675 A | 6/1988 | Zetmeir |
| 4,817,129 A | 3/1989 | Riskin |
| 4,831,526 A | 5/1989 | Luchs et al. |
| 4,866,756 A | 9/1989 | Crane |
| 4,876,648 A | 10/1989 | Lloyd |
| 4,908,761 A | 3/1990 | Tai |
| 4,953,085 A | 8/1990 | Atkins |
| 5,039,075 A | 8/1991 | Mayer ............................ 270/1.1 |
| 5,068,797 A | 11/1991 | Sansone et al. |
| 5,079,714 A | 1/1992 | Manduley |
| 5,099,422 A | 3/1992 | Foresman |
| 5,124,911 A | 6/1992 | Sack |
| 5,201,010 A | 4/1993 | Deaton |
| 5,220,501 A | 6/1993 | Lawlor et al. |
| 5,231,571 A | 7/1993 | D'Agostino |
| 5,245,535 A | 9/1993 | Weiss et al. |
| 5,305,196 A | 4/1994 | Deaton |
| 5,309,355 A | 5/1994 | Lockwood |
| 5,319,542 A | 6/1994 | King, Jr. et al. |
| 5,321,604 A | 6/1994 | Peach et al. |
| 5,325,303 A | 6/1994 | Walz |
| 5,347,632 A | 9/1994 | Filepp |
| 5,366,146 A | 11/1994 | Haan |
| 5,388,165 A | 2/1995 | Deaton et al. ..................... 382/7 |
| 5,446,653 A | 8/1995 | Miller et al. |
| 5,446,891 A | 8/1995 | Kaplan et al. |
| 5,446,919 A | 8/1995 | Wilkins |
| 5,448,471 A | 9/1995 | Deaton et al. |
| 5,452,203 A | 9/1995 | Moore |
| 5,453,601 A | 9/1995 | Rosen |
| 5,455,407 A | 10/1995 | Rosen |
| 5,459,306 A | 10/1995 | Stein |
| 5,483,445 A | 1/1996 | Pickering |
| 5,493,490 A | 2/1996 | Johnson |
| 5,502,636 A | 3/1996 | Clarke |
| 5,504,675 A | 4/1996 | Cragun et al. |
| 5,508,731 A | 4/1996 | Kohorn |
| 5,523,942 A | 6/1996 | Tyler et al. |
| 5,537,314 A | 7/1996 | Kanter |
| 5,550,746 A | 8/1996 | Jacobs |
| 5,552,982 A | 9/1996 | Jackson |
| 5,557,518 A | 9/1996 | Rosen |
| 5,559,867 A | 9/1996 | Langsenkamp et al. |
| 5,576,951 A | 11/1996 | Lockwood .................... 395/227 |
| 5,583,763 A | 12/1996 | Atcheson et al. |
| 5,592,375 A | 1/1997 | Salmon et al. |
| 5,612,527 A | 3/1997 | Ovadia |
| 5,619,558 A | 4/1997 | Jheeta ............................ 379/90 |
| 5,621,797 A | 4/1997 | Rosen |
| 5,623,403 A | 4/1997 | Highbloom |
| 5,640,835 A | 6/1997 | Muscoplat |
| 5,642,419 A | 6/1997 | Rosen |
| 5,642,485 A | 6/1997 | Deaton |
| 5,644,727 A | 7/1997 | Atkins |
| 5,651,280 A | 7/1997 | Park |
| 5,655,085 A | 8/1997 | Ryan et al. |
| 5,659,165 A | 8/1997 | Jennings et al. |
| 5,659,731 A | 8/1997 | Gustafson |
| 5,661,516 A | 8/1997 | Carles |
| 5,671,280 A | 9/1997 | Rosen |
| 5,671,282 A | 9/1997 | Wolff et al. |
| 5,673,402 A | 9/1997 | Ryan et al. |
| 5,687,322 A | 11/1997 | Deaton |
| 5,699,527 A | 12/1997 | Davidson |
| 5,703,949 A | 12/1997 | Rosen |
| 5,704,017 A | 12/1997 | Heckerman |
| 5,710,889 A | 1/1998 | Clark et al. |
| 5,721,831 A | 2/1998 | Waits et al. |
| 5,724,521 A | 3/1998 | Dedrick ........................ 395/226 |
| 5,732,400 A | 3/1998 | Mandler et al. |
| 5,740,549 A | 4/1998 | Reilly et al. |
| 5,745,882 A | 4/1998 | Bixler |
| 5,745,886 A | 4/1998 | Rosen |
| 5,754,938 A | 5/1998 | Herz |
| 5,758,328 A | 5/1998 | Giovannoli |
| 5,758,331 A | 5/1998 | Johnson |
| 5,761,650 A | 6/1998 | Munsil et al. |
| 5,768,142 A | 6/1998 | Jacobs |
| 5,774,553 A | 6/1998 | Rosen |
| 5,774,868 A | 6/1998 | Cragun et al. |
| 5,787,403 A | 7/1998 | Randle |
| 5,793,497 A | 8/1998 | Funk |
| 5,793,972 A | 8/1998 | Shane |
| 5,794,210 A | 8/1998 | Goldhaber |
| 5,794,218 A | 8/1998 | Jennings et al. |
| 5,797,133 A | 8/1998 | Jones |
| 5,799,087 A | 8/1998 | Rosen |
| 5,802,493 A | 9/1998 | Sheflott |
| 5,806,057 A | 9/1998 | Gormley et al. .................. 707/1 |
| 5,809,242 A | 9/1998 | Shaw et al. |
| 5,812,647 A | 9/1998 | Beaumont et al. |
| 5,819,241 A | 10/1998 | Reiter |
| 5,819,263 A | 10/1998 | Bromley et al. |
| 5,822,735 A | 10/1998 | De Lapa et al. |
| 5,825,856 A | 10/1998 | Porter et al. |
| 5,844,971 A | 12/1998 | Elias et al. |
| 5,845,302 A | 12/1998 | Cyman |
| 5,852,811 A | 12/1998 | Atkins |
| 5,857,175 A | 1/1999 | Day |
| 5,866,889 A | 2/1999 | Weiss et al. |
| 5,873,068 A | 2/1999 | Beaumont et al. |
| 5,878,139 A | 3/1999 | Rosen |
| 5,878,403 A | 3/1999 | DeFrancesco |
| 5,890,140 A | 3/1999 | Clark et al. |
| 5,893,075 A | 4/1999 | Plainfield et al. |
| 5,895,468 A | 4/1999 | Whitmyer |
| 5,898,154 A | 4/1999 | Rosen |
| 5,907,800 A | 5/1999 | Johnson |
| 5,913,202 A | 6/1999 | Motoyama |
| 5,920,629 A | 7/1999 | Rosen |
| 5,926,800 A | 7/1999 | Baronowski |
| 5,930,764 A | 7/1999 | Melchione et al. |
| 5,933,811 A | 8/1999 | Angles |
| 5,953,423 A | 9/1999 | Rosen |
| 5,956,693 A | 9/1999 | Geerlings |
| 5,963,648 A | 10/1999 | Rosen |
| 5,963,968 A | 10/1999 | Warmus et al. |
| 5,966,695 A | 10/1999 | Melchione et al. |
| 5,970,469 A | 10/1999 | Scroggie |
| 5,974,396 A | 10/1999 | Anderson et al. ................ 705/10 |
| 5,978,485 A | 11/1999 | Rosen |
| 5,987,434 A | 11/1999 | Libman |
| 5,987,480 A | 11/1999 | Donohue |
| 5,991,737 A | 11/1999 | Chen |
| 5,995,943 A | 11/1999 | Bull |
| 5,999,908 A | 12/1999 | Abelow |
| 6,002,394 A | 12/1999 | Schein et al. |
| 6,009,410 A | 12/1999 | LeMole |
| 6,012,047 A | 1/2000 | Mazonas |
| 6,014,645 A | 1/2000 | Cunningham |
| 6,018,721 A | 1/2000 | Aziz et al. |
| 6,018,761 A | 1/2000 | Uomi |
| 6,021,397 A | 2/2000 | Jones |
| 6,026,368 A | 2/2000 | Brown et al. |
| 6,026,370 A | 2/2000 | Jermyn ........................... 705/14 |
| 6,029,141 A | 2/2000 | Bezos |
| 6,029,153 A | 2/2000 | Bauchner et al. |
| 6,047,067 A | 4/2000 | Rosen |
| 6,047,887 A | 4/2000 | Rosen |
| 6,049,782 A | 4/2000 | Gottesman et al. |
| 6,055,510 A | 4/2000 | Henrick |
| 6,055,513 A | 4/2000 | Katz et al. |
| 6,055,573 A | 4/2000 | Gardenswartz |
| 6,058,378 A | 5/2000 | Clark et al. |
| 6,064,969 A | 5/2000 | Haskins |
| 6,067,522 A | 5/2000 | Warady |
| 6,067,525 A | 5/2000 | Johnson |
| 6,076,068 A | 6/2000 | De Lapa et al. |
| 6,076,072 A | 6/2000 | Libman |
| 6,088,686 A | 7/2000 | Walker et al. |
| 6,101,485 A | 8/2000 | Fortenberry |
| 6,119,098 A | 9/2000 | Guyot |

| | | | |
|---|---|---|---|
| 6,122,190 | A | 9/2000 | Ooishi et al. |
| 6,122,625 | A | 9/2000 | Rosen |
| 6,131,810 | A | 10/2000 | Weiss et al. |
| 6,134,532 | A | 10/2000 | Lazarus |
| 6,138,139 | A | 10/2000 | Beck |
| 6,141,666 | A | 10/2000 | Tobin |
| 6,154,527 | A | 11/2000 | Porter et al. |
| 6,175,921 | B1 | 1/2001 | Rosen |
| 6,182,050 | B1 | 1/2001 | Ballard |
| 6,188,993 | B1 | 2/2001 | Eng et al. |
| 6,205,436 | B1 | 3/2001 | Rosen |
| 6,226,623 | B1 | 5/2001 | Schein et al. |
| 6,233,564 | B1 | 5/2001 | Schulze et al. |
| 6,236,975 | B1 | 5/2001 | Boe et al. |
| 6,236,978 | B1 | 5/2001 | Tuzhilin |
| 6,246,996 | B1 | 6/2001 | Stein |
| 6,249,790 | B1 | 6/2001 | Babcock, Jr. |
| 6,272,528 | B1 | 8/2001 | Cullen et al. |
| 6,324,524 | B1 | 11/2001 | Lent et al. |
| 6,327,599 | B1 | 12/2001 | Warmus et al. ............... 707/517 |
| 6,327,754 | B1 | 12/2001 | Belmont |
| 6,330,543 | B1 | 12/2001 | Kepecs |
| 6,332,154 | B2 | 12/2001 | Beck |
| 6,336,095 | B1 | 1/2002 | Rosen |
| 6,349,290 | B1 | 2/2002 | Horowitz et al. |
| 6,354,490 | B1 | 3/2002 | Weiss et al. |
| 6,360,254 | B1 | 3/2002 | Linden |
| 6,385,592 | B1 | 5/2002 | Angles et al. |
| 6,385,594 | B1 | 5/2002 | Lebda |
| 6,397,212 | B1 | 5/2002 | Biffar |
| 6,411,686 | B1 | 6/2002 | Porter et al. |
| 6,411,947 | B1 | 6/2002 | Rice |
| 6,449,635 | B1 | 9/2002 | Tilden |
| 6,453,302 | B1 | 9/2002 | Johnson et al. |
| 6,463,418 | B1 | 10/2002 | Todd |
| 6,470,156 | B1 | 10/2002 | Sahay |
| 6,513,019 | B2 | 1/2003 | Lewis |
| 6,604,080 | B1 | 8/2003 | Kern |
| 6,606,602 | B1 | 8/2003 | Kolls |
| 6,611,811 | B1 | 8/2003 | Deaton et al. |
| 6,684,189 | B1 | 1/2004 | Ryan |
| 6,915,271 | B1 | 7/2005 | Meyer et al. |
| 6,925,441 | B1 | 8/2005 | Jones |
| 6,999,938 | B1 | 2/2006 | Libman |
| 7,072,849 | B1 | 7/2006 | Filepp et al. |
| 7,110,981 | B1 | 9/2006 | Sidikman |
| 7,222,078 | B2 | 5/2007 | Abelow |
| 7,319,970 | B1 | 1/2008 | Simone |
| 7,711,599 | B1 | 5/2010 | Libman |
| 8,041,604 | B1 | 10/2011 | Glaser |
| 2001/0013011 | A1 | 8/2001 | Day |
| 2001/0014868 | A1 | 8/2001 | Herz |
| 2002/0026349 | A1 | 2/2002 | Reilly |
| 2002/0026351 | A1 | 2/2002 | Coleman |
| 2003/0135853 | A1 | 7/2003 | Goldman et al. |
| 2003/0216965 | A1 | 11/2003 | Libman |
| 2004/0030626 | A1 | 2/2004 | Libman |
| 2004/0039588 | A1 | 2/2004 | Libman |
| 2005/0154658 | A1 | 7/2005 | Bove |
| 2006/0004642 | A1 | 1/2006 | Libman |
| 2008/0120240 | A1 | 5/2008 | Ginter |

FOREIGN PATENT DOCUMENTS

| | | |
|---|---|---|
| CA | 2 590 237 | 3/2001 |
| EP | 0 354 260 A1 | 2/1990 |
| EP | 0 572 281 A1 | 12/1993 |
| EP | 0661654 A2 | 7/1995 |
| EP | 1 071 030 A1 | 1/2001 |
| WO | WO 90/11587 | 10/1990 |
| WO | WO 94/23383 | 10/1994 |
| WO | WO 97/15023 | 4/1997 |
| WO | WO 97/34246 | 9/1997 |
| WO | WO 98/02835 | 1/1998 |
| WO | WO 99/12115 | 3/1999 |
| WO | WO 99/22328 | 5/1999 |
| WO | WO 99/33012 | 7/1999 |

OTHER PUBLICATIONS

Agenda for Windows, "Agenda for Windows" "Marketing and Sales Campaigns" Software Brochure from Agenda Corporation, Nov. 1995.

Applied Systems, "Agency Manager for Windows" Software Brochure from Applied Systems, Inc., Los Angeles, CA, 1994.

Robert A. Shevlin, Senior VP, Alliance Mortgage Company Equity Accelerator™ Solicitation Letter with attachments, 3 pages (dated Mar. 10, 1994).

Statement, American Airlines Advantage Program Statement, Dec. 8, 1998.

NPR Newswire, American Express Acquires License for Bank One's Triumph Card Processing Software, PR Newswire Association, Inc., 2 pages (Feb. 6, 1995).

Solicitation, American Savings Bank Solicitation, about Feb. 1995.

James T. Szymanski, America's Mortgage Servicing, Inc., Unemployment insurance, Mar. 6, 1992, 4 pages. Servicing, Inc.—Letter.

Monthly statement, AT&T Account Statement, Jan. 1997.

Solicitation, AT&T Universal Gold MasterCard, Apr. 1993, 8 pages.

Solicitation, AT&T Universal MasterCard, Apr. 1993, 8 pages.

Solicitation, Colonial Penn Life, 1Q91 GBL Birthday Results as of Dec. 27, 1991, 1 page.

Solicitation, Colonial Penn Life, 1Q91 Lifechoice Birthday Results as of Dec. 27, 1991, 1 page.

Solicitation, Colonial Penn Life, 1Q91 Doc. Ref. A09 Lifechoice Birthday Results as of Dec. 27, 1991, 1 page.

Solicitation, Colonial Penn Life, 2Q91 GBL Birthday Results as of Dec. 27, 1991, 1 page. Colonial Penn Life, 2Q91 Lifechoice Birthday Results as of Dec. 27, 1991, 1 page.

Solicitation, Colonial Penn Life "Happy Birthday" letter, internal date of Apr. 15, 1993, 2 pages.

Solicitation, Colonial Penn Life, "Life Advertising 1986." 1 page.

Solicitation, Colonial Penn Life, Memorandum, "4Q90 GBL Birthday Campaign—Input Document," May 8, 1990, 8 pages.

Consumers Choice, Consumer's Choice Financial Services Company Quote, Nov. 28, 1995.

Solicitation, CUNA Life Insurance Solicitation, date unknown. American Savings Bank Solicitation, about Feb. 1995. (Sic "CONA").

Berry, J. et al., "Database Marketing: A Potent New Tool for Selling," Business Week, pp. 56-62 (Sep. 5, 1994).

Solicitation, David T. Philips & Co. Insurance Solicitation, Nov. 17, 1995.

Dottie Enrico, Enrico, D. "Dollars and Dialers: Phone Company's plan to sell names stirs controversy", Newsday v50 n279 s1, p. 3, Jun. 11, 1990.

Applied Systems, Electronic Image Management—EIM, Brochure from Applied Systems, 6 pages (Jan. 1996).

Solicitation, Equigaurd Insurance Services, Inc. Solicitation, Nov. 1995.

Goldstein, S., "FirstMerit Offers Customized Insurance Quotes With Checking Statements." Bank Investment Product News, vol. 111, No. 15, Institutional Investor, Inc., 1 Page (Apr. 21, 1997).

Lauer, G., "FirstMerit: Using Technology to Personalize Mass Market Life Insurance," Bank Insurance Marketing, vol. 6, No. 3, 2 pages (summer 1997).

Ford Citibank Invoice, Ford Citibank MasterCard billing statements, Feb. 1995, 2 pages.

Solicitation, Globe Life and Accident Insurance Co. Solicitation, Jul. 21, 1995.

Institutional Telemarketing Services, Institutional Telemarketing Services, Insurance Service Incorporated Brochure, 2 Pages (Date believed to be 1986 or 1987).

Solicitation, IQ InsuranceQuote Services, Inc. Solicitation, Jul. 12, 1995.

Solicitation, Jackson National Life Insurance Co. Solicitation, Jul. 21, 1995.

Key Money, KeyMoney Access Account Statement, 2 pages (Jan. 27, 1997).

Richard Libman, Newco™ News, Richard Libman, I.C.A. Insurance Marketing, Inc., 2 Pages (Jun. 1996).

Solicitation, Premiumatic Plan Life Insurance Solicitation, United Services Life Insurance Company, 4 pages, Aug. 1992.
Foley, John, "Market of one: Ready Aim Sell," Information Week, pp. 34-36, 40, 42, and 44 (Feb. 17, 1997).
Todd R. Ewing (Customer Service Rep.), SelectQuote Insurances Services Letter and Attachments, SelectQuote Insurance Services of San Francisco, California, 4 pages (Jul. 5, 1995).
Todd R. Ewing (Customer Service Rep.), SelectQuote Insurances Services Letter and Insurance Application, SelectQuote Insurance Services of San Francisco, California, 7 pages (Jun. 27, 1995).
Charan J. Singh, SelectQuote Insurances Services Letter and Quote, SelectQuote Insurance Services of San Francisco, California, 8 pages (Jun. 12, 1995).
Sommers/Moreland, Sommers/Moreland & Associates, Inc. Letter and Quote, Sommers/Moreland & Associates, Inc., Atlanta, Georgia, 11 pages (Jul. 8, 1995).
Solicitation, Stanfed Financial Services, Inc., "Biweekly Advantage Plan," home mortgage payment acceleration, Jul. 30, 1993, 6 pages.
Solicitation, Teacher's Insurance and Annuity Association Solicitation, about Nov. 1994.
Solicitation, TermQuote Life Insurance Solicitation, date unknown.
Friedman, A.S., "Turnkey Selling Shifts Away From Quoting," National Underwriter, vol. 101, No. 46, National Underwriter Company, 1 Page (Nov. 17, 1997).
USAA, Credit Card Statement Attachment, 1997.
US Life Invoice, US Life All American Insurance Co. Account Statement, 1 page (appears to be before Jan. 15, 1997).
Larmer, F.L., "Virtual Agent Custom Markets Bank Insurance"—Article, Future Banker, Nov. 1997(original) reprinted in National Underwriter Apr. 13, 1998.
Larmer, F.L., "Virtual Agent Maximizes Small Bank Reach," National Underwriter, National Underwriter Company, p. 17 (Apr. 13, 1998).
Solicitation, Wells Fargo Insurance Services Letter and Sales Literature, Wells Fargo Insurance Services, Brisbane, CA, date unknown.
Wells Fargo Invoice, Wells Fargo Proven Credit Visa Gold Account Statement, 4 pages (Jan. 8, 1997).
Business Week, "Click Here for Coverage," Business Week (describing online shopping for insurance), Jun. 1, 1998.
WebMaster Magazine, "Driving Forces," World Wide Web Winners, WebMaster Magazine (describing Progressive Web site), Aug. 1997.
Burch, Bill, "Companies turn to Internet server management firms," Network World (describing internet server outsourcing), Sep. 26, 1994.
Ellsworth, Jill H., "Staking a claim on the Internet," Nation's Business (small paragraph on p. 30 describing SDG Insurance Agency use of on-line forms), Jan. 1996.
Strazewski, Len, "Pioneers on the Web frontier," Rough Notes (describing agency insurance companies going online), May 1996.
Doucette, Nancy, "Aetna's newest location—on the Internet," Rough Notes (describing Aetna Life's electronic storefront), Nov. 1995.
Business Wire, "PC Quote partners in world's first virtual conference," Business Wire (describing stock quoting service), Apr. 22, 1996.
Business Wire, "Quicken InsureMarket to Debut With Major Carriers as Partners," Business Wire (describing Inuit partnering with insurance companies), Jun. 11, 1996.
Loeffler, L., "Computer helps marketers romance business clients," Marketing News, American Marketing Association, Chicago, IL, US, vol. 22, No. 6, Mar. 14, 1988, pp. 8-9.
Pitchon, J., "Using the computer to convert advertising enquiries into sales" Best's Review. Property—Casualty Insurance Edition, A.M. Best, US, vol. 83, No. 10, Feb. 1983, pp. 62, 64.
Alpeter V.R., "Market Fax: Computerized Support for Sales and Marketing," Small Business Computers, vol. 7, No. 3, May 1983, pp. 51-53.
Seller and Gray, "A Survey of Database Marketing," Graduate School of Management and Department of Information and Computer Science, University of California, Mar. 1999, pp. 1-45.
Pearson, S., "A Lasting Relationship (Databases in Direct Marketing)" Marketing, Haymarket Publishing, London, GB, vol. 25, No. 8, May 22, 1986, pp. 49-50, 52.

Drennan, Seybold Report, "Variable-Data Printing Comes of Age: Capabilities & Market Demand Coverage," Seybold Report on Publishing Systems, Media, PA, US, vol. 27, No. 2, Sep. 15, 1997, pp. 3-24.
Oppenheimer, N., "Hand-in-Hand Profit for Marketing and Data Processing," Direct Marketing, Hoke Communications, Garden City, NY, US, vol. 48, No. 6, Oct. 1985, pp. 60, 62, 65, 92, 137, 166-167.
Holtman, A. et al., Excerpts from "The New Age of Financial Services Marketing, A Hands-on Applications Guide to Harnessing the Power of Database Marketing," Financial Sourcebooks, Naperville, Illinois, 1992, 59 pages.
Nash, E., Excerpts from "Database Marketing, The Ultimate Marketing Tool," McGraw-Hill, Inc., 1993, 65 pages.
Morrall, K., Customize Your Cross-sell.
Webster's Collegiate Dictionary, Tenth Edition, p. 823.
Summons in *Direct Response Corporation, Response Worldwide Insurance Company, and Warner Insurance Company v. LPL Licensing, LLC, and Phoenix Licensing, LLC*, Civil Action No. 2:08-cv-00001-HRG, filed Jan. 3, 2008 in United States District Court, District of Arizona.
Complaint in *Direct Response Corporation, Response Worldwide Insurance Company, and Warner Insurance Company v. LPL Licensing, LLC, and Phoenix Licensing, LLC*, Civil Action No. 2:08-cv-00001-HRH, filed Jan. 3, 2008 in United States District Court, District of Arizona.
Corporate Disclosure Statement for *Direct Response Corporation, Response Worldwide Insurance Company, and Warner Insurance Company v. LPL Licensing, LLC, and Phoenix Licensing, LLC*, Civil Action No. 2:08-cv-00001-HRH, filed Jan. 3, 2008 in United States District Court, District of Arizona.
Complaint in *State Farm Mutual Automobile Insurance Company v. LPL Licensing LLC and Phoenix Licensing LLC*, Civil Action No. 2:2007cv01329, filed Jul. 10, 2007 in United States District Court, District of Arizona.
Complaint in *State Farm Bank, F.S.B. v. LPL Licensing, LLC and Phoenix Licensing, LLC*, Civil Action No. 2:2007cv01895, filed Oct. 4, 2007, in United States District Court, District of Arizona.
Complaint in *United Services Automobile Association (USAA) v. LPL Licensing LLC and Phoenix Licensing LLC*, Civil Action No. 2:07-cv-01968-FJM, filed Oct. 12, 2007, in United States District Court, District of Arizona.
Complaint in *Citicorp Credit Services Inc. v. LPL Licensing, LLC and Phoenix Licensing, LLC*, Civil Action No. 1:2007cv00649, filed Oct. 17, 2007, in United States District Court, District of Delaware.
Complaint in *Discover Products, Inc. v. LPL Licensing, LLC and Phoenix Licensing, LLC*, Civil Action No. 1:2007cv05776, filed Oct. 12, 2007, in United States District Court, Northern District of Illinois, Eastern Division.
Complaint in *LPL Licensing LLC and Phoenix Licensing LLC v. Chase Manhattan Mortgage Corporation, JP Morgan Chase Bank, N.A., Citibank, N.A., Citibank USA, N.A., CitiBank* (South Dakota), *N.A., CitiMortgage, Inc., CitiGroup, Inc., Citi Assurance Services Inc., Countrywide Home Loans, Inc., Countrywide Insurance Services, Inc., Discover Financial Services, Inc., Discover Bank, GMAC Mortgage, L.L.C., GMAC Insurance Marketing, Inc., GMCA Bank, Liberty Life Insurance Company, Response Worldwide Insurance Company, Direct Response Corporation, Warner Insurance Company, State Farm Mutual Automobile Insurance Company, State Farm Bank, F.S.B., USAA Federal Savings Bank and USAA Savings Bank*, Civil Action No. 2:2007cv00387, filed Aug. 31, 2007, in United States District Court, Eastern District of Texas, Marshall Division.
Citi Parties' Motion to Consolidate and Transfer under 28 U.S.C. § 1407 in *In re LPL and Phoenix Licensing Litigation—MDL*, Civil Action No. MDL No. 1910, filed Oct. 14, 2007, Judicial Panel on Multidistrict Litigation.
Citi Parties' Brief in Support of Their Motion to Consolidate and Transfer Under 28 U.S.C. § 1407 in *In re LPL and Phoenix Licensing Litigation—MDL*, Civil Action No. MDL No. 1910, filed Oct. 24, 2007, Judicial Panel on Multidistrict Litigation.
Schedule of Actions in *In re LPL and Phoenix Licensing Litigation—MDL*, Civil Action No. MDL No. 1910, filed Oct. 24, 2007, Judicial Panel on Multidistrict Litigation.

WebMaster Magazine, World Wide Winners, Aug. 1997.
Burch, Companies Turn to Internet Server Management Firms, Sep. 26, 1994.
Business Wire, Quicken Insure Market to Debut with Major Carriers as Partners, Jun. 11, 1996.
Business Wire, PC Quote Partners in World's First Virtual Conference, Apr. 22, 1996.
Doucette, Aetna's Newest Location—On the Internet, Nov. 1995.
Strazewski, Pioneers on the Web Frontier, May 1996.
Ellsworth, Staking a Claim on the Internet, Jan. 1996.
Holtman, The New Age of Financial Services: A Marketing Hands-On Applications Guide to Harnessing the Power of Database Marketing [divided into 3 parts: 89A, 89B, 89C], 1992.
Nash, Database Marketing [divided into 3 parts: 90A, 90B, 90C], 1993.
Foley, Ready, Aim, Sell, Feb. 1997.
Morrall, Customize Your Cross-Sell, Mar. 1993.
Berry, Database Marketing: A Potent New Tool for Selling, Sep. 5, 1994.
Stephen A. Cone, How KeyCorp Competes with Breakthrough Marketing, Summer 1996.
Kirsten Bell DeTienne; Jeffrey A. Thompson, Database Marketing and Organizational Learning Theory: Toward a Research Agenda, 1996.
Beverly Cramp, Reading Your Mind, Feb. 22, 1996.
John J. Harrison, Going Direct Adding Database Marketing to the Mix, May 1996.
John J. Harrison, Using a Database Marketing Strategy to Successfully Market Manage Care, May 1996.
Rob Yoegel, Financial Services Database Marketing, May 1996.
Joseph Radigan, Marketing, Mergers and Megabits, Mar. 1996.
Richard Schroeder, The Prefabricated Financial Plan Can Be Good, Cheap Alternative to Traditional Custom Plans, Nov. 7, 1995.
Takayuki Tachikawa; Makoto Takizawa, Communication Protocol for Group Distributed Objects, 1996.
Andrew Orent, AT&T Helps Financial Institutions Harness the Power of Customer Knowledge, Winter 1995.
Donald C. Mann, Database Marketing—How Its Changing Your Business, Aug. 1990.
Peter Child Robert J. Dennis Timothy D. Gokey Tim I. McGuire Mike Sherman Marc Singer, Can Marketing Regain the Personal Touch, 1995.
Ken Graham, Data Base Marketing with a PC-Based MCIF, Summer 1992.
Lillian Schapiro, How Guardian Got to Grips with Its Database, Feb. 1995.
Chanda Ghose Dasgupta Sanjoy Ghose, Response Modeling: A Segmentation and Targeting Approach for the Life Insurance Industry, 1993.
Liberty Life, Insurance Committee Meeting Minutes, Sep. 24, 1970.
Fred C. Malan, Marketing Options for New Borrowers, Feb. 19, 1986.
Liberty Life, Specialized Marketing Direct Mail Automation, Apr. 3, 1992.
Liberty Life, Liberty Life Direct Mail User Guide, Jul. 8, 1992.
Liberty Life, Direct Response Manual, 1994.
Leo Hertzog, Jr. Bill Korn, Taking Control of Information Fulfillment, Feb. 1992.
Clinton Wilder, Interactive Ads, Oct. 3, 1994.
Clinton Wilder ,Interactive Ads—Online and Interactive Services are Providing Advertisers with an Entirely New and Convenient Way to Reach Affluent, Demographically Correct Customers, Oct. 3, 1994.
Quick Quote, QuickQuote Insurance Quote System and Related Publications, Jul. 1995.
Unknown, Response Required Data Structure for Information Interchange in an Office Network.
Precision Marketing, Banking on the Changing Future, May 29, 1995.
Katherine Morrall, Forging Bonds with the Mature Market, Sep. 1995.
Elizabeth Daniele, Serendipity or Science, Mar. 1993.
Ruth Kastrud, The Agent's Creativity Advantage, Sep. 1991.
Hearst Communications Inc., ZONE—Getting Control of Your Cashflow—A Financial Planning Primer, Mar. 13, 1985.
T.J. Hughes, The Customer Database: Cross Selling Retail Financial Services, 1992.
Seattle Times, Economy Computers Cranking Out Personal Financial Plans—But Some Say the Plans are Just Bolierplate, Nov. 2, 1985.
Unknown, Tradewise—A New Electronic Concept in Insurance, May 1, 1994.
D.S. Fisher T.W. Tyler, Using Distributed OLTP Technology in a High Performance Storage System, Mar. 1995.
Charles C. Ashley, Rearranging the Distribution System, Oct. 1, 1991.
Countrywide affiliated companies, Countrywide affiliated company systems, Nov. 14, 1996 Apr. 1, 1993.
Interview of Richard Crone, Electronic Marketing: Its the Content That Counts, Jul. 1996.
Joachim Angstenberger, Database Marketing, Response Analysis and Forecasting in Financial Engineering, May 22, 1997.
Amy Dunkin, Unlocking the Mysteries of Term Life, Jul. 1, 1996.
Joseph B. Treaster, Internet Sales Offer an Insurance Alternative, Sep. 6, 1996.
Business Wire, QuickQuote Adds First Chicago NBD to Client Roster, Sep. 5, 1996.
Insweb Corporation, Insweb Corporation Online Quote System and Related Publications, 1997.
Amy Rice and Julie Hsu, EZ Reader: Embedded AI for Automatic Electronic Mail Interpretation and Routing, *Proceedings of the Thirteenth National Conference on Artificial Intelligence and the Eighth Innovative Applications of Artificial Intelligence Conference*, 1996.
"Defendants' Joint Invalidity Contentions," In re Phoenix Licensing, LLC Patent Litigation, *In the United States District Court for the District of Arizona*, Case No. MDL Docket No. 2:08-md-1910-MHM, 222 pages, Dec. 19, 2008.
Claim Chart re above "Defendants' Joint Invalidity Contentions," In re Phoenix Licensing, LLC Patent Litigation, *In the United States District Court for the District of Arizona*, Case No. MDL Docket No. 2:08-md-1910-MHM, 1,570 pages, Dec. 19, 2008.
Exhibit B re above "Defendants' Joint Invalidity Contentions," In re Phoenix Licensing, LLC Patent Litigation, *In the United States District Court for the District of Arizona*, Case No. MDL Docket No. 2:08-md-1910-MHM, 12 pages, Dec. 19, 2008.
"Defendants' Joint Invalidity Contentions," *Phoenix Licensing, LLC and LPL Licensing, LLC v. Allstate Corporation, et al., In the United States District Court for the Eastern District of Texas, Marshall Division*, Civil Action No. 2:09-CV-255-TJW, 243 pages, Jan. 28, 2011.
Exhibit B, Prior Art Supplemental List for Particular Functionalities re above "Defendants' Joint Invalidity Contentions," *Phoenix Licensing, LLC and LPL Licensing, LLC v. Allstate Corporation, et al., In the United States District Court for the Eastern District of Texas, Marshall Division*, Civil Action No. 2:09-CV-255-TJW, 46 pages, Jan. 28, 2011.
Claim Chart re above "Defendants' Joint Invalidity Contentions," *Phoenix Licensing, LLC and LPL Licensing, LLC v. Allstate Corporation, et al., In the United States District Court for the Eastern District of Texas, Marshall Division*, Civil Action No. 2:09-CV-255-TJW, 1437, pages, Jan. 28, 2011.
Petrison, Lisa A., et al., "Database Marketing, Past, Present, and Future," *Journal of Direct Marketing*, vol. 7, No. 3, Summer 1993, pp. 27-43.
Campbell, Don C., "Those 'Pre-Approved' Credit Card Come-Ons," Los Angeles Times, Jun. 7, 1989, 4 pages.
Batra, Rajeev, Ph.D., et al., "The New Direct Marketing, How to Implement a Profit-Driven Database Marketing Strategy," Second Edition, David Shepard Associates, Inc., with individual contributions by Rajeev Batra, Ph.D., Andrew Deutch, George Orme, Bruce Ratner, Ph.D., Dhiraj Sharma, Ph.D., David Shepard, 1995, 509 pages, 1995.
Anonymous, "Study examines marketing of mortgage credit insurance," Anonymous. Newsletter of the Bank Insurance Industry. Princeton: 1995, Iss. 1; p. 1, 3 pgs, 1995.

"Defendants' Joint Preliminary Invalidity Contentions," In the United States District Court for the Eastern District of Texas Marshall Division, *Phoenix Licensing LLC and LPL Licensing, LLC v. ING Bank, FSB et al.*, Civil Action No. 2:10-cv-00064, filed Feb. 24, 2012, 242 pages.

Appendix A re above, "Defendants' Joint Preliminary Invalidity Contentions," In the United States District Court for the Eastern District of Texas Marshall Division, *Phoenix Licensing LLC and LPL Licensing, LLC v. ING Bank, FSB et al.*, Civil Action No. 2:10-cv-00064, filed Feb. 24, 2012, 1424 pages.

Appendix B re above, "Defendants' Joint Preliminary Invalidity Contentions," In the United States District Court for the Eastern District of Texas Marshall Division, *Phoenix Licensing LLC and LPL Licensing, LLC v. ING Bank, FSB et al.*, Civil Action No. 2:10-cv-00064, filed Feb. 24, 2012, 1462 pages (divided into 2 parts) (part 1 of 2).

Appendix B re above, "Defendants' Joint Preliminary Invalidity Contentions," In the United States District Court for the Eastern District of Texas Marshall Division, *Phoenix Licensing LLC and LPL Licensing, LLC v. ING Bank, FSB et al.*, Civil Action No. 2:10-cv-00064, filed Feb. 24, 2012, 1462 pages (divided into 2 parts) (part 2 of 2).

Appendix C re above, "Defendants' Joint Preliminary Invalidity Contentions," In the United States District Court for the Eastern District of Texas Marshall Division, *Phoenix Licensing LLC and LPL Licensing, LLC v. ING Bank, FSB et al.*, Civil Action No. 2:10-cv-00064, filed Feb. 24, 2012, 122 pages.

Appendix D re above, "Defendants' Joint Preliminary Invalidity Contentions," In the United States District Court for the Eastern District of Texas Marshall Division, *Phoenix Licensing LLC and LPL Licensing, LLC v. ING Bank, FSB et al.*, Civil Action No. 2:10-cv-00064, filed Feb. 24, 2012, 631 pages.

"Defendants' Notice of Disclosures," In the United States District Court for the Eastern District of Texas Marshall Division, *Phoenix Licensing LLC and LPL Licensing, LLC v. ING Bank, FSB et al.*, Civil Action No. 2:10-cv-00064, filed Feb. 24, 2012, 3 pages.

"Defendants' Joint Preliminary Invalidity Contentions," In the United States District Court for the Eastern District of Texas Marshall Division, *Phoenix Licensing LLC and LPL Licensing, LLC v. Aegon USA, Inc. et al.*, Civil Action No. 2:10-cv-00212-JRG, filed Mar. 9, 2012, 284 pages.

Appendix A re above, "Defendants' Joint Preliminary Invalidity Contentions," In the United States District Court for the Eastern District of Texas Marshall Division, *Phoenix Licensing LLC and LPL Licensing, LLC v. Aegon USA, Inc. et al.*, Civil Action No. 2:10-cv-00212-JRG, filed Mar. 9, 2012, 1789 pages.

Appendix B re above, "Defendants' Joint Preliminary Invalidity Contentions," In the United States District Court for the Eastern District of Texas Marshall Division, *Phoenix Licensing LLC and LPL Licensing, LLC v. Aegon USA, Inc. et al.*, Civil Action No. 2:10-cv-00212-JRG, filed Mar. 9, 2012, 1794 pages.

Appendix C re above, "Defendants' Joint Preliminary Invalidity Contentions," In the United States District Court for the Eastern District of Texas Marshall Division, *Phoenix Licensing LLC and LPL Licensing, LLC v. Aegon USA, Inc. et al.*, Civil Action No. 2:10-cv-00212-JRG, filed Mar. 9, 2012, 256 pages.

Appendix C re above, "Defendants' Joint Preliminary Invalidity Contentions," In the United States District Court for the Eastern District of Texas Marshall Division, *Phoenix Licensing LLC and LPL Licensing, LLC v. Aegon USA, Inc. et al.*, Civil Action No. 2:10-cv-00212-JRG, filed Mar. 9, 2012, 851 pages.

"Defendants' Joint Preliminary Invalidity Contentions," In the United States District Court for the Eastern District of Texas Marshall Division, *Phoenix Licensing LLC and LPL Licensing, LLC v. Alliance Data Systems Corporation, et al.*, Civil Action No. 2:11-cv-00286-MHS-CMC, filed Jun. 28, 2012, 395 pages.

"Defendants' Proposed Terms to be Construed," In the United States District Court for the Eastern District of Texas Marshall Division, *Phoenix Licensing LLC and LPL Licensing, LLC v. ING Bank, FSB, et al.*, Civil Action No. 2:10-cv-00064-MHS-RSP, filed Aug. 1, 2012, 11 pages.

"Defendants' Joint Preliminary Invalidity Contentions," In the United States District Court for the Eastern District of Texas Marshall Division, *Phoenix Licensing LLC and LPL Licensing, LLC v. Alliance Data Systems Corporation, et al.*, Civil Action No. 2:11-cv-00286-MHS-CMC, filed Jun. 25, 2012, 395 pages.

Appendix A re above #61: Claim Chart:: '434 Patent in view of Lockwood '359 Patent, 56 pages.

Appendix A re above #61: Claim Chart: '434 Patent in view of Forseman '422 Patent, 55 pages.

Appendix A re above #61: Claim Chart: '434 Patent in view of Johnson '525 Patent, 138 pages.

Appendix A re above #61: Claim Chart: '434 Patent in view of "Maybe the Difficulty in the Definition is the Difference" Schultz article, 29 pages.

Appendix A re above #61: Claim Chart: '434 Patent in view of "Direct Marketing to Consumers" by Roscitt et al. article, 52 pages.

Appendix A re above #61: Claim Chart: '434 Patent in view of "eGenie Site Leads Way in Personalization," Dysart article, 30 pages.

Appendix A re above #61: Claim Chart: '434 Patent in view of "Remote Shopping the British Way," Hanover article, 25 pages.

Appendix A re above #61: Claim Chart: '434 Patent in view of "Electronic Marketing," Hill Reference article, 22 pages.

Appendix A re above #61: Claim Chart: '434 Patent in view of Lawlor '501 Patent, 78 pages.

Appendix A re above #61: Claim Chart: '434 Patent in view of Deaton '164 Patent, 32 pages.

Appendix A re above #61: Claim Chart: '434 Patent in view of Miller et al. '653 Patent, 80 pages.

Appendix A re above #61: Claim Chart: '434 Patent in view of Langenkamp et al. '867 Patent, 63 pages.

Appendix A re above #61: Claim Chart: '434 Patent in view of Dedtrick '521 Patent, 56 pages.

Appendix A re above #61: Claim Chart: '434 Patent in view of Jacobs '142 Patent, 80 pages.

Appendix A re above #61: Claim Chart: '434 Patent in view of Brown '368 Patent, 124 pages.

Appendix A re above #61: Claim Chart: '434 Patent in view of "Romancing the Segment of One" Betts article, 36 pages.

Appendix A re above #61: Claim Chart: '434 Patent in view of "A New Base for Bank Marketing" Borowsky article, 44 pages.

Appendix A re above #61: Claim Chart: '434 Patent in view of "Those 'Pre-Approved' Credit Card Come-Ons," Campbell article, 49 pages.

Appendix A re above #61: Claim Chart: '434 Patent in view of "Leveraging the Consumer Database to Your Competitive Advantage," Goodman article, 66 pages.

Appendix A re above #61: Claim Chart: '434 Patent in view of Atkins '085 Patent, 40 pages.

Appendix A re above #61: Claim Chart: '434 Patent in view of "The Complete Database Marketer," Hughes article, 61 pages.

Appendix A re above #61: Claim Chart: '434 Patent in view of "Customize Your Cross-Sell," Morrall article, 45 pages.

Appendix A re above #61: Claim Chart: '434 Patent in view of "Marketing Through Automation," Nevin article, 38 pages.

Appendix A re above #61: Claim Chart: '434 Patent in view of "Database Marketing Past, Present, and Future," Petrison article, 67 pages.

Appendix A re above #61: Claim Chart: '434 Patent in view of "Automated Marketing: the key to growth," Pope article, 42 pages.

Appendix A re above #61: Claim Chart: '434 Patent in view of "The New Direct Marketing: How to Implement a Profit-Driven Database Marketing Strategy," Shepard article, 96 pages.

Appendix A re above #61: Claim Chart: '434 Patent in view of "Bear Creek Builds In-House Gold Mine," Shorland article, 62 pages.

Appendix A re above #61: Claim Chart: '434 Patent in view of Atkins '085 Patent, 42 pages.

Appendix A re above #61: Claim Chart: '434 Patent in view of Lockwood '355 Patent, 48 pages.

Appendix A re above #61: Claim Chart: '434 Patent in view of "The Database Marketing Imperative" Vavra article, 61 pages.

Appendix A re above #61: Claim Chart: '434 Patent in view of "Can Marketing regain the Personal Touch" Child et al. article, 33 pages.

Appendix A re above #61: Claim Chart: '434 Patent in view of "Database Marketing" Nash article, 61 pages.

Appendix A re above #61: Claim Chart: '434 Patent in view of "How Its Changing Your Business" Mann article, 75 pages.
Appendix A re above #61: Claim Chart: '434 Patent in view of "How Guardian Got to Grips With its Database" Schapiro article, 37 pages.
Appendix A re above #61: Claim Chart: '434 Patent in view of "Expanding the Role of the Direct Marketing Database" Roberts article, 33 pages.
Appendix A re above #61: Claim Chart: '434 Patent in view of "Expanding the Role of the Direct Marketing Database" Roberts article, 34 pages.
Appendix A re above #61: Claim Chart: '434 Patent in view of Tyler et al. '942 Patent, 47 pages.
Appendix A re above #61: Claim Chart: '434 Patent in view of Jacobs '746 Patent, 34 pages.
Appendix A re above #61: Claim Chart: '434 Patent in view of Lockwood '951 Patent, 43 pages.
Appendix A re above #61: Claim Chart: '434 Patent in view of Ryan '085 Patent, 65 pages.
Appendix A re above #61: Claim Chart: '434 Patent in view of Deaton '322 Patent, 36 pages.
Appendix A re above #61: Claim Chart: '434 Patent in view of Cyman '302 Patent, 43 pages.
Appendix A re above #61: Claim Chart: '434 Patent in view of Day et al. '175 Patent, 30 pages.
Appendix A re above #61: Claim Chart: '434 Patent in view of Weiss '889 Patent, 28 pages.
Appendix A re above #61: Claim Chart: '434 Patent in view of Baronowski et al. '800 Patent, 41 pages.
Appendix A re above #61: Claim Chart: '434 Patent in view of Anderson '396 Patent, 68 pages.
Appendix A re above #61: Claim Chart: '434 Patent in view of Bauchner '153 Patent, 35 pages.
Appendix A re above #61: Claim Chart: '434 Patent in view of Haskins '969 Patent, 54 pages.
Appendix A re above #61: Claim Chart: '434 Patent in view of Cragun '868 Patent, 74 pages.
Appendix A re above #61: Claim Chart: '434 Patent in view of Filepp '632 Patent, 44 pages.
Appendix A re above #61: Claim Chart: '434 Patent in view of Stein '306 Patent, 49 pages.
Appendix A re above #61: Claim Chart: '434 Patent in view of Carles '516 Patent, 42 pages.
Appendix A re above #61: Claim Chart: '434 Patent in view of Foresman '587 WO Patent Publication, 58 pages.
Appendix A re above #61: Claim Chart: '434 Patent in view of Lalonde '383 WO Patent Publication, 79 pages.
Appendix A re above #61: Claim Chart: '434 Patent in view of Ryan et al. '189 Patent, 56 pages.
Appendix A re above #61: Claim Chart: '434 Patent in view of "Database: a potent new tool for selling" Business Week article, 40 pages.
Appendix A re above #61: Claim Chart: '434 Patent in view of "Database: a potent new tool for selling" Business Week article, 41 pages.
Appendix A re above #61: Claim Chart: '434 Patent in view of "Acxiom Reference Manual," 51 pages.
Appendix A re above #61: Claim Chart: '434 Patent in view of "How Vons Makes it Work" Anonymous article, 21 pages.
Appendix A re above #61: Claim Chart: '434 Patent in view of "How Vons Makes it Work" Anonymous article, 23 pages.
Appendix A re above #61: Claim Chart: '434 Patent in view of "Response Modeling" Dasgupta article, 38 pages.
Appendix A re above #61: Claim Chart: '434 Patent in view of "Response Modeling" Dasgupta article, 39 pages.
Appendix A re above #61: Claim Chart: '434 Patent in view of "The New Age of Financial Services Marketing" Holtman et al. article, 44 pages.
Appendix A re above #61: Claim Chart: '434 Patent in view of "The New Age of Financial Services Marketing" Holtman et al. article, 47 pages.
Appendix A re above #61: '434 Patent Means-Plus-Function Analysis, 10 pages.
Appendix A re above #61: Claim Chart: '434 Patent in view of "How KeyCorp Competes with Breakthrough Marketing" Cone article, 42 pages.
Appendix A re above #61: Claim Chart: '434 Patent in view of "How KeyCorp Competes with Breakthrough Marketing" Cone article, 43 pages.
Appendix A re above #61: Claim Chart: '434 Patent in view of "Integrating Direct Marketing into Financial Services" Topol et al. article, 50 pages.
Appendix A re above #61: Claim Chart: '434 Patent in view of "Reading Your Mind" Cramp article, 26 pages.
Appendix A re above #61: Claim Chart: '434 Patent in view of "How Guardian Got to Grips With Its Database" Schapiro article, 31 pages.
Appendix A re above #61: Claim Chart: '434 Patent in view of "How Guardian Got to Grips With Its Database" Schapiro article, 34 pages.
Appendix A re above #61: Claim Chart: '434 Patent in view of "First Premier Prior Art," 57 pages.
Appendix A re above #61: Claim Chart: '434 Patent in view of "First Minnesota Savings Bank F.S.B.: Database Analysis and Strategic Recommendations," 26 pages.
Appendix A re above #61: Claim Chart: '434 Patent in view of "Database Marketing Plan Case Study Fusion National Bank," 27 pages.
Appendix A re above #61: Claim Chart: '434 Patent in view of "National Commerce Bancorporation," 31 pages.
Appendix A re above #61: Claim Chart: '434 Patent in view of "Signet Money Market Account Mailing," 27 pages.
Appendix A re above #61: Claim Chart: '434 Patent in view of "Sunburst Bank," 30 pages.
Appendix A re above #61: Claim Chart: '434 Patent in view of "Union Bank's Use of Marketing Profiles, Inc.'s MaxSell," 23 pages.
Appendix B re above #61: Claim Chart: '938 Patent in view of Stein '996 Patent, 54 pages.
Appendix B re above #61: Claim Chart: '938 Patent in view of Babcock, Jr. '790 Patent, 41 pages.
Appendix B re above #61: Claim Chart: '938 Patent in view of "CommerceNet," 72 pages.
Appendix B re above #61: Claim Chart: '938 Patent in view of Cunningham '645 Patent, 40 pages.
Appendix B re above #61: Claim Chart: '938 Patent in view of Fortenberry '485 Patent, 45 pages.
Appendix B re above #61: Claim Chart: '938 Patent in view of "Interactive Marketing Future Present," 106 pages.
Appendix B re above #61: Claim Chart: '938 Patent in view of "Interactivity Ad Effectiveness," 79 pages.
Appendix B re above #61: Claim Chart: '938 Patent in view of "Interactivity Reexamined," 91 pages.
Appendix B re above #61: Claim Chart: '938 Patent in view of "Internet Application Online Banking," 90 pages.
Appendix B re above #61: Claim Chart: '938 Patent in view of Lebda '594 Patent, 40 pages.
Appendix B re above #61: Claim Chart: '938 Patent in view of Linden '254 Patent, 39 pages.
Appendix B re above #61: Claim Chart: '938 Patent in view of "Marketing Opportunities in Digital," 136 pages.
Appendix B re above #61: Claim Chart: '938 Patent in view of "Maximizing Web-based Marketing," 68 pages.
Appendix B re above #61: Claim Chart: '938 Patent in view of Scroggie '469 Patent, 44 pages.
Appendix B re above #61: Claim Chart: '938 Patent in view of Lent '524 Patent, 56 pages.
Appendix B re above #61: Claim Chart: '938 Patent in view of Lockwood '951 Patent, 46 pages.
Appendix B re above #61: Claim Chart: '938 Patent in view of "Viewing the Web," 55 pages.
Appendix B re above #61: Claim Chart: '938 Patent in view of "WWW Ad Medium," 46 pages.
Appendix B re above #61: Claim Chart: '938 Patent in view of Motoyama '202 Patent, 70 pages.
Appendix B re above #61: Claim Chart: '938 Patent in view of Whitmyer '468 Patent, 127 pages.
Appendix B re above #61: Claim Chart: '938 Patent in view of St. Denis WO 99/33012 Patent Publication, 46 pages.

Appendix B re above #61: Claim Chart: '938 Patent in view of Boe et al. '975 Patent, 52 pages.
Appendix B re above #61: Claim Chart: '938 Patent in view of Angles et al. '811 Patent, 79 pages.
Appendix B re above #61: Claim Chart: '938 Patent in view of Jones et al. '397 Patent, 91 pages.
Appendix B re above #61: Claim Chart: '938 Patent in view of Lazarus et al. '532 Patent, 58 pages.
Appendix B re above #61: Claim Chart: '938 Patent in view of Beck '139 Patent, 45 pages.
Appendix B re above #61: Claim Chart: '938 Patent in view of Kepecs '543 Patent, 67 pages.
Appendix B re above #61: Claim Chart: '938 Patent in view of Beck '154 Patent, 60 pages.
Appendix B re above #61: Claim Chart: '938 Patent in view of Horowitz '290 Patent, 84 pages.
Appendix B re above #61: Claim Chart: '938 Patent in view of Tilden, Jr. et al. '635 Patent, 40 pages.
Appendix B re above #61: Claim Chart: '938 Patent in view of Todd '418 Patent, 51 pages.
Appendix B re above #61: Claim Chart: '938 Patent in view of Shane '972 Patent, 67 pages.
Appendix B re above #61: Claim Chart: '938 Patent in view of Dedtrick '521 Patent, 56 pages.
Appendix B re above #61: Claim Chart: '938 Patent in view of Sheflott '493 Patent, 44 pages.
Appendix B re above #61: Claim Chart: '938 Patent in view of "How Its Changing Your Business," Mann article, 101 pages.
Appendix B re above #61: Claim Chart: '938 Patent in view of "Interactive Ads," Wilder Article, 56 pages.
Appendix B re above #61: Claim Chart: '938 Patent in view of "Taking Control of Information Fulfillment," Hertzog et al. article, 57 pages.
Appendix B re above #61: Claim Chart: '938 Patent in view of "World Wide Winner," 56 pages.
Appendix B re above #61: Claim Chart: '938 Patent in view of "IBWs and related publications," 76 pages.
Appendix B re above #61: Claim Chart: '938 Patent in view of "Comerica Website Screenshots (1998-1999)," 104 pages.
Appendix B re above #61: Claim Chart: '938 Patent in view of "QuickQuote," 52 pages.
Appendix B re above #61: Claim Chart: '938 Patent in view of "Cyberspace Call Centers," 41 pages.
Appendix B re above #61: Claim Chart: '938 Patent in view of "Organizing Today for the Digital Marketing of Tomorrow," Parson article, 56 pages.
Appendix B re above #61: Claim Chart: '938 Patent in view of "Maybe the Difficulty in the Definition is the Difference," Schultz article, 46 pages.
Appendix B re above #61: Claim Chart: '938 Patent in view of "Direct Marketing to Consumers," 57 pages.
Appendix B re above #61: Claim Chart: '938 Patent in view of Beaumont '647 Patent, 109 pages.
Appendix B re above #61: Claim Chart: '938 Patent in view of Abelow '908 Patent, 110 pages.
Appendix B re above #61: Claim Chart: '938 Patent in view of "The MarketFirst System," 65 pages.
Appendix B re above #61: Claim Chart: '938 Patent in view of Herz 2001/0014868 Patent Publication, 72 pages.
Appendix B re above #61: Claim Chart: '938 Patent in view of "First Premier Prior Art in view of Shane '972," 124 pages.
Appendix B re above #61: Claim Chart: '938 Patent in view of "The New Direct Marketing," Shepard article, 91 pages.
Appendix B re above #61: Claim Chart: '938 Patent in view of Bezos '141 Patent, 41 pages.
Appendix C re above #61: Claim Chart: '366 Patent in view of "First Premier Prior Art," 34 pages.
Appendix C re above #61: Claim Chart: '366 Patent in view of Foresman '422 Patent, 19 pages.
Appendix C re above #61: Claim Chart: '366 Patent in view of "The New Direct Marketing," Shepard article, 33 pages.
Appendix C re above #61: Claim Chart: '366 Patent in view of Atkins '085 Patent, 30 pages.
Appendix C re above #61: Claim Chart: '366 Patent in view of Lockwood '355 Patent, 31 pages.
Appendix C re above #61: Claim Chart: '366 Patent in view of "The Database Marketing Imperative," Vavra article, 41 pages.
Appendix C re above #61: Claim Chart: '366 Patent in view of "Database Marketing," Nash article, 44 pages.
Appendix C re above #61: Claim Chart: '366 Patent in view of "How Its Changing Your Business," Mann article, 39 pages.
Appendix C re above #61: Claim Chart: '366 Patent in view of "How Guardian Got to Grips With its Database," Schapiro article, 26 pages.
Appendix C re above #61: Claim Chart: '366 Patent in view of "How KeyCorp Competes With Breakthrough Marketing," Cone article, 29 pages.
Appendix C re above #61: Claim Chart: '366 Patent in view of Tyler et al. '942 Patent, 33 pages.
Appendix C re above #61: Claim Chart: '366 Patent in view of Deaton '322 Patent, 23 pages.
Appendix C re above #61: Claim Chart: '366 Patent in view of Cyman '302 Patent, 39 pages.
Appendix C re above #61: Claim Chart: '366 Patent in view of Day et al. '175 Patent, 22 pages.
Appendix C re above #61: Claim Chart: '366 Patent in view of "Romancing the Segment of One," Betts article, 25 pages.
Appendix C re above #61: Claim Chart: '366 Patent in view of Miller et al. '653 Patent, 26 pages.
Appendix C re above #61: Claim Chart: '366 Patent in view of Dedrick '521 Patent, 26 pages.
Appendix C re above #61: Claim Chart: '366 Patent in view of "Direct Marketing to Consumers," Roscitt et al. article, 22 pages.
Appendix C re above #61: Claim Chart: '366 Patent in view of Lawlor '501 Patent, 28 pages.
Appendix C re above #61: Claim Chart: '366 Patent in view of Deaton '165 Patent, 21 pages.
Appendix C re above #61: Claim Chart: '366 Patent in view of Brown '368 Patent, 24 pages.
Appendix C re above #61: Claim Chart: '366 Patent in view of "A New Base for Bank Marketing," Borowski article, 26 pages.
Appendix C re above #61: Claim Chart: '366 Patent in view of "Those, 'Pre-Approved' Credit Card Come-Ons," Campbell article, 25 pages.
Appendix C re above #61: Claim Chart: '366 Patent in view of "Leveraging the Consumer Database to Your Competitive Advantage," Goodman article, 33 pages.
Appendix C re above #61: Claim Chart: '366 Patent in view of "Customize Your Cross-Sell," Morrall et al. article, 21 pages.
Appendix C re above #61: Claim Chart: '366 Patent in view of "Database Marketing Breakthroughs," Harrison article, 23 pages.
Appendix C re above #61: Claim Chart: '366 Patent in view of "Database Marketing Past, Present, and Future," Petrison article, 23 pages.
Appendix C re above #61: Claim Chart: '366 Patent in view of "Marketing Through Automation," Nevin article, 23 pages.
Appendix C re above #61: Claim Chart: '366 Patent in view of "Database Marketing: A potent new tool for selling," Business Week Article, 56 pages.
Appendix C re above #61: Claim Chart: '366 Patent in view of "How Vons Makes it Work," Anonymous Article, 23 pages.
Appendix C re above #61: Claim Chart: '366 Patent in view of "How Vons Makes it Work," Anonymous Article, 19 pages.
Appendix C re above #61: Claim Chart: '366 Patent in view of Lalonde '383 Patent, 84 pages.
Appendix C re above #61: Claim Chart: '366 Patent in view of "Signet Money Market Account Mailing Fusion Marketing Group," 95 pages.
Appendix C re above #61: Claim Chart: '366 Patent in view of Foresman '587 Patent, 115 pages.
Appendix C re above #61: Claim Chart: '366 Patent in view of "Sunburst Bank Dec. 1993 Mutual Fund Mailing Fusion Marketing Group," 61 pages.
Appendix C re above #61: Claim Chart: '366 Patent in view of Bauchner '153 Patent, 39 pages.
Appendix C re above #61: Claim Chart: '366 Patent in view of Anderson et al. '396 Patent, 60 pages.

Appendix C re above #61: Claim Chart: '366 Patent in view of Anderson et al. '396 Patent, 64 pages.
Appendix C re above #61: Claim Chart: '366 Patent in view of Stein et al. '306 Patent, 51 pages.
Appendix C re above #61: Claim Chart: '366 Patent in view of Stein et al. '306 Patent, 56 pages.
Appendix C re above #61: Claim Chart: '366 Patent in view of Filepp et al. '632 Patent, 28 pages.
Appendix C re above #61: Claim Chart: '366 Patent in view of Filepp et al. '632 Patent, 31 pages.
Appendix C re above #61: Claim Chart: '366 Patent in view of "Sunburst Bank Dec. 1993 Mutual Fund Mailing," 54 pages.
Appendix D re above #61: Combinations rendering the '434 obvious, 555 pages.
Appendix E re above #61: Claim Chart: '938 Patent in view of World Wide Winners in view of Reiter, Zetmeir, "Difficulty in the Definition," "Taking Control of Information Fulfillment," or Shane '972, 176 pages.
Appendix E re above #61: Claim Chart: '938 Patent in view of Shane '972 in view of Reiter, Zetmeir, "Difficulty in the Definition," "Taking Control of Information Fulfillment," 140 pages.
Appendix E re above #61: Claim Chart: '938 Patent in view of Horowitz '290 in view of Reiter, Zetmeir, "Difficulty in the Definition," "Taking Control of Information Fulfillment," or Shane '972, 213 pages.
Appendix E re above #61: Claim Chart: '938 Patent in view of Herz '938 Patent, 82 pages.
Appendix E re above #61: Claim Chart: '938 Patent in view of Sheflott '493 in view of Reiter, Zetmeir, "Difficulty in the Definition," "Taking Control of Information Fulfillment," or Shane '972, 160 pages.
Appendix E re above #61: Claim Chart: '938 Patent in view of Motoyama '202 in view of Reiter, Zetmeir, "Difficulty in the Definition," "Taking Control of Information Fulfillment," or Shane '972, 192 pages.
Appendix E re above #61: Claim Chart: '938 Patent in view of Jones et al. '397 in view of Reiter, Zetmeir, "Difficulty in the Definition," "Taking Control of Information Fulfillment," or Shane '972, 203 pages.
Appendix F re above #61: Claim Chart: '366 Patent in view of "The New Direct Marketing: How to Implement a Profit-Driven Database Marketing Strategy," Shepard article, 35 pages.
Wright, Mike et al, "Bank Marketing," Chapter 10, Science Direct, Dec. 31, 1995, pp. 212-235 (PHX-NATIONALWIDE-DEFS_000186-209).
Bartosh, Brian, "Automating the marketing process," American Agent & Broker, Jun. 1995, pp. 53-56 (PHX-NATIONWIDE-DEFS_000210-213).
Boone, Elisabeth, "Shopping for sales software," American Agent & Broker, Nov. 1995; 67,11; ProQuest, at p. 24 (PHX-NATIONWIDE-DEFS_000214-228).
Giovetti, Alfred C., "Client Write-Up: Conquer the Mountain," Accounting Technology, at p. 20, Oct. 1995 (PHX-NATIONWIDE-DEFS_000229-250).
Heid, Jim, "Mail Merge," Macworld, Apr. 1993; 10, 4; ProQuest, at p. 195 (PHX-NATIONWIDE-DEFS_000251-255).
Jones, Tom, "Hybrid Mail: Re-Engineering Business Communications," Telecommunications, at p. 41, Nov. 1995 (PHX-NATIONWIDE-DEFS_000256-259).
Morrall, Katherine, "MCIFs help piece together profitable profiles," ABA Bank Marketing, at p. 22, Mar. 1995 (PHX-NATIONWIDE-DEFS_000260-265).
Anonymous, "Outsourcing Helps DirecTV Focus on Subscribers," Managing Office Technology, at p. 20, Aug. 1996 (PHX-NATIONWIDE-DEFS_000266-267).
Pitt, Jeremy, "A WWW Interface to a Theorem Prover for Modal Logic," Department of Computer Science, University of York, 1996 (PHX-NATIONWIDE-DEFS_000268-275).
Schoenbachler, Denise D. et al., "Understanding Consumer Database Marketing," Journal of Consumer Marketing, vol. 14, Iss: 1, pp. 5-19 (PHX-NATIONWIDE-DEFS_000276-291).

Shumrak, H. Michael, "New Techniques in Direct Marketing," Record of Society of Actuaries, vol. 17, No. 4B, pp. 2083-2097, 1991 (PHX-NATIONWIDE-DEFS_000292-307).
"Proposal for Philip Morris," Strategic Information Associates, Oct. 30, 1996 (PHX-NATIONWIDE-DEFS_000308-401).
Talmor, Sharona, "Hit and Miss—For Accurate Targeting of Customers, Banks Need More Than Databases—They Need the Right Information," The Banker, vol. 144, No. 818, Apr. 1, 1994 (PHX-NATIONWIDE-DEFS_000402-405).
Donnelly, R.R., Farm Journal Magazines, Mar. 1988 (PHX-NATIONWIDE-DEFS_000406-430).
Donnelly, R.R., Selectronic Promotional Material, 1986-1994 (PHX-NATIONWIDE-DEFS_000431-475).
Meyer, Marc H. et al., "The Design and Development of Information Products," Sloan Management Review, Massachusetts Institute of Technology, Spring 1996 (PHX-NATIONWIDE-DEFS_000476-495).
Pine, B. Joseph, "Mass Customization, the New Frontier in Business Competition," Harvard Business School Press, 1993 (PHX-DEFS_0010454-0010637) (divided into two parts: Part 1 of 2).
Pine, B. Joseph, "Mass Customization, the New Frontier in Business Competition," Harvard Business School Press, 1993 (PHX-DEFS_0010454-0010637) (divided into two parts: Part 2 of 2).
Kotler, Philip et al., "Marketing Management," Eighth Edition, Prentice Hall, 1994 (PHX-DEFS_0010638-0010980) (divided into three parts: Part 1 of 3).
Kotler, Philip et al., "Marketing Management," Eighth Edition, Prentice Hall, 1994 (PHXDEFS_0010638-0010980) (divided into three parts: Part 2 of 3).
Kotler, Philip et al., "Marketing Management," Eighth Edition, Prentice Hall, 1994 (PHXDEFS_0010638-0010980) (divided into three parts: Part 3 of 3).
"Defendants' Joint Preliminary Invalidity Contentions," in the United States District Court for the Eastern District of Texas, Marshall Division, *Phoenix Licensing LLC, et al. v. Nationwide Mutual Insurance Company, et al.*, Civil Action No. 2:12-CV-208-JRG-RSP, filed Oct. 31, 2012, 442 pages.
Appendix A re above #72: Claim Chart:: '434 Patent in view of "Direct Marketing to Consumers" by Roscitt et al. article, 52 pages.
Appendix A re above #72: Claim Chart: '434 Patent in view of "eGenie Site Leads Way in Personalization," Dysart article, 30 pages.
Appendix A re above #72: Claim Chart: '434 Patent in view of "Remote Shopping the British Way," Hanover article, 25 pages.
Appendix A re above #72: Claim Chart: '434 Patent in view of Deaton '165 Patent, 32 pages.
Appendix A re above #72: Claim Chart: '434 Patent in view of Miller et al. '653 Patent, 80 pages.
Appendix A re above #72: Claim Chart: '434 Patent in view of Langenkamp et al. '867 Patent, 63 pages.
Appendix A re above #72: Claim Chart: '434 Patent in view of Dedtrick '521 Patent, 56 pages.
Appendix A re above #72: Claim Chart: '434 Patent in view of Jacobs '142 Patent, 80 pages.
Appendix A re above #72: Claim Chart: '434 Patent in view of "Romancing the Segment of One" Betts article, 36 pages.
Appendix A re above #72: Claim Chart: '434 Patent in view of "A New Base for Bank Marketing" Borowsky article, 44 pages.
Appendix A re above #72: Claim Chart: '434 Patent in view of "Those 'Pre-Approved' Credit Card Come-Ons," Campbell article, 49 pages.
Appendix A re above #72: Claim Chart: '434 Patent in view of "Leveraging the Consumer Database to Your Competitive Advantage," Goodman article, 66 pages.
Appendix A re above #72: Claim Chart: '434 Patent in view of "The Complete Database Marketer," Hughes article, 61 pages.
Appendix A re above #72: Claim Chart: '434 Patent in view of "Customize Your Cross-Sell," Morrall article, 45 pages.
Appendix A re above #72: Claim Chart: '434 Patent in view of "Marketing Through Automation," Nevin article, 38 pages.
Appendix A re above #72: Claim Chart: '434 Patent in view of "Database Marketing Past, Present, and Future," Petrison article, 67 pages.

Appendix A re above #72: Claim Chart: '434 Patent in view of "Automated Marketing: the key to growth," Pope article, 42 pages.
Appendix A re above #72: Claim Chart: '434 Patent in view of "The New Direct Marketing: How to Implement a Profit-Driven Database Marketing Strategy," Shepard article, 96 pages.
Appendix A re above #72: Claim Chart: '434 Patent in view of "Bear Creek Builds In-House Gold Mine," Shorland article, 62 pages.
Appendix A re above #72: Claim Chart: '434 Patent in view of Atkins '085 Patent, 42 pages.
Appendix A re above #72: Claim Chart: '434 Patent in view of Lockwood '355 Patent, 48 pages.
Appendix A re above #72: Claim Chart: '434 Patent in view of "The Database Marketing Imperative" Vavra article, 61 pages.
Appendix A re above #72: Claim Chart: '434 Patent in view of "Can Marketing regain the Personal Touch" Child et al. article, 33 pages.
Appendix A re above #72: Claim Chart: '434 Patent in view of "Database Marketing" Nash article, 61 pages.
Appendix A re above #72: Claim Chart: '434 Patent in view of "How Its Changing Your Business" Mann article, 75 pages.
Appendix A re above #72: Claim Chart:: '434 Patent in view of Lockwood '359 Patent, 56 pages.
Appendix A re above #72: Claim Chart: '434 Patent in view of Forseman '422 Patent, 55 pages.
Appendix A re above #72: Claim Chart: '434 Patent in view of Johnson '525 Patent, 138 pages.
Appendix A re above #72: Claim Chart: '434 Patent in view of Tyler et al. '942 Patent, 47 pages.
Appendix A re above #72: Claim Chart: '434 Patent in view of Jacobs '746 Patent, 34 pages.
Appendix A re above #72: Claim Chart: '434 Patent in view of Lockwood '951 Patent, 43 pages.
Appendix A re above #72: Claim Chart: '434 Patent in view of "MCIFs help piece together profitable profiles," Morrall article, 83 pages.
Appendix A re above #72: Claim Chart: '434 Patent in view of "Automating the Marketing Process," Bartosh article, 25 pages.
Appendix A re above #72: Claim Chart: '434 Patent in view of "Database Marketing: Its All in Your Head!," Conference Proceedings, NCDM Orlando '94 (CUNA 0047140), 126 pages.
Appendix A re above #72: Claim Chart: '434 Patent in view of "Mass Customization, The New Frontier in Business Competition," Pine article, 7 pages.
Appendix A re above #72: Claim Chart: '434 Patent in view of "Marketing Management," Pine article, 7 pages.
Appendix B re above #72: Claim Chart: '938 Patent in view of Motoyama '202 Patent, 70 pages.
Appendix B re above #72: Claim Chart: '938 Patent in view of Whitmyer '468 Patent, 127 pages.
Appendix B re above #72: Claim Chart: '938 Patent in view of St. Denis WO 99/33012 Patent Publication, 46 pages.
Appendix B re above #72: Claim Chart: '938 Patent in view of Boe et al. '975 Patent, 52 pages.
Appendix B re above #72: Claim Chart: '938 Patent in view of Angles et al. '811 Patent, 79 pages.
Appendix B re above #72: Claim Chart: '938 Patent in view of Jones et al. '397 Patent, 91 pages.
Appendix B re above #72: Claim Chart: '938 Patent in view of Lazarus et al. '532 Patent, 58 pages.
Appendix B re above #72: Claim Chart: '938 Patent in view of Beck '139 Patent, 45 pages.
Appendix B re above #72: Claim Chart: '938 Patent in view of Kepecs '543 Patent, 67 pages.
Appendix B re above #72: Claim Chart: '938 Patent in view of Beck '154 Patent, 60 pages.
Appendix B re above #72: Claim Chart: '938 Patent in view of Horowitz '290 Patent, 84 pages.
Appendix B re above #72: Claim Chart: '938 Patent in view of Tilden, Jr. et al. '635 Patent, 40 pages.
Appendix B re above #72: Claim Chart: '938 Patent in view of Todd '418 Patent, 51 pages.
Appendix B re above #72: Claim Chart: '938 Patent in view of Shane '972 Patent, 65 pages.
Appendix B re above #72: Claim Chart: '938 Patent in view of Shane '972 Patent, 83 pages.
Appendix B re above #72: Claim Chart: '938 Patent in view of Dedtrick '521 Patent, 56 pages.
Appendix B re above #72: Claim Chart: '938 Patent in view of Sheflott '493 Patent, 44 pages.
Appendix B re above #72: Claim Chart: '938 Patent in view of "How It's Changing Your Business," Mann article, 101 pages.
Appendix B re above #72: Claim Chart: '938 Patent in view of "Interactive Ads," Wilder Article, 56 pages.
Appendix B re above #72: Claim Chart: '938 Patent in view of "Taking Control of Information Fulfillment," Hertzog et al. article, 57 pages.
Appendix B re above #72: Claim Chart: '938 Patent in view of "World Wide Winner," 56 pages.
Appendix B re above #72: Claim Chart: '938 Patent in view of "IBWs and related publications," 76 pages.
Appendix B re above #72: Claim Chart: '938 Patent in view of "Comerica Website Screenshots (1998-1999)," 104 pages.
Appendix B re above #72: Claim Chart: '938 Patent in view of "QuickQuote," 52 pages.
Appendix B re above #72: Claim Chart: '938 Patent in view of "Cyberspace Call Centers," 41 pages.
Appendix B re above #72: Claim Chart: '938 Patent in view of "Organizing Today for the Digital Marketing of Tomorrow," Parsons article, 56 pages.
Appendix B re above #72: Claim Chart: '938 Patent in view of "Maybe the Difficulty in the Definition is the Difference," Schultz article, 46 pages.
Appendix B re above #72: Claim Chart: '938 Patent in view of "Direct Marketing to Consumers," Roscitt et al. article, 57 pages.
Appendix B re above #72: Claim Chart: '938 Patent in view of Herz 2001/0014868 Patent Publication, 72 pages.
Appendix B re above #72: Claim Chart: '938 Patent in view of Abelow '908 Patent, 110 pages.
Appendix B re above #72: Claim Chart: '938 Patent in view of Beaumont '647 Patent, 109 pages.
Appendix B re above #72: Claim Chart: '938 Patent in view of "The MarketFirst System," 65 pages.
Appendix B re above #72: Claim Chart: '938 Patent in view of Herz '938 Patent, 82 pages.
Appendix B re above #72: Claim Chart: '938 Patent in view of Stein '996 Patent, 54 pages.
Appendix B re above #72: Claim Chart: '938 Patent in view of Lockwood '951 Patent, 46 pages.
Appendix B re above #72: Claim Chart: '938 Patent in view of Babcock, Jr. '790 Patent, 41 pages.
Appendix B re above #72: Claim Chart: '938 Patent in view of Bezos '141 Patent, 41 pages.
Appendix B re above #72: Claim Chart: '938 Patent in view of Cunningham '645 Patent, 40 pages.
Appendix B re above #72: Claim Chart: '938 Patent in view of Scroggie '469 Patent, 44 pages.
Appendix B re above #72: Claim Chart: '938 Patent in view of Fortenberry '485 Patent, 45 pages.
Appendix B re above #72: Claim Chart: '938 Patent in view of Lent '524 Patent, 56 pages.
Appendix B re above #72: Claim Chart: '938 Patent in view of Lebda '594 Patent, 40 pages.
Appendix B re above #72: Claim Chart: '938 Patent in view of Linden '254 Patent, 39 pages.
Appendix B re above #72: Claim Chart: '938 Patent in view of "WWW Ad Medium," 46 pages.
Appendix B re above #72: Claim Chart: '938 Patent in view of "Viewing the Web," 55 pages.
Appendix B re above #72: Claim Chart: '938 Patent in view of "Internet Application Online Banking," 90 pages.
Appendix B re above #72: Claim Chart: '938 Patent in view of "Interactive Marketing Future Present," 106 pages.
Appendix B re above #72: Claim Chart: '938 Patent in view of "Marketing Opportunities in Digital," 136 pages.
Appendix B re above #72: Claim Chart: '938 Patent in view of "Maximizing Web-based Marketing," 68 pages.

Appendix B re above #72: Claim Chart: '938 Patent in view of "CommerceNet," 72 pages.
Appendix B re above #72: Claim Chart: '938 Patent in view of "Interactivity Reexamined," 91 pages.
Appendix B re above #72: Claim Chart: '938 Patent in view of "Interactivity Ad Effectiveness," 79 pages.
Appendix B re above #72: Claim Chart: '938 Patent in view of "First Premier Prior Art in view of Shane '972," 124 pages.
Appendix B re above #72: Claim Chart: '938 Patent in view of "The New Direct Marketing," Shepard article, 91 pages.
Appendix B re above #72: Claim Chart: '938 Patent in view of "A WWW Interface to a Theorem Prover for Modal Logic," Pitt article, 34 pages.
Appendix B re above #72: Claim Chart: '938 Patent in view of "MCIFs help piece together profitable profiles," Morrall article, 128 pages.
Appendix B re above #72: Claim Chart: '938 Patent in view of "Automating the Marketing Process," Bartosh article, 64 pages.
Appendix B re above #72: Claim Chart: '938 Patent in view of Warady '522 Patent, 33 pages.
Appendix B re above #72: Claim Chart: '938 Patent in view of Rice '947 Patent, 129 pages.
Appendix B re above #72: Claim Chart: '938 Patent in view of "Progressive's 1995-1998 Interactive Rating Program," 24 pages.
Appendix B re above #72: Claim Chart: '938 Patent in view of "Proposal for Philip Morris U.S.A. for Integrated Response Information System," Strategic Information Associates, Oct. 30, 1996, STAR 2000 Proposal, 77 pages.
Appendix C re above #72: Claim Chart: '366 Patent in view of Atkins '085 Patent, 31 pages.
Appendix C re above #72: Claim Chart: '366 Patent in view of Lockwood '355 Patent, 32 pages.
Appendix C re above #72: Claim Chart: '366 Patent in view of "Database Marketing," Nash article, 44 pages.
Appendix C re above #72: Claim Chart: '366 Patent in view of "How It's Changing Your Business," Mann article, 39 pages.
Appendix C re above #72: Claim Chart: '366 Patent in view of "How Guardian Got to Grips With its Database," Schapiro article, 27 pages.
Appendix C re above #72: Claim Chart: '366 Patent in view of "How KeyCorp Competes With Breakthrough Marketing," Cone article, 30 pages.
Appendix C re above #72: Claim Chart: '366 Patent in view of Tyler et al. '942 Patent, 34 pages.
Appendix C re above #72: Claim Chart: '366 Patent in view of Deaton '165 Patent, 22 pages.
Appendix C re above #72: Claim Chart: '366 Patent in view of Deaton '322 Patent, 23 pages.
Appendix C re above #72: Claim Chart: '366 Patent in view of Cyman '302 Patent, 39 pages.
Appendix C re above #72: Claim Chart: '366 Patent in view of Day et al. '175 Patent, 22 pages.
Appendix C re above #72: Claim Chart: '366 Patent in view of Anderson et al. '396 Patent, 64 pages.
Appendix C re above #72: Claim Chart: '366 Patent in view of Bauchner '153 Patent, 39 pages.
Appendix C re above #72: Claim Chart: '366 Patent in view of "How Vons Makes it Work," Anonymous Article, 23 pages.
Appendix C re above #72: Claim Chart: '366 Patent in view of "Database Marketing: A potent new tool for selling," Business Week Article, 56 pages.
Appendix C re above #72: Claim Chart: '366 Patent in view of Stein et al. '306 Patent, 56 pages.
Appendix C re above #72: Claim Chart: '366 Patent in view of Lalonde '383 Patent, 84 pages.
Appendix C re above #72: Claim Chart: '366 Patent in view of Foresman '587 Patent, 115 pages.
Appendix C re above #72: Claim Chart: '366 Patent in view of Foresman '422 Patent, 19 pages.
Appendix C re above #72: Claim Chart: '366 Patent in view of Filepp et al. '632 Patent, 31 pages.
Appendix C re above #72: Claim Chart: '366 Patent in view of "Signet Money Market Account Mailing Fusion Marketing Group," 96 pages.
Appendix C re above #72: Claim Chart: '366 Patent in view of "Sunburst Bank Dec. 1993 Mutual Fund Mailing Fusion Marketing Group," 61 pages.
Appendix C re above #72: Claim Chart: '366 Patent in view of Johnson '331 Patent, 50 pages.
Appendix C re above #72: Claim Chart: '366 Patent in view of Haan '146 Patent, 24 pages.
Appendix C re above #72: Claim Chart: '366 Patent in view of Johnson '290 Patent, 25 pages.
Appendix C re above #72: Claim Chart: '366 Patent in view of Cunningham '645 Patent, 71 pages.
Appendix C re above #72: Claim Chart: '366 Patent in view of "A New Base for Bank Marketing," Borowski article, 27 pages.
Appendix C re above #72: Claim Chart: '366 Patent in view of Brown '368 Patent, 25 pages.
Appendix C re above #72: Claim Chart: '366 Patent in view of "Those, 'Pre-Approved' Credit Card Come-Ons," Campbell article, 26 pages.
Appendix C re above #72: Claim Chart: '366 Patent in view of "Customize Your Cross-Sell," Morrall et al. article, 22 pages.
Appendix C re above #72: Claim Chart: '366 Patent in view of Dedrick '521 Patent, 27 pages.
Appendix C re above #72: Claim Chart: '366 Patent in view of "Direct Marketing to Consumers," Roscitt et al. article, 23 pages.
Appendix C re above #72: Claim Chart: '366 Patent in view of "First Premier Prior Art," 35 pages.
Appendix C re above #72: Claim Chart: '366 Patent in view of "Leveraging the Consumer Database to Your Competitive Advantage," Goodman article, 34 pages.
Appendix C re above #72: Claim Chart: '366 Patent in view of "Database Marketing Breakthroughs," Harrison article, 24 pages.
Appendix C re above #72: Claim Chart: '366 Patent in view of "Marketing Through Automation," Nevin article, 24 pages.
Appendix C re above #72: Claim Chart: '366 Patent in view of "Database Marketing Past, Present, and Future," Petrison article, 24 pages.
Appendix C re above #72: Claim Chart: '366 Patent in view of "Romancing the Segment of One," Betts article, 26 pages.
Appendix C re above #72: Claim Chart: '366 Patent in view of Miller et al. '653 Patent, 27 pages.
Appendix C re above #72: Claim Chart: '366 Patent in view of Shane '972 Patent, 49 pages.
Appendix C re above #72: Claim Chart: '366 Patent in view of Lawlor '501 Patent, 29 pages.
Appendix C re above #72: Claim Chart: '366 Patent in view of Riley '818 Patent, 20 pages.
Appendix C re above #72: Claim Chart: '366 Patent in view of Lloyd '648 Patent, 16 pages.
Appendix C re above #72: Claim Chart: '366 Patent in view of Jackson '982 Patent, 15 pages.
Appendix C re above #72: Claim Chart: '366 Patent in view of Weiss '889 Patent, 15 pages.
Appendix C re above #72: Claim Chart: '366 Patent in view of Melchione '764 Patent, 15 pages.
Appendix C re above #72: Claim Chart: '366 Patent in view of Geerlings '693 Patent, 14 pages.
Appendix C re above #72: Claim Chart: '366 Patent in view of Donahue '480 Patent, 39 pages.
Appendix C re above #72: Claim Chart: '366 Patent in view of "Bank Marketing Chapter 10," Science Direct article, 24 pages.
Appendix C re above #72: Claim Chart: '366 Patent in view of "Automating the Marketing Process," Bartosh article, 27 pages.
Appendix C re above #72: Claim Chart: '366 Patent in view of "Shopping for Sales Software," Boone article, 46 pages.
Appendix C re above #72: Claim Chart: '366 Patent in view of "Outsourcing helps DIRECTV focus on subscribers," Managing Office Technology article, 38 pages.
Appendix C re above #72: Claim Chart: '366 Patent in view of "Client Write-Up: Conquer the Mountain," Giovetti article, 26 pages.
Appendix C re above #72: Claim Chart: '366 Patent in view of "Mail Merge," Heid article, 65 pages.

Appendix C re above #72: Claim Chart: '366 Patent in view of "Hybrid mail: Re-Engineering Business Communications," Jones article, 33 pages.
Appendix C re above #72: Claim Chart: '366 Patent in view of "MCIFs help piece together profitable profiles," Morrall article, 57 pages.
Appendix C re above #72: Claim Chart: '366 Patent in view of "Do You Want to Keep Your Customers Forever?," Pine article, 21 pages.
Appendix C re above #72: Claim Chart: '366 Patent in view of "New Techniques in Direct Marketing," Shumrak article, 28 pages.
Appendix C re above #72: Claim Chart: '366 Patent in view of Selectronic Material, 41 pages.
Appendix C re above #72: Claim Chart: '366 Patent in view of Farm Journal Magazines, 15 pages.
Appendix C re above #72: Claim Chart: '366 Patent in view of Progressive's 1995-1997 Interactive Motorcycle Quoting Program, 11 pages.
Appendix C re above #72: Claim Chart: '366 Patent in view of "Database Marketing: It's All in Your Head!," The National Center for Database Marketing, Inc., Conference Proceedings, NCDM Orlando '94, 160 pages.
Appendix C re above #72: Claim Chart: '366 Patent in view of "Mass Customization, The New Frontier in Business Competition," Pine article, 12 pages.
Appendix C re above #72: Claim Chart: '366 Patent in view of "Marketing Management," Kotler article, 12 pages.
Appendix D re above #72: Combinations rendering the '434 obvious, 558 pages.
Appendix E re above #72: Combinations rendering the '938 obvious, 1158 pages.
Appendix E re above #72: Claim Chart: '938 Patent in view of World Wide Winners in view of Reiter, Zetmeir, "Difficulty in the Definition," "Taking Control of Information Fulfillment," or Shane '972, 176 pages.
Appendix E re above #72: Claim Chart: '938 Patent in view of Shane '972 in view of Reiter, Zetmeir, "Difficulty in the Definition," "Taking Control of Information Fulfillment," 140 pages.
Appendix E re above #72: Claim Chart: '938 Patent in view of Horowitz '290 in view of Reiter, Zetmeir, "Difficulty in the Definition," "Taking Control of Information Fulfillment," or Shane '972, 213 pages.
Appendix E re above #72: Claim Chart: '938 Patent in view of Sheflott '493 in view of Reiter, Zetmeir, "Difficulty in the Definition," "Taking Control of Information Fulfillment," or Shane '972, 160 pages.
Appendix E re above #72: Claim Chart: '938 Patent in view of Motoyama '202 in view of Reiter, Zetmeir, "Difficulty in the Definition," "Taking Control of Information Fulfillment," or Shane '972, 192 pages.
Appendix E re above #159: Claim Chart: '938 Patent in view of Jones et al. '397 in view of Reiter, Zetmeir, "Difficulty in the Definition," "Taking Control of Information Fulfillment," or Shane '972, 203 pages.
Appendix F re above #72: Combinations rendering the '366 obvious, 62 pages.
Appendix F re above #159: Claim Chart: '366 Patent in view of "Understanding Consumer Database Marketing," Schoenbachler article and Jackson et al. '982 Patent, 30 pages.
Appendix F re above #159: Claim Chart: '366 Patent in view of "Technology: Hit and Miss—For Accurate Targeting of Customers, Banks Need More Than Databases—They Need the Right Information," Talmor article and Jackson et al. '982 Patent, 30 pages.
Appendix E: Combinations rendering the '938 obvious, 1155 pages (from "Defendants' Joint Preliminary Invalidity Contentions," In the United States District Court for the Eastern District of Texas Marshall Division, *Phoenix Licensing LLC and LPL Licensing, LLC v. Alliance Data Corporation, et al.*, Civil Action No. 2:11-cv-00286-MHS-CMC, filed Jun. 25, 2012).
Third Party Request for Ex Parte Reexamination Request, dated Sep. 11, 2012, for U.S. Patent 6,999,938 (Libman), U.S. Appl. No. 90/012,501, 318 pages.
Schultz, "Maybe the Difficulty in the Definition is the Difference," Journal of Direct Marketing, Winter 1991, vol. 5, No. 1.
Stuart, "World Wide Winners," WebMaster Magazine, Aug. 1997.

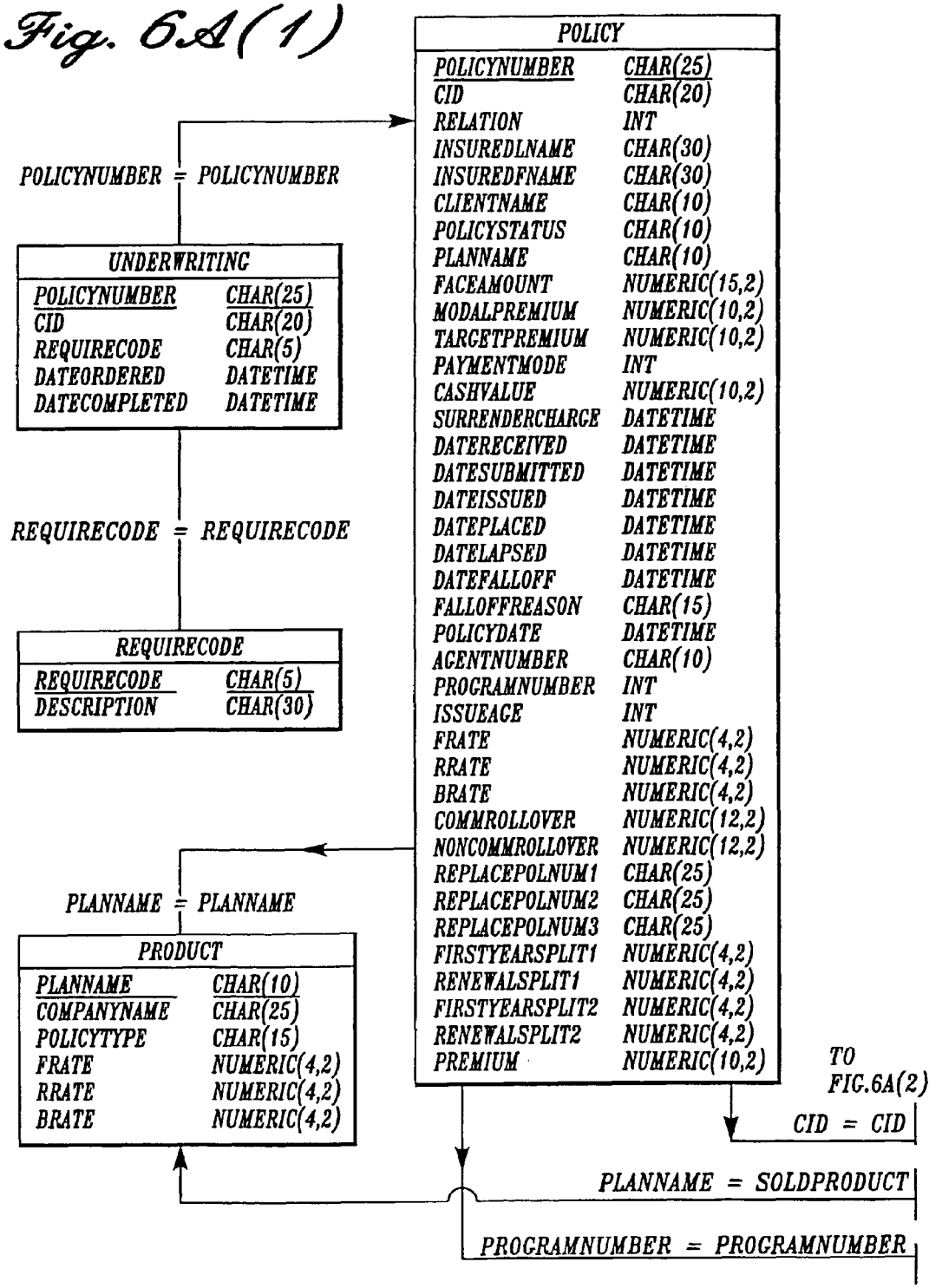
Fig. 6A(1)

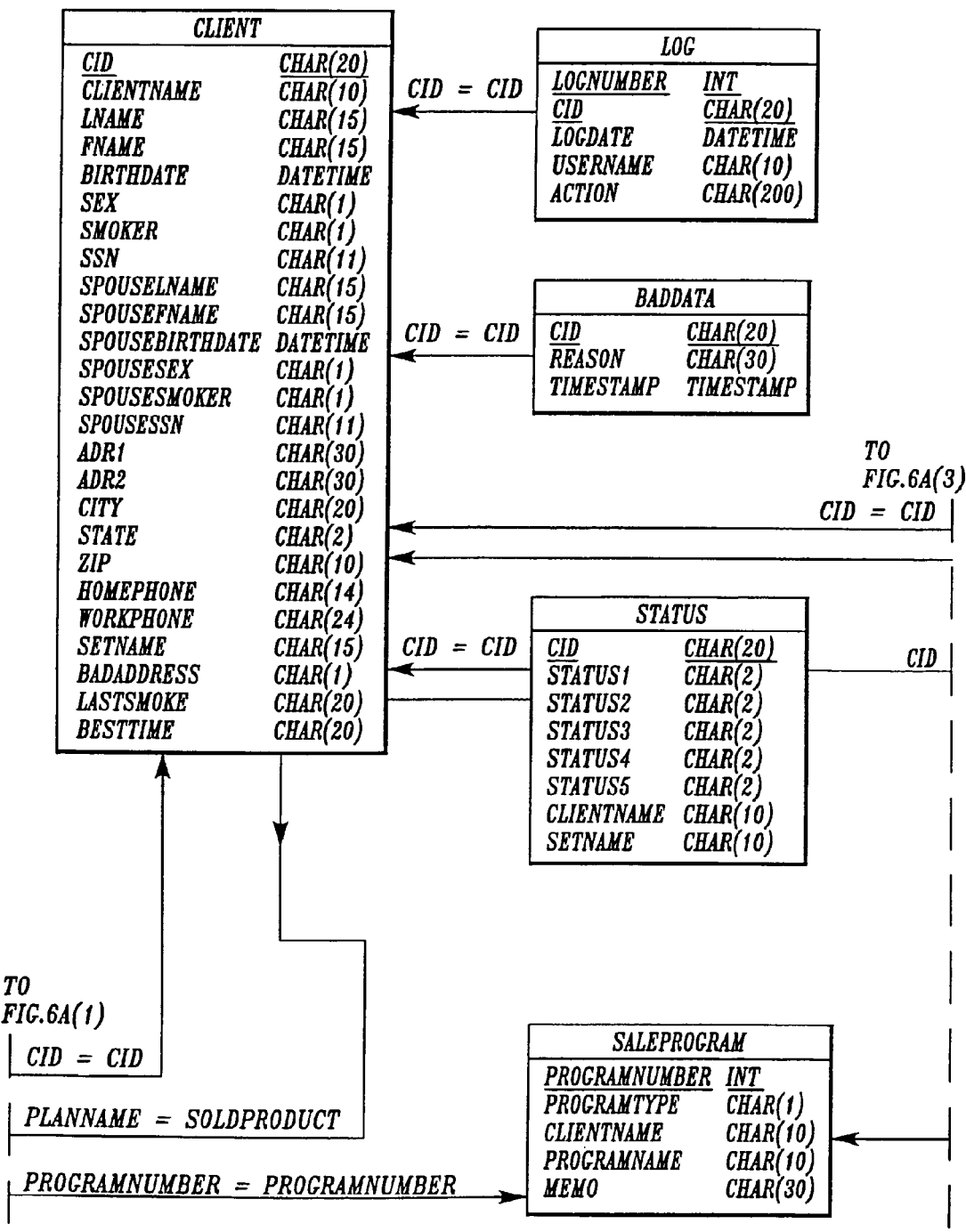
Fig. 6A(2)

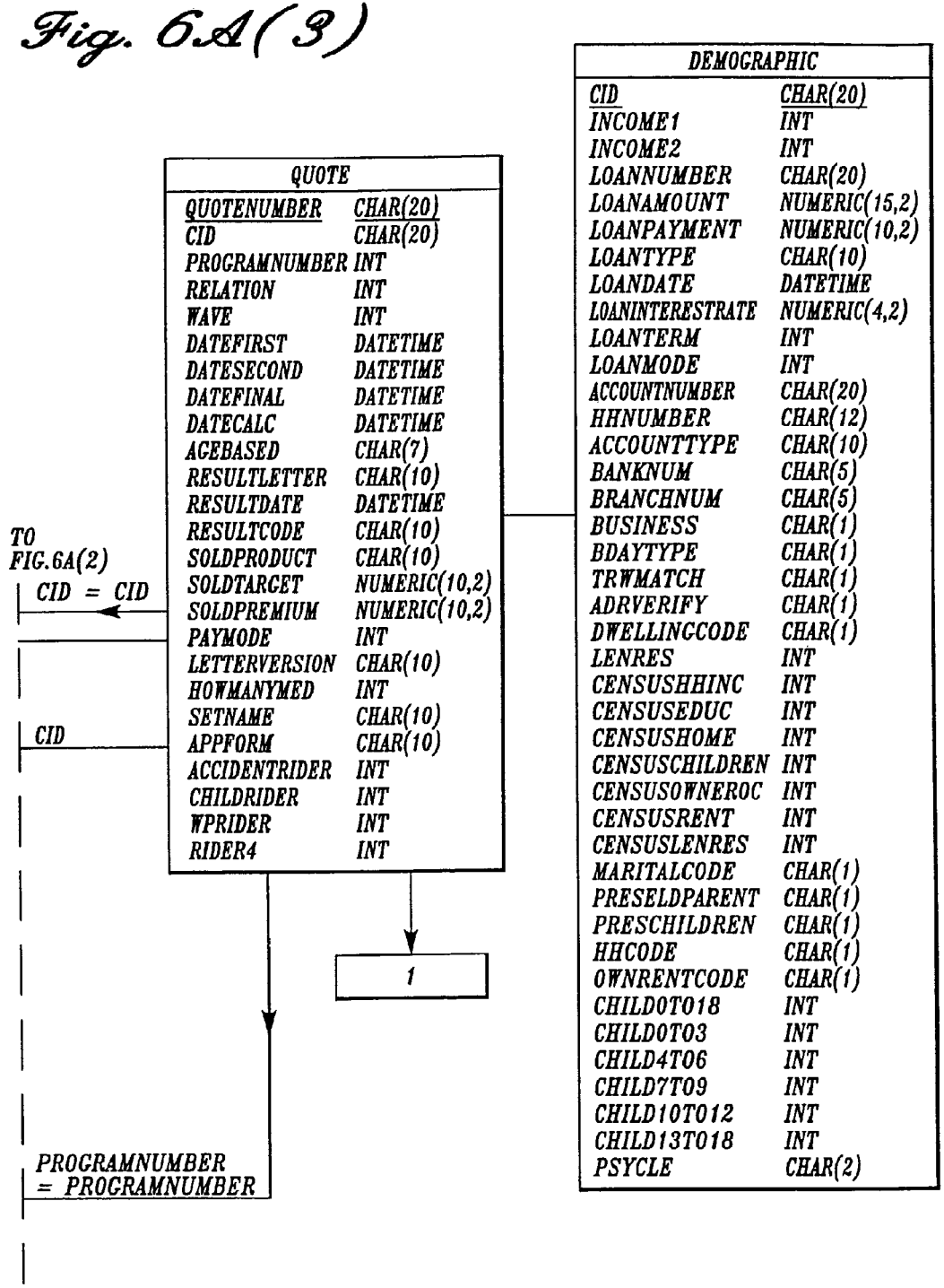
Fig. 6A(3)

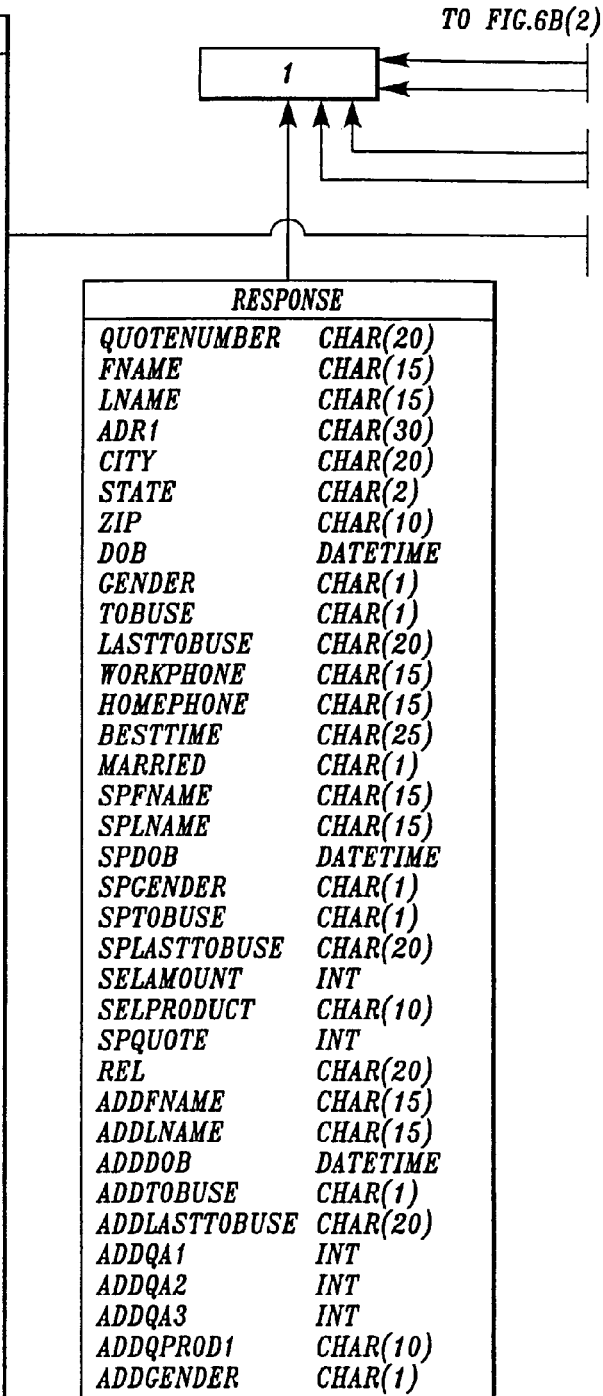
Fig. 6B(1)

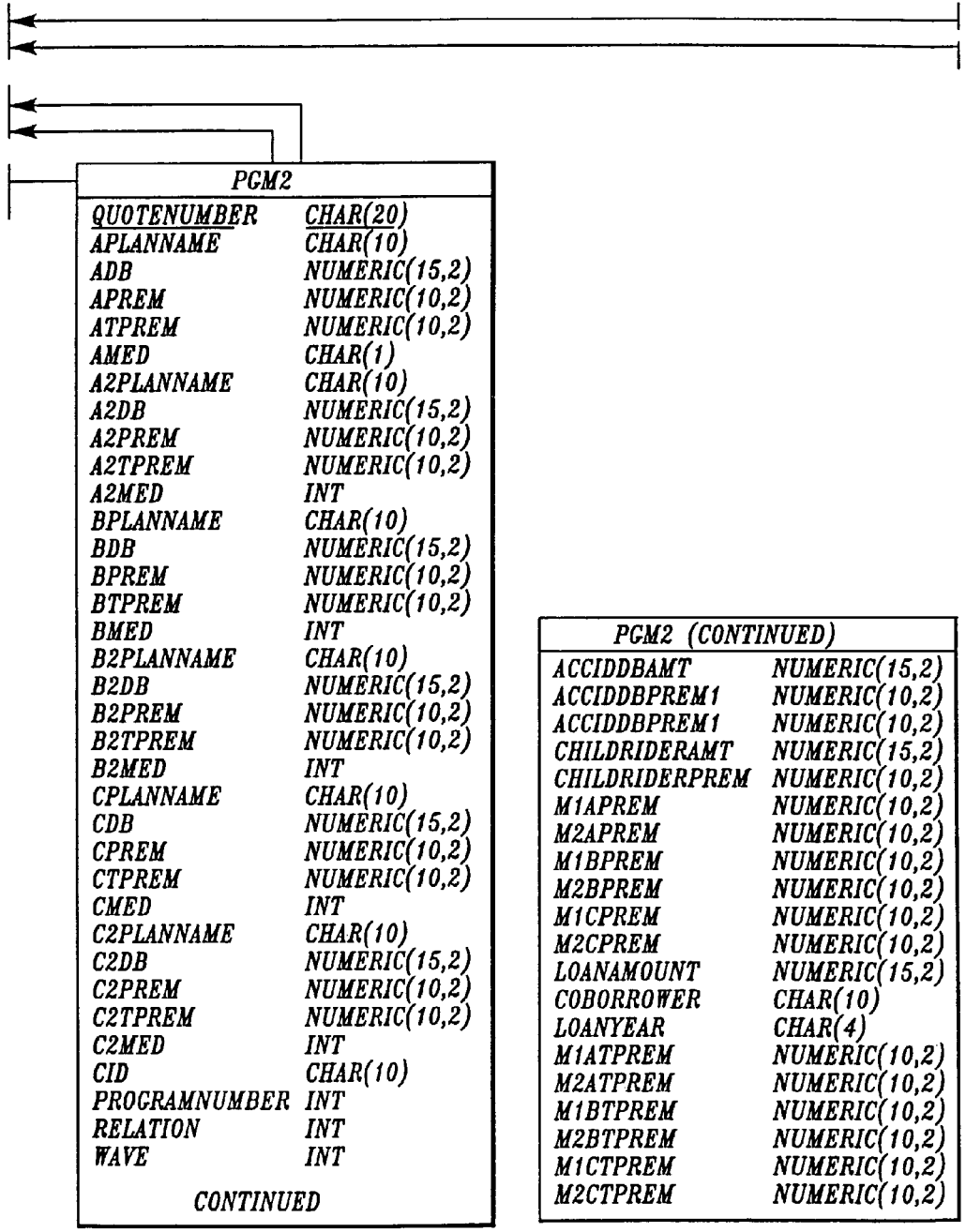
Fig. 6B(2)

| PGM3 | |
|---|---|
| QUOTENUMBER | CHAR(20) |
| APLANNAME | CHAR(10) |
| ADB | NUMERIC(15,2) |
| APREM | NUMERIC(10,2) |
| ATPREM | NUMERIC(10,2) |
| AMED | CHAR(1) |
| A2PLANNAME | CHAR(10) |
| A2DB | NUMERIC(15,2) |
| A2PREM | NUMERIC(10,2) |
| A2TPREM | NUMERIC(10,2) |
| A2MED | INT |
| BPLANNAME | CHAR(10) |
| BDB | NUMERIC(15,2) |
| BPREM | NUMERIC(10,2) |
| BTPREM | NUMERIC(10,2) |
| BMED | INT |
| B2PLANNAME | CHAR(10) |
| B2DB | NUMERIC(15,2) |
| B2PREM | NUMERIC(10,2) |
| B2TPREM | NUMERIC(10,2) |
| B2MED | INT |
| CPLANNAME | CHAR(10) |
| CDB | NUMERIC(15,2) |
| CPREM | NUMERIC(10,2) |
| CTPREM | NUMERIC(10,2) |
| CMED | INT |
| C2PLANNAME | CHAR(10) |
| C2DB | NUMERIC(15,2) |
| C2PREM | NUMERIC(10,2) |
| C2TPREM | NUMERIC(10,2) |
| C2MED | INT |
| CID | CHAR(10) |
| PROGRAMNUMBER | INT |
| RELATION | INT |
| WAVE | INT |
| CONTINUED | |

| PGM3 (CONTINUED) | |
|---|---|
| ACCIDDBAMT | NUMERIC(15,2) |
| ACCIDDBPREM1 | NUMERIC(10,2) |
| ACCIDDBPREM2 | NUMERIC(10,2) |
| WP1APREM | NUMERIC(10,2) |
| WP2APREM | NUMERIC(10,2) |
| WP1BPREM | NUMERIC(10,2) |
| WP2BPREM | NUMERIC(10,2) |
| WP1CPREM | NUMERIC(10,2) |
| WP2CPREM | NUMERIC(10,2) |
| REL | CHAR(10) |
| REL_NAME | CHAR(10) |
| WP1ATPREM | NUMERIC(10,2) |
| WP2ATPREM | NUMERIC(10,2) |
| WP1BTPREM | NUMERIC(10,2) |
| WP2BTPREM | NUMERIC(10,2) |
| WP1CTPREM | NUMERIC(10,2) |
| WP2CTPREM | NUMERIC(10,2) |

| PGM4 | |
|---|---|
| QUOTENUMBER | CHAR(20) |
| APLANNAME | CHAR(10) |
| ADB | NUMERIC(15,2) |
| APREM | NUMERIC(10,2) |
| ATPREM | NUMERIC(10,2) |
| AMED | CHAR(1) |
| A2PLANNAME | CHAR(10) |
| A2DB | NUMERIC(15,2) |
| A2PREM | NUMERIC(10,2) |
| A2TPREM | NUMERIC(10,2) |
| A2MED | INT |
| BPLANNAME | CHAR(10) |
| BDB | NUMERIC(15,2) |
| BPREM | NUMERIC(10,2) |
| BTPREM | NUMERIC(10,2) |
| BMED | INT |
| B2PLANNAME | CHAR(10) |
| B2DB | NUMERIC(15,2) |
| B2PREM | NUMERIC(10,2) |
| B2TPREM | NUMERIC(10,2) |
| B2MED | INT |
| CPLANNAME | CHAR(10) |
| CDB | NUMERIC(15,2) |
| CPREM | NUMERIC(10,2) |
| CTPREM | NUMERIC(10,2) |
| CMED | INT |
| C2PLANNAME | CHAR(10) |
| C2DB | NUMERIC(15,2) |
| C2PREM | NUMERIC(10,2) |
| C2TPREM | NUMERIC(10,2) |
| C2MED | INT |
| SPAPLANNAME | CHAR(10) |
| SPADB | NUMERIC(15,2) |
| SPAPREM | NUMERIC(10,2) |
| SPATPREM | NUMERIC(10,2) |
| SPAMED | CHAR(1) |
| SPA2PLANNAME | CHAR(10) |
| SPA2DB | NUMERIC(15,2) |
| SPA2PREM | NUMERIC(10,2) |
| SPA2TPREM | NUMERIC(10,2) |
| SPA2MED | INT |
| CONTINUED | |

| PGM4 (CONTINUED) | |
|---|---|
| SPBPLANNAME | CHAR(10) |
| SPBDB | NUMERIC(15,2) |
| SPBPREM | NUMERIC(10,2) |
| SPBTPREM | NUMERIC(10,2) |
| SPBMED | INT |
| SPB2PLANNAME | CHAR(10) |
| SPB2DB | NUMERIC(15,2) |
| SPB2PREM | NUMERIC(10,2) |
| SPB2TPREM | NUMERIC(10,2) |
| SPB2MED | INT |
| SPCPLANNAME | CHAR(10) |
| SPCDB | NUMERIC(15,2) |
| SPCPREM | NUMERIC(10,2) |
| SPCTPREM | NUMERIC(10,2) |
| SPCMED | INT |
| SPC2PLANNAME | CHAR(10) |
| SPC2DB | NUMERIC(15,2) |
| SPC2PREM | NUMERIC(10,2) |
| SPC2TPREM | NUMERIC(10,2) |
| SPC2MED | INT |
| CID | CHAR(10) |
| PROGRAMNUMBER | INT |
| RELATION | INT |
| WAVE | INT |
| ACCIDDBAMT | NUMERIC(15,2) |
| ACCIDDBPREM1 | NUMERIC(10,2) |
| ACCIDDBPREM1 | NUMERIC(10,2) |
| WP1APREM | NUMERIC(10,2) |
| WP2APREM | NUMERIC(10,2) |
| WP1BPREM | NUMERIC(10,2) |
| WP2BPREM | NUMERIC(10,2) |
| WP1CPREM | NUMERIC(10,2) |
| WP2CPREM | NUMERIC(10,2) |
| REL | CHAR(10) |
| REL_NAME | CHAR(10) |
| WP1ATPREM | NUMERIC(10,2) |
| WP2ATPREM | NUMERIC(10,2) |
| WP1BTPREM | NUMERIC(10,2) |
| WP2BTPREM | NUMERIC(10,2) |
| WP1CTPREM | NUMERIC(10,2) |
| WP2CTPREM | NUMERIC(10,2) |
| OOM | CHAR(20) |

Fig. 6B(4)

SYSTEM AND METHOD FOR AUTOMATED GENERATION OF COMMUNICATIONS INVOLVING PRODUCTS OR SERVICES

CROSS-REFERENCE TO RELATED APPLICATIONS

This application is a divisional of Ser. No. 11/737,735, filed Apr. 19, 2007, which is a continuation of Ser. No. 11/182,386, filed Jul. 15, 2005, which is a continuation of Ser. No. 09/354,802, filed Jul. 16, 1999, now U.S. Pat. No. 6,999,938, which is a continuation in part of Ser. No. 08/834,240, filed Apr. 15, 1997, now U.S. Pat. No. 6,076,072, which is a continuation in part of Ser. No. 08/661,004, filed Jun. 10, 1996, now U.S. Pat. No. 5,987,434. The subject matter in all the above-identified co-pending and commonly owned applications is incorporated herein by reference.

BACKGROUND OF THE INVENTION

1. Field of the Invention

The present invention relates to methods and apparatus for automatically preparing replies to each purchase or non-purchase response generated from mass marketed communications delivered to clients for products or services, such as financial products and/or financial service-related communications. More specifically, it relates to methods and apparatus suitable for preparing an appropriately customized reply communication to each client in a fully automated or significantly automated manner permitting large numbers (millions) of communications to be prepared and delivered quickly, efficiently, and cost effectively.

2. Description of the Related Art

The importance of widely-distributed written or printed client communications such as advertising, solicitations, etc. is well known in the marketing and advertising field. Their applicability to the financial products and services industry also is well known. The revenue generated from sales of various products and services advertised in these solicitations measures in the many millions of dollars per year for all industries. Their revenue generation in the financial industry also has been significant, and this industry has been one of the fastest growing in this area.

Traditionally, client communications of this type have been mass-distributed using techniques such as direct mail. With the increasing use of the Internet, that delivery medium is expected to grow in importance. A substantial drawback of the direct mail (or telemarketing, etc.) approach has always been the relatively significant cost of distributing the communications. The transmitters and distributors of the communications often have been required to bear the expense of the communications themselves, in some cases the envelopes in which they are contained, the labor involved in stuffing the envelopes, the postage, etc. Use of the Internet could eliminate many of these cost factors.

Another disadvantage of traditional mass marketing, especially mass direct marketing, is that it uses a generic communication that is not particularly customized to the needs of a particular client, and partially as a result of this it has a relatively low purchase response rate. Low purchase response rate coupled with high delivery costs reduces the attractiveness and effectiveness of this type of marketing. For example, mass communication by mail may cost of the order of $0.50 for each communication, but this kind of communication has a relatively low "visibility," and often has a purchase response rate of only about two percent (2% or lower), such as in the case of financial and insurance products. The response to telemarketing, which is somewhat more personalized to the particular client, is significantly higher, often in the range of $2.20 per client contacted.

The issue of customizing mass communications to significantly improve response rates and purchase response rates from a large group of clients (numbering in the hundreds of thousands or up to millions) and/or reducing the cost of delivery of the communications has been addressed in our prior U.S. Pat. Nos. 5,987,434 and 6,076,072. In the first of these, we described methods for accessing information from large client data bases, analyzing the data according to a predetermined screening and selection model, and preparing a plurality of customized communications, each one specifically addressed to and designed to meet the most likely needs (based on accessed information) of each of the clients or potential clients ("clients"). These communications could be delivered to the clients in any one of a number of ways, including for example direct mail (expensive) or electronically (for example, inexpensively to those clients who have an internet address). It was recognized, however, that the main medium for direct mass communications was delivery through direct mail, and since this method of communication is relatively expensive, our second U.S. patent application, U.S. Ser. No. 08/834,240, addressed this issue. That application discloses a method of providing the customized communication directed to each particular client on a "host communication" i.e., a communication that would in any event have been sent to that particular client. Thus, the cost of including the customized direct marketing communication as part of the host communication is very low, and the additional cost of mailing the combined communication is normally insignificant.

Thus, the technologies disclosed and claimed in our above-described prior patent applications represent significant advances in mass marketing or mass direct marketing, permitting delivery of customized communications to each client, at significantly reduced cost. These technologies do not, however, address the range of permutations of a client's response. For example, a client may want to purchase, elect not to purchase, request further information, request a modification of the product, etc. However, current mass direct marketing typically only takes into account a purchase/no purchase response. Other responses are generally too time consuming and costly to process and reply to individually so that a potentially large number of purchases are foregone. If these clients have concerns or questions about the product that could be responded to in order to facilitate make a purchase decision, the response rate from mass marketing campaigns could be increased, but current mass marketing response generation and delivery methods costs makes this prohibitive for most direct marketed sales campaigns.

There exists a need in direct marketing for an automatic reply mechanism that is flexible, and able to respond to a wide range of client inquiries, in an ongoing "conversational" manner, that will ultimately increase the rate of purchase responses. Moreover, the automatic reply should be directed to each client's specific response or request, be cost effective, and virtually immediate, so that the client's interest in the product is not diminished by delay. Such an automatic reply system should preferably be able to respond by communicating with the client either through mail, facsimile, e-mail, on a host communication, or by the now evolving voice response technologies, depending upon the type of communication suited to the product or service being marketed or customer preference.

SUMMARY OF THE INVENTION

This Summary of the Invention section is intended to introduce only certain aspects of the invention and is not a complete disclosure of the invention. Particular aspects of the invention are pointed out in other sections here below, and the invention is set forth in the appended claims, which alone demarcate its scope.

In one aspect, the invention provides a method for automatically preparing customized replies in response to communications from a plurality of clients. To facilitate automation, each original communication to the client is tagged with a unique label, and the responses from the clients are each correspondingly labeled. Each of the responses that includes a nonpurchase response i.e. a request for further information, a request for a modified product, a request for a different type of quotation, and the like, and is inputted into a system for automatically generating the replies. Each reply that is automatically prepared is tagged with a label that corresponds to the label of the response communication to which it is responsive. The replies are then delivered, each to their respective client, through any one of a variety of means, such as through the internet, through direct mail, inclusion in a host communication, via facsimile, etc.

In another aspect of the invention, customized communications are prepared and sent to a plurality of clients, nonpurchase responses from the clients are processed and automatic replies are generated to each of the responses, each reply is specific to the type of response requested by the client. The method allows further follow up and "conversation" with the client, or may respond to a reply communication with a second response, which will in turn generate an automatic second reply. Likewise, a third response received by the system will automatically generate a third reply. This dialogue continues until the client either makes a purchase or terminates the communication by not responding.

In one aspect of the invention the original client communication sent to each of the plurality of clients is appended to a "host communication," i.e. one that would in the ordinary course of business have been sent to the client for another purpose, and the combined communication may then be delivered at reduced cost. This method of delivery is particularly attractive when the communication is sent by mail, resulting in savings in postage charges. Notwithstanding, this method of communication is also useful when the combined communication is delivered by other means, particularly where the host communication carries important information that a client will be inclined to read, and it will provide encouragement to read the appended communication.

In other aspects of the invention, the original communication is delivered to each of the plurality of clients by transmission through the internet. This means of communication is of relatively low cost, and generally reaches middle to upper income individuals who comprise an important market segment for a wide range of products and services.

Notwithstanding the origin or nature of the original communication, so long as the original communication provides the recipient with a unique identifying "label" that corresponds to and identifies that individual, and further includes a purchase or nonpurchase response option, then the invention may be used to automatically generate replies. When the response is a purchase option, generation of further replies may not be necessary or a reply "thank you" communication may be sent. However, when the response contains requests for nonpurchase information, then the system automatically generates a reply to each of the responses, with each reply tagged with a label corresponding to the label on the response (or initial offer). Thus, a tracking system is established to insure appropriate replies to each response.

In another aspect, the invention also provides an apparatus for automatically preparing replies to client responses. The apparatus comprises means for inputting response option information from the plurality of client responses into a computer-accessible storage medium, preferably by machine. The apparatus further includes processing means, operatively coupled to the storage medium, for using decision information to automatically select variable information for insertion into a reply to a particular client. Output preparing means are in operating communication with the processing means to enable preparation of the reply to the client. The apparatus may also include delivery means.

BRIEF DESCRIPTION OF THE DRAWINGS

The accompanying drawings, which are incorporated in and constitute a part of the specification, illustrate presently preferred embodiments of the invention. These drawings, together with the general description given above and the detailed description of the preferred method and embodiment given below, are intended to explain the principles of the invention and do not limit its scope, which is solely determined by its claims.

DETAILED DESCRIPTION OF THE PREFERRED METHOD AND EMBODIMENT

Figure 1:
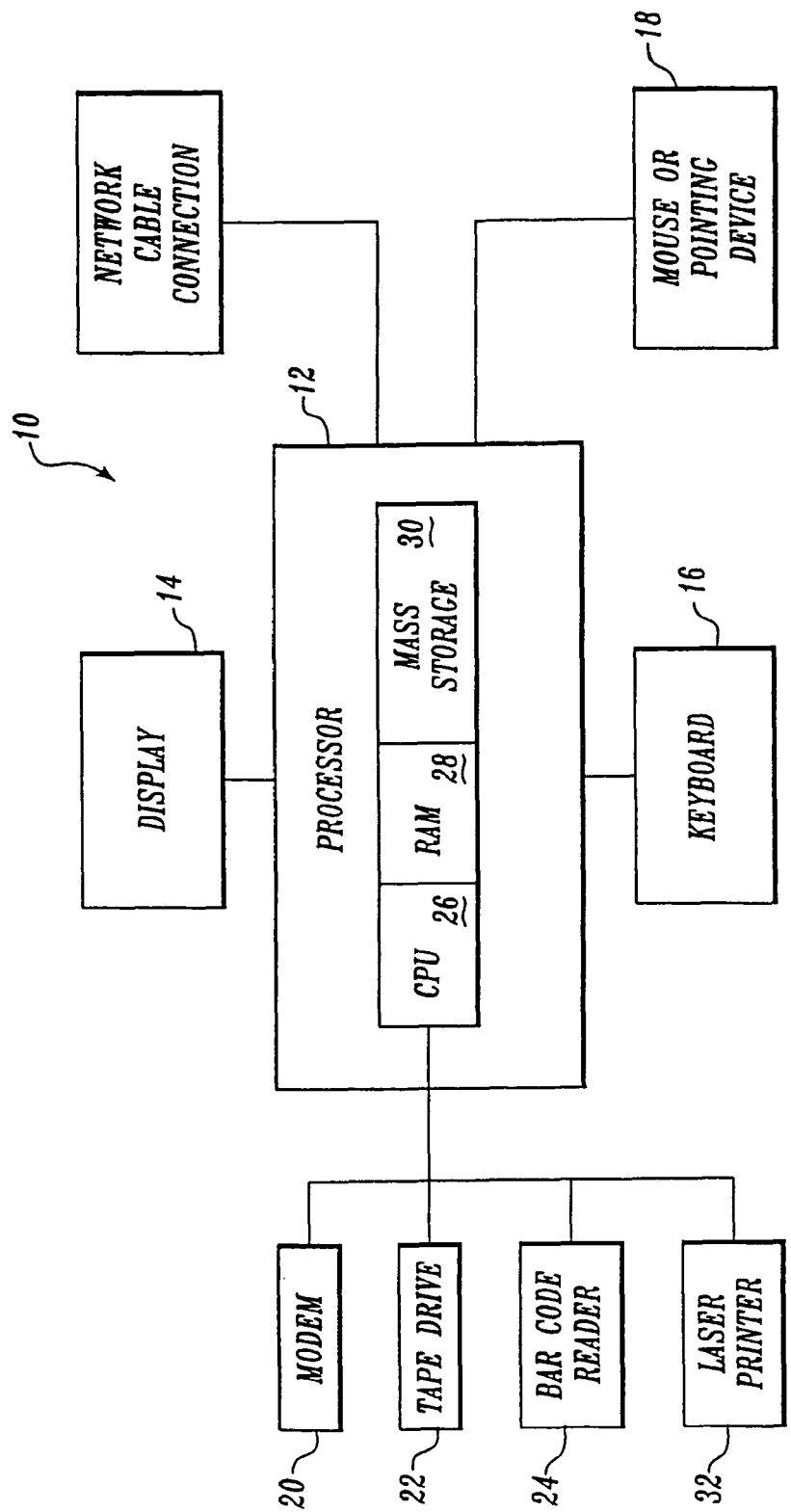
FIG. 1 is a hardware block diagram of the preferred embodiment of the invention.

The following descriptions illustrate aspects of the invention, and point out certain preferred embodiments of these aspects. The explanation is not intended to be exhaustive, but rather to inform the person of skill in the art will come to appreciate more fully other aspects, equivalence, and possibilities presented by the invention, and hence the full scope of the invention as set forth in the claims, upon reading this disclosure.

Reference will now be made in detail to the presently preferred method and the preferred embodiment of the invention as illustrated in the accompanying drawings, in which like reference characters designate like or corresponding parts throughout the drawings. For simplicity and ease of illustration, the preferred apparatus and method according to the invention are described in conjunction with one another. This is not, however, to be construed as necessary or limiting.

In accordance with the invention, an apparatus and method are provided for automatically preparing client communications pertaining to one or more financial products, and/or financial services, and/or financial plans for clients. The apparatus and method may be used to automatically prepare a single client communication or, more preferably, to automatically prepare a plurality of client communications. The client communications preferably are for combined use with corresponding and respective host vehicles for the corresponding and respective clients, which combined communications may be and preferably are delivered to the clients.

"Client" as the term is used here should be interpreted broadly to include an actual client or customer of the user of the system and/or method according to the invention, or the party for whom the system and/or method is employed. The term "client" also includes a potential client or customer, or a similar party for whom a communication is prepared. A client is assumed for illustrative purposes here to be a party for whom a client record has been created in the client database as described more fully below.

"Client information" as used here means information which pertains to a particular client, or to a particular set or group of clients. Examples of client information would include a client name, address, telephone number, age, marital status, occupation, employer, financial income, etc. Client information also may include information pertaining to the family or other relations to the client, such as information on the spouse, children, parents, etc., or perhaps to a business associate, such as a business partner, fellow board member or officer, and the like. This category of information also may include psychographic and demographic data pertaining the client or clients.

"Client record" as used here means a compilation of information pertaining to a particular client. The client information typically would be collected into an automated or computerized database, which is referred to herein as a "client database." In this context, a client record would be a single record for a given client within the client database. The fields of each client database record would include the various items of client information, examples of which are provided above. The organization of this client information database and the records and fields within it typically would be in conformity with the data organization and structures of known relational databases.

A "client communication" as the term is used herein refers to a communication which is prepared for a given client and which provides information to the client about one or more selected financial products and/or financial services and/or related financial plans. A client communication, for example, might include a solicitation or similar marketing or advertising document in which the one or more financial products, services, etc. are presented to the client in an attempt to sell the product, service, etc. to the client, provide information on the products and services, provide a notice pertaining to such products or services, etc. A client communication may assume the physical form of a paper or papers which would be integrally attached to a host vehicle, a computerized document which is adapted to be incorporated with a computerized host vehicle, an electronic mail document, and the like.

Each client communication according to the invention includes at least one "variable." A "variable" as the term is used herein, which also is referred to as a "variable portion," refers to a portion of a client communication which may vary from client communication to client communication. The variable in a sense serves as a location marker in the client communication, at which location the system and method according to the invention insert or provide certain "variable information" selected by the system and method. The variable information, which may take a number of different forms, is selected using the decision information so that it is appropriate for, and to a certain extent individualized for, a particular client.

"Financial product" as the term is used herein is used in its broad sense to include any financially-related product, service or plan. The term would include, for example, insurance products and services, banking products and services, securities and investment products and services, and the like. Examples of insurance products would include individual life insurance of all types, tax deferred annuities of all types, health insurance of all types, disability insurances of all types, annuities or other timed payment vehicles, and the like. Examples of banking products would include savings-related products and services, demand deposit products and services, loan products and services, credit-related products, etc. Securities and investment products and services would include equity securities, debt securities, mutual funds, money markets, derivatives, etc. The term "plan" is used in its broad sense to include a plan which may incorporate one or more financial products and one or more financial services aimed at achieving a particular objective or set of objectives of the client. For convenience and ease of explanation, the term "financial products" as used hereinbelow may refer to financial products and/or financial services and/or financial plans, and combinations of these.

"Financial product information" as used herein refers to information which identifies, describes, explains or otherwise pertains to the financial product or products (including services and plans) which are to be the subject of some or all of the client communications, as explained more fully below.

"Label" as used herein refers to any means of identifying a communication (including responses and replies) as one relating to a particular client, in other words, it is an identifier that allows tracking of the communications to and from each client to distinguish these from those communications to and from other clients in a plurality of such client communications. Preferably, the label is electronically received or machine readable, such as a bar code, but other identifying labels may also be used, such as a unique identifying number, and the like.

"Letter" as used herein means any communication, whether delivered by mail or by other means, and includes verbal communication.

"Host vehicle" as used here means a vehicle, such as an account statement, notice, letter, etc., other than a client communication, which is to be sent to a client. The term "vehicle" is used here in the sense of a medium for communication, examples of which would include a paper document, and electronic document, a machine-readable medium, and the like. Specific examples of host vehicles would include a bank account statement, credit card account statement, brokerage account statement, billing statement from a local utility, a notice or advisory bulletin, etc. In the context of the illustrative examples provided herein, typically there would be a host vehicle for each client, which host vehicle would provide the statement, notice, etc. The host vehicle typically would constitute the primary purpose for contacting or communicating with the client. The client communication preferably would be attached as an integral part of the host document.

"Host information" would include information which is included within or otherwise pertains to a host vehicle or a collection of host vehicles. Examples of host information would include such things as the type of checking account to which a statement pertains, the bank or other institution which holds the account or which issues a financial product reflected in the host vehicle (e.g., the product provider), the amount of utility services or products reflected in a particular bill, account information, a statement of account, etc.

"Response" refers to a communication from a client in response to an original "client communication" sent to that particular client or a reply communication. The response includes a selection of response options, for example, "buy," "more information," "different amount," etc., depending upon the nature of the product or service being marketed. Of particular interest are responses that select nonpurchase type options (i.e. ones that do not include an order to buy) because, as explained above, traditional mass marketing generally does not permit and generally does not cope with these types of responses. To facilitate the automatic reply scheme of the invention, each response is tagged with a label. Responses can be received by a variety of transmission methods, e.g. electronically from call centers, users of the system, faxes, internet, etc.

"Reply" as used herein means a responsive communication generated by a user of the system of the invention that responds to a "response" from a client. Each reply preferably includes a label corresponding to the label of the client response to which it is responsive. Each reply is preferably individualized beyond merely a name and address of the client, to include such personalized details as specific product information requested, alternative quotations requested, and the like, as discussed herein.

One of many possible embodiments of the apparatus according to the invention is illustrated in FIG. 1. It should be readily understood by those of skill in the art that the apparatus may vary significantly from the example shown, based on the rapid advances in technology that are ongoing in this field. The example shows an embodiment including a computer system using a networked client-server database system architecture with a number of computer nodes or computer workstations. A network server 10 is shown in FIG. 1. Computer workstation nodes would be very similarly configured. In addition to the server and workstation nodes, system nodes also may include output devices, such as laser printers (not shown). Each of the individual computer workstations or nodes within the system includes a processor 12, a display 14, a keyboard 16, a mouse, light pen, or similar pointing device 18, a modem 20, a tape drive 22, and a bar code reader 24.

The processor of each computer node (server or workstation) includes a central processing unit (CPU) 26, random access memory (RAM) 28, and at least one mass storage device 30, such as a hard drive and/or a diskette drive. The design and configuration of CPU 26 is not limiting, and may include any of the CPU designs sold as standard components with high-end IBM-compatible personal computers or business machines. Such processors include Pentium™-type processors from Intel Corp., Santa Clara, Calif., Power PC processors from IBM Corp., and their substantial equivalents. With the continuous and ongoing improvements in computer and electronic technology, many modifications may be made to the specific nature of hardware components required. Accordingly, one of skill in the art may select any hardware components that would rapidly and efficiently process the number of client communications anticipated, whether numbering in the hundreds of thousands or in the tens of millions. For example, an IBM-compatible personal computer with about 256 megabytes of RAM, a 500 MHz Pentium III processor and a hard-drive of about 16 gigabytes of storage capacity, as is presently widely commercially available, would find ready application in the apparatus of the invention. The desired speed of the CPU 26 and size of hard drive will depend, as indicated above, on the specific application for which the apparatus must be used, and the volume updated to be handled. The CPUs of network workstations may, for instance comprise PentiumIII-based processors with about 256 megabytes of RAM and about 10 gigabytes of hard disk storage capacity.

Display 14 should be compatible with the processor, and preferably should have a resolution of at least about 800×600 pixels. Many other and better commercially-available monitors would suffice.

Keyboard 16 may be any modern keyboard which is compatible with the processor. Keyboard 16 comprises a means for the system user to selectively input information, decisional information or criteria, module instructions, and the like into the system where manual input is called for.

The mouse, light pen, track ball or similar pointing device 18 is used to navigate the graphical user interface of the system, which is designed to increase the ease of use of the system, as will be described more fully below. It also comprises means for inputting information into the system, particularly where graphical interface environments are used in implementation. These devices may be obtained from commercially-available sources as off-the-shelf components.

Modem 20 is used for communicating with computer systems remotely from processor 12. The design of modem 20 also is not limiting, and its specific design will depend upon the design of processor 12, the design and configuration of the computer or computers to be communicated with, and similar generally known factors in a given application. In the preferred embodiment of FIG. 1, modem 20 comprises a high speed modem, about 56K baud modem which is compatible with processor 12, such as are commercially available.

Tape drive 22 is optional, but may be used for inputting bulk files and lists, as described in greater detail below. The specific design and configuration of tape drive 22 also will depend to a large extent on the design and configuration of other system components, and on the particulars of the application. In the preferred embodiment of FIG. 1, tape drive 22 comprises a high-capacity digital tape device which may be obtained as an off-the-shelf component from commercial suppliers.

Bar code readers may be used to speed manual input of data and also to record responses and other correspondence from clientive clients. They should be industry-standard readers capable of reading the major bar code formats, such as Code-39 bar codes, and inputting the scanned information to processor 12. An optical scanner (not shown) also may be provided as an optional input device.

The system includes a high-quality laser printer 32, such as any of the high-end commercially-available laser printers available for processors of the type employed in this system. Large-volume commercial laser printers also may be used for producing large quantities of client communications at rapid rates. The system also may include as an output a modem such as modem 20 or similar on-line or networked connection.

Technology of Prior Pending Patent Applications

Before describing in more detail the invention of the present application, an explanation of the technologies of prior U.S. application Ser. Nos. 08/661,004 and 08/834,240 are presented for completeness. These explanations cover present FIGS. 1-17, previously filed and described in those applications.

Figure 2:
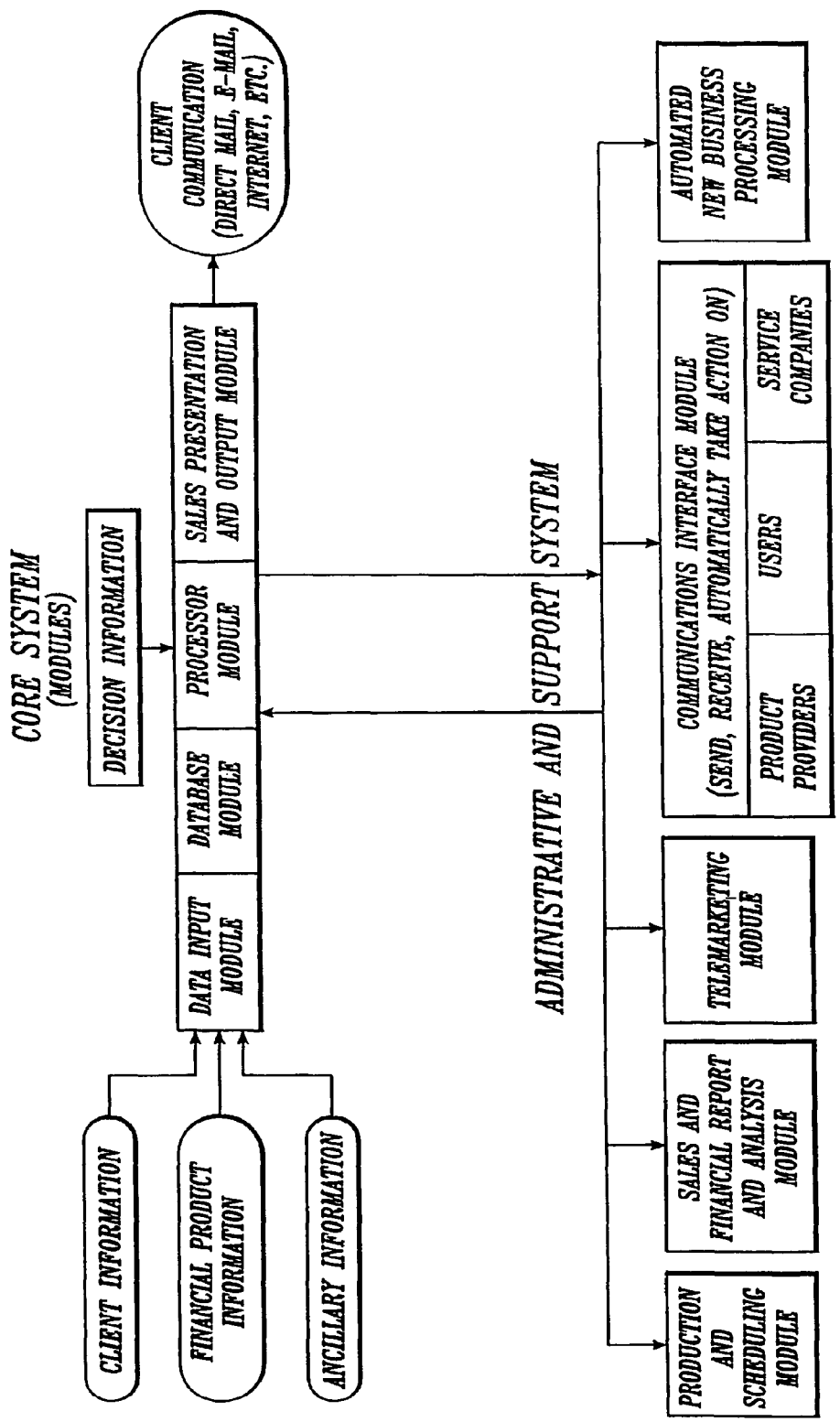
FIG. 2 is a flow chart diagram of system software used in the preferred embodiment of FIG. 1, and which illustrates the preferred embodiment and method of the invention.

Processor 12 has resident within its accessible memory system computer software or system software, a flow diagram of which is shown in FIG. 2. The software has a "core" system for processing tasks such as selecting variable information and preparing client communications. The system software also includes an "administrative and support" system for supporting the core system, facilitating the communication or marketing program, providing administrative and management reports and functions, and other tasks. The core system includes a plurality of modules, including a data input module, a database module, a processor module, and a sales presentation and output module. The administrative and support system includes a production and scheduling module, a sales and financial report and analysis module, a telemarketing module, a communications interface module, and an automated new business processing module. Each of these systems and modules will be described in greater detail below.

Figure 3:
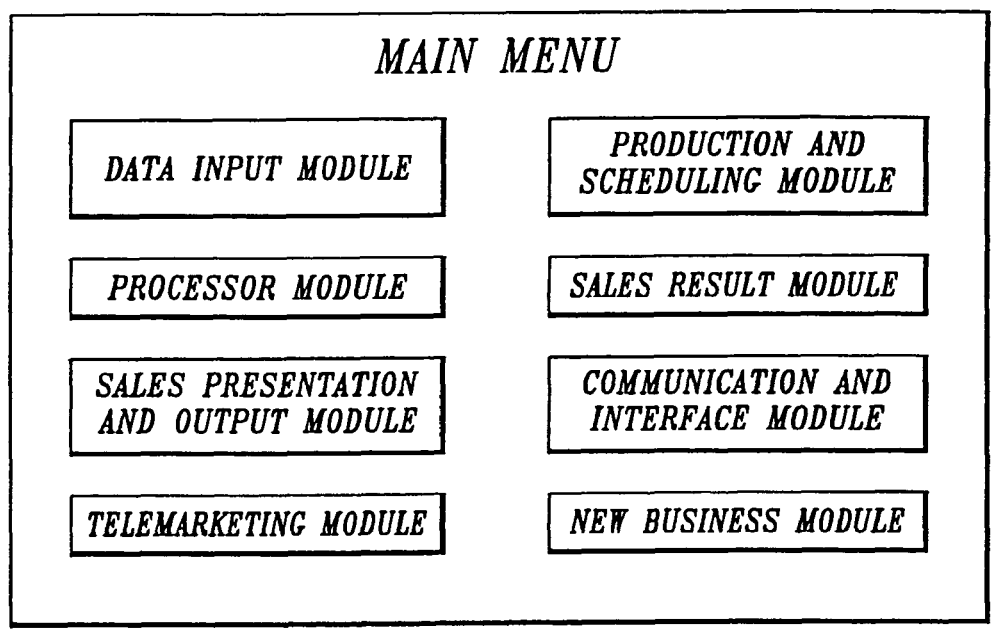
FIG. 3 provides an illustrative main menu for the system software generally depicted in FIG. 2.

In accordance with the preferred embodiment and method, an example of a main menu for the system software is shown in FIG. 3. This menu includes a plurality of buttons corresponding to the modules of the system as depicted in FIG. 2.

Figure 4:
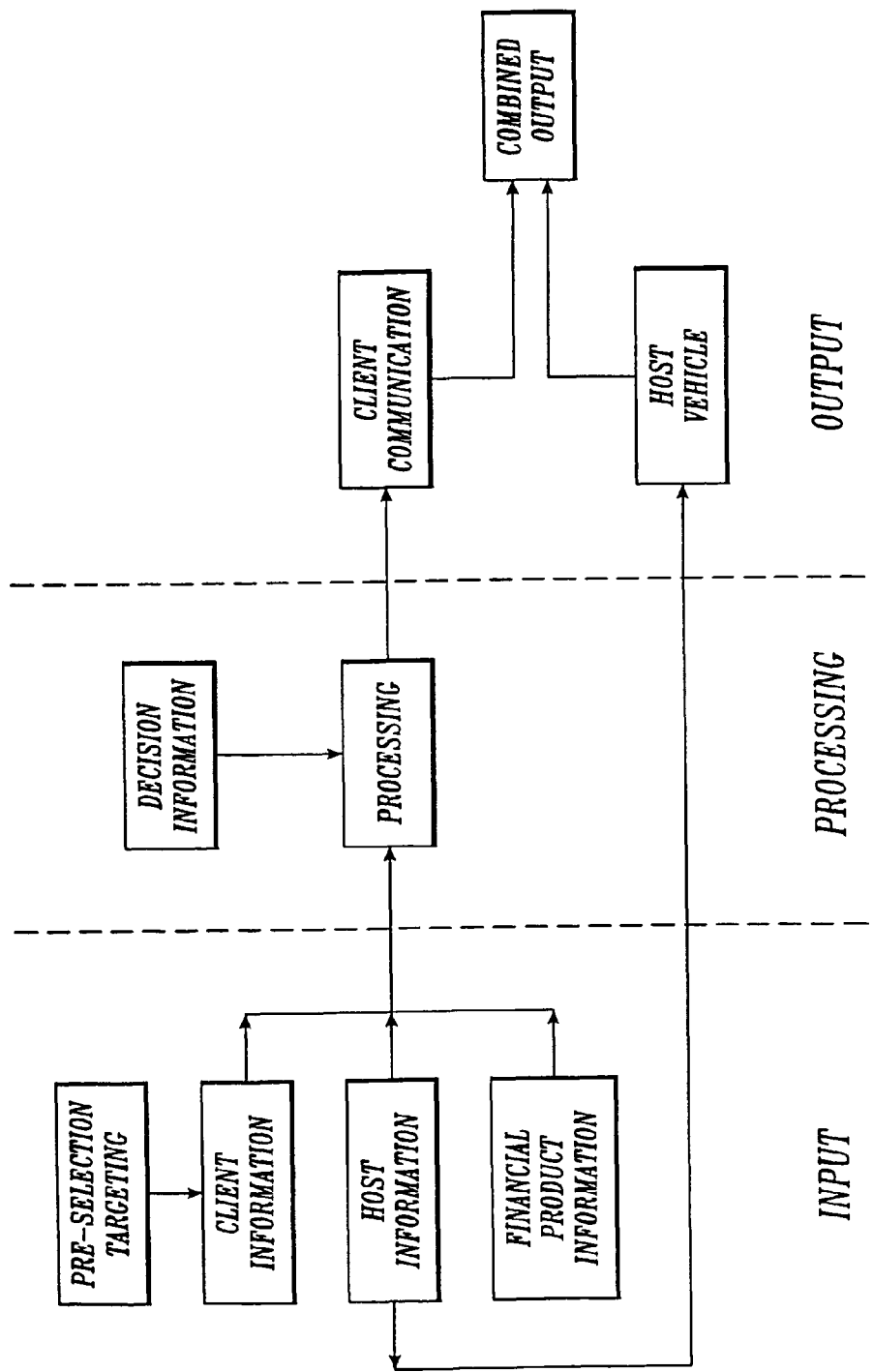
FIG. 4 is a flow diagram which illustrates a preferred method according to the invention.

A flow diagram which outlines steps of the preferred method is shown in FIG. 4. Referring to the left portion of the diagram, the method includes a step of inputting information of various types into the system. Although the specific forms of information to be inputted will vary from application to application, they generally will include client information. This client information may be pre-selected or pre-sorted, for example, using known market segmentation or targeting techniques, or what has been referred to recently as "database mining." Financial product information, and in some cases host information, also may serve as inputs.

The preferred method also includes a processing step (center of FIG. 4) in which decision information is used to automatically select variable information for inclusion or provision in the client communication or communications. The output of the processing step (right portion of FIG. 4) is one or more client communications which include the variable information. The variable information is used to make the client communications highly individualized or personalized. The client communications are adapted to be combined with corresponding host vehicles for the respective clients to create a corresponding plurality of combined outputs. This combination can be very advantageous over prior known methods, e.g., based upon the ability to make the client communications highly personalized and at the same time delivering the client communication together with the host vehicle to achieve the corresponding cost savings.

As an initial step in the preferred method, one generally would determine the financial product or products which are to be presented in the client communications. This selection may be made, for example, based upon the nature of the client population itself, the desired financial product or products to be offered, etc. It should be appreciated that this step need not necessary occur first. The selection of financial products, for example, may be one of the functions which the system performs, e.g., during its processing step as described more fully below.

The preferred method includes a step of providing a format for the client communication wherein the client communication format includes a variable portion. Each of the client communications includes at least one variable or variable portion in which variable information is inserted or otherwise provided. The variable information is selected based upon the decision information. These aspects and features of the invention will be described more fully below.

The term "format" is used according to its common meaning and refers to the general layout and appearance of the communication. The format may assume any one of a wide variety of forms, depending upon the financial product or products involved, the intended client base, the communication medium, the desired or available space, the tastes and specific needs of the communication designer, etc. Formatting inputs would include such things as typographical formatting information (e.g., top, bottom and side margins), fonts, graphics, displays and display locations, etc. The format also may include content designations. In more advanced applications, a plurality of formats may be selected, and the system and method may be adapted to select from among the formats for a given client and client communication. For illustrative purposes herein we will use single-format examples, rather than a set of communication formats from which the system and method would select on a client-by-client basis. Sample client communication formats are attached hereto as Appendix 1 and Appendix 2. These samples, which are merely illustrative and not limiting, might be attached to a bank statement (a sample host vehicle), and would be used for marketing individual life insurance. Note that each begins as page 3 of 4 pages. Pages 1 and 2 in this illustrative example would be the host vehicle.

The communication format includes at least one variable or variable portion, as noted above. Preferably, the format of each communication will include a plurality of variables or variable portions. Each of these variables constitutes a portion or segment of the client communication which, in the actual communications, will vary from client to client, and from client communication to client communication. The variable may assume any one or combination of a wide variety of informational types and content components. Examples would include client information (generally other than a client identification), financial product information, ancillary data, variable text, etc. A given communication format may include a plurality of variables of a given type, e.g., all client information, or it may comprise different types of variables, e.g., client information, financial product information, etc.

The preferred method includes steps of inputting into a computer-accessible storage medium variable information other than a client identification, and inputting into the storage medium decision information. The preferred apparatus similarly is provided with appropriate input means for inputting these and other various categories of information into a computer-accessible storage medium. The method and apparatus of the invention are adapted to process various types of information in generating and outputting the client communications. The flexibility and variability of the specific types of information which may be used, and the specific manner in which the information may be used, comprise significant advantages of the invention over prior known systems and methods.

Initial system inputs typically and preferably would include client information, financial product information, decision information, text information, and in some applications ancillary information. Any one of these classes of information could comprise variable information, although decision information often is used primarily for internal systems purposes.

The types and amounts of client information provided to the system and used in the method will depend upon the types and amounts available, the desired client communication format, the decisional information or logic to be used, etc. Client information may comprise a variety of types of information pertaining to a particular client, or to a particular class of clients. In most instances, this client information will include a client identification. "Client identification" as used herein includes the information about the client which uniquely identifies a given client and permits correspondence or communications to be forwarded to the client. In most instances this client identification constitutes the client's name, or the client's name and post office address. A client account number also may be included. This term is intended to be construed narrowly, for example, to include only the minimum information, usually name and postal address, necessary to uniquely identify the client and forward the communication to the client. It would not include, for example, information which may happen to be unique to the client and may uniquely identify the client under analysis, but which information is not typically used to identify the client. Individual components of client identification other than client name also typically would not be included within the scope of the term client identification as used herein. A client's postal zip code used separately from the postal address, for example, would not qualify as the client identification.

A wide variety of types of client information other than the client identification may and often is available. Typical examples might include the client's age, occupation, employer, annual income, marital status, whether he or she smokes, family information, geographic information other than client address information (e.g., zip code, city, county, state, etc.), purchasing information such as purchasing practices and proclivities, client asset information, liability information such as mortgage or loan information, client activity information (e.g., hobbies, sporting activities, etc.), and other psychographic, demographic and general client data or information. A commercial bank or savings and loan which loans on home mortgages, for example, typically would have client information in the form of the address of the mortgaged property, the mortgage loan amount, and the loan origination date. This information would be useful for an individual mortgage life insurance program in which insurance solicitation communications are sent to mortgagee clients.

"Financial product information" as used herein refers to information which identifies, describes, explains or otherwise pertains to the financial product or products (including financial services and financial plans) which are to be the subject of some or all of the client communications. Financial product information includes product pricing information and product non-pricing information. Pricing information includes the pricing for the relevant products, and perhaps other information relevant to pricing, for example, such as the time period during which particular prices will be available, payment terms, available financing terms, etc. Product non-pricing information includes any financial product information other than product pricing information. Examples of product non-pricing information would include product-related descriptions, conditions of offer, classes of clients for whom the product is available (e.g., "issue constraints" as used in the insurance industry), annuity tables, actuarial tables, etc.

The financial product information may pertain to a single product, or to a plurality of different financial products. In the field of insurance, for example, the financial product information may pertain to a non-property and non-casualty insurance product, an individual life insurance product such as term, whole life, universal life and the like, a health insurance product, a disability insurance product, an annuity, and the like, and combinations of these. In the banking area, the financial product information may pertain to a savings product, a checking or demand account product, a loan product, a credit-related product, a retirement product, etc., and combinations of these. In the banking and brokerage firm areas, the financial product information may pertain to such products as an investment product and/or financial security (e.g., stocks and other equities, bonds and other debt instruments, money markets, mutual funds, etc.), derivatives, etc., and combinations. Combinations of financial products across fields, such as banking and insurance, also are possible.

"Ancillary information" as used herein refers to virtually any type of data or information useful for the system (hardware and software of FIGS. 1 and 2) and/or method in performing the intended functions, but excludes client information, financial product information and decision information. Examples of such ancillary data or information would include statistical information, geo-code data, and the like. Non-client specific information also may be included in this category, such as demographic, psychographic or buying habit data. Incidentally, the term "information" is used broadly herein to include quantitative data as well as other forms of information.

Text information comprises text, e.g., in the form of an alphanumeric character or character string, a word, a phrase, a sentence, a paragraph, or even a graphical symbol. The preferred form of text information in many applications involving the marketing of financial products would comprise a phrase, i.e., a collection of words, which would be part of a sentence or paragraph of fixed text within the client communication. For example, if the client communication presents a financial product such as a security, the description of the product may assume one form for clients under a predetermined age, such as 40 years old, and the description of the same product may assume another, perhaps more conservative or risk-adverse form for clients over the predetermined age.

Text information as used herein can and often will overlap with the other categories of information as defined herein. Text information may, for example, comprise or pertain to client information. In the example provided immediately above, the text information pertains to financial product information. Text information also may comprise or pertain to ancillary information, decision information, etc.

The decision information to be provided to the system may and usually will vary from application to application. This decision information typically would be inputted as part of the system initialization for a given run. The decision information generally will comprise criteria or conditions used for the selection of variable information. The decision criteria preferably comprise programmed database queries which are used in conjunction with the client database, and perhaps a financial product database and/or an ancillary information database to select records, to select fields within records, and the like. The decision information also may comprise conditions and instructions for selection of information from lookup tables and similar data structures.

According to the method of the invention, decision information is used to automatically select variable information for insertion or inclusion in the variable or variable portions of the client communication or communications. This variable information preferably includes information other than, or in addition to, a client identification as that term has been defined herein. The variable information may be selected for insertion into the variables or variable portions of the client communication for one or more of the clients.

The variable information may comprise part or all of the information provided to the system as the client information, the financial product information, the ancillary information, text information, and even the decision information. This variable information may comprise virtually any form of client information, but preferably, as noted, it would be other than, e.g., in addition to, a client identification, most notably the client's name, address, account number, etc. The variable client information may, for example, comprise information pertaining to the client such as client age information, health information, client family information, client geographic information other than client address information, client purchasing information, client asset information, client liability information such is information about a mortgage, client financial income information, client occupation information, client activity information (e.g., sports activities, recreational activities, etc.), and the like. The variable client information may comprise psychographic client data and/or demographic client data. In the term life insurance context specifically, this variable client information preferably would be other than a client name, address, age, marital status, tobacco habits, and other than the type and amount of life insurance coverage, which comprise related product information.

Where the variable information comprises financial product information, this variable financial product information also may assume a wide variety of forms. As noted, the variable financial product information may pertain to a single financial product or to a plurality of different financial products. The variable financial product information may comprise or pertain to, for example, one or more insurance-related products. Examples would include property and casualty insurance products, as well as non-property and non-casualty insurance products. The latter grouping would include individual life insurance products such as individual term life insurance products and individual life insurance products other than term, such as permanent life insurance products. Permanent life insurance products would include such things a whole life, universal life, and the like. Where combinations of insurance products are included, they may include, for example, a combination of an individual term life insurance product and an individual permanent life insurance product. Other types of insurance products to which the variable information may pertain include credit life, disability, and unemployment insurance; health insurance products; disability insurance products; annuities; etc.

The variable financial product information also may comprise or pertain to bank-related products such as information on various types of demand deposit accounts, savings accounts and product, loan products, credit products, etc. Where the variable financial product information pertains to financial investments or brokerage-type products, the information may comprise or pertain to various investment products, financial securities, equity instruments such as common and/or preferred stocks, stock options, warrants and the like, debt instruments, money market funds, mutual funds, derivatives, etc. The variable financial information may comprise or pertain to financial product pricing information or financial product non-pricing information, or both.

The variable financial information may also include assurance products and money saving products such as information on warranty plans (home, automobile, electronics, etc.); discount clubs or programs (dental, travel, etc.); extended warranty plans; and the like.

The variable information also may comprise or pertain to ancillary information, such as statistical demographic information, geo-code data, psychographic data, economic data pertaining to more than one person, e.g., pertaining to persons other than merely to a single client, and combinations of these.

The variable information also may comprise text or text information. Where it would be desirable to present differing text in the respective communications, for example, depending upon the age, marital status, etc., of the respective clients, several different versions of text may be used as variable information. Any given one of the text inputs would be used for a particular client only if that text were appropriate for that client. As noted, information other than a client identification, i.e., information in addition to the client identification information if client identification is present, may constitute the variable information.

The apparatus according to the invention comprises means for inputting into a computer-accessible storage medium variable information comprising other than (in addition to) a client identification and decision information. The input means used for a particular application will vary depending upon the format in which the information is available. Examples would include a keyboard, a disk drive, a tape drive, a hard drive, a modem, an optical scanner, a bar code reader, a pointing device such as a mouse or track ball, a network link, etc. Client information, financial product information, decision information, ancillary information, etc. may be provided on a data tape, compact disk, diskette, or similar storage medium, in which case the input means correspondingly would comprise a tape drive, a compact disk reader, a disk drive, and so on. Some records may be available on non-resident databases, as noted. This is increasingly the case as online networks such as the Internet gain widespread use and acceptance. In such instances, the information may be received via modem 20.

The input means of the preferred embodiment may include any one or any combination of keyboard 16, pointing device 18, modem 20, tape drive 22, bar code reader 24, an optical scanner, mass storage device 30 (e.g., hard drive or diskette drive), and equivalent input devices. With reference to FIG. 1, for example, information may be directly entered using keyboard 16. In some instances, bulk information may be available, for example, comprising lists of client records, in which case the input devices more suitable for transfer of bulk files would be used. Diskette drive 30, for example, as would come as standard equipment with the types of processors noted above, may be used.

The input means preferably is adapted for inputting such data and information both individually and automatically in bulk. Automatic or bulk input would be done essentially or entirely without human intervention. This is particularly desirable when inputting client information, which ideally would be capable of being inputted as client records without human intervention between input of the respective client records.

The decision information may take a number of forms, as noted above. The means for inputting the decision information therefore may assume different forms, such as those identified above and their equivalents. Preferably, the decision information will comprise one or more computer programs which include database query commands to query or filter the client information, financial product information, etc. according to desired conditions or criteria. The preferred input means for this task accordingly would comprise keyboard 16 and/or tracking and pointing device 18, operated in conjunction with the associated device-related software and software drivers.

The input means is operatively coupled to a computer-accessible storage medium so that the storage medium receives and stores the information as it is inputted. The storage medium according to the preferred embodiment may comprise RAM 28, mass storage device 30, other memory within CPU 26, tape drive 22, and any combination of these. The storage medium according to this aspect of the invention may comprise any storage device or medium capable of storing the inputted information and storing it for subsequent retrieval and transmission ultimately to CPU 26. The storage medium need not be directly connected to or directly in communication with CPU 26, provided it is capable of transferring the information to CPU 26 upon the appropriate command.

The inputting of data and information in the preferred embodiment is carried out as part of the data input module as depicted in FIG. 2. This module forms part of and interacts with the inputting means to receive the inputted client information, financial product information, and possibly ancillary information and text, and to store the information in an appropriate storage medium, such as mass storage device 30 or RAM 28.

Figure 5:
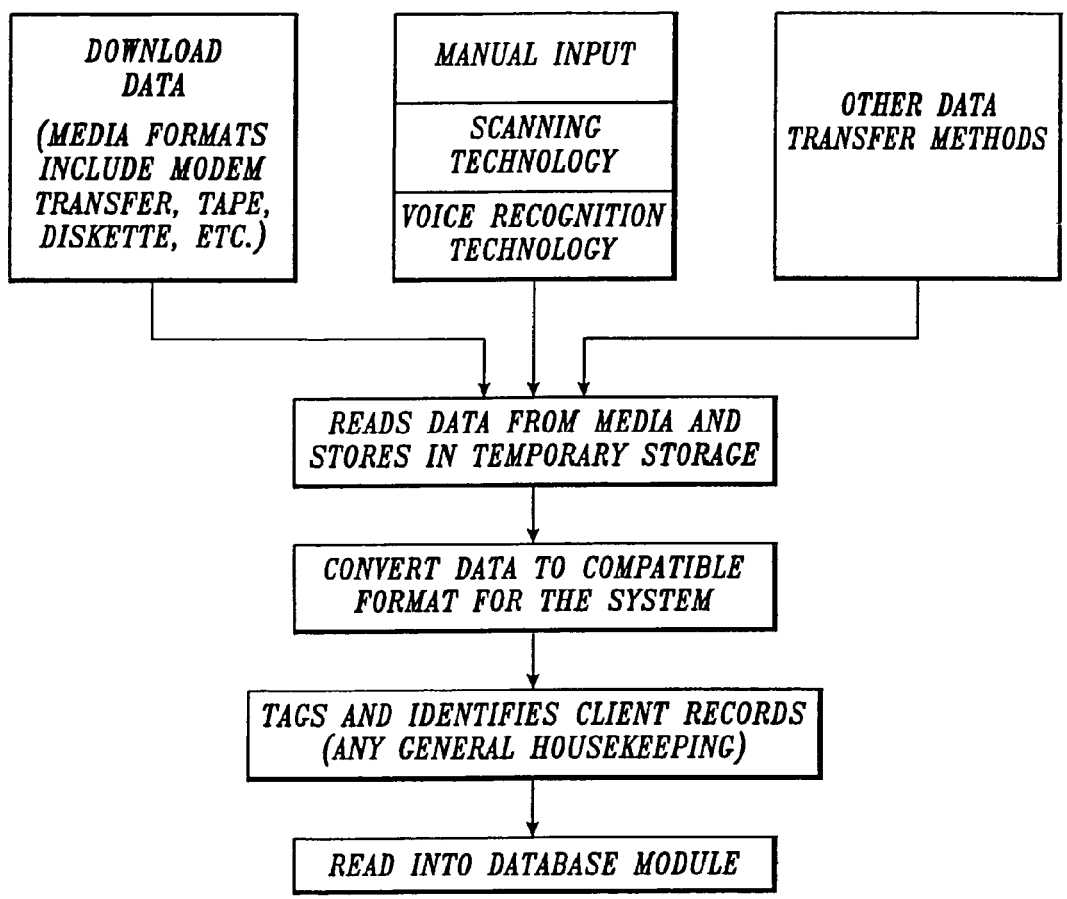
FIG. 5 is a flow chart diagram illustrating the data input module of the preferred embodiment and method of the invention.

The data input module performs tasks related to inputting information into the system. An example of the organization and task flow of the data input module is shown in FIG. 5. As noted above, data may be entered manually or automatically. For example, information may be entered using scanning technologies. Bar codes may be used on advertisements, information cards and other documentation. Scanners such as those commercially available for use with processor 12 may be used to read the bar coded information. Similarly, an optical scanner may be used to scan an entire page or document, and standard image processing software may be used to read information from the scanned client information from the scanned input. The invention is not, however, limited to these input modes, and others may be used. For example, as voice recognition technology develops, there very well may be the ability to input client information merely by voicing that information into a voice recognition device, which would translate the voice information into digital client data.

The task of automatically or semi-automatically sending large numbers of communications efficiently and cost effectively generally will require that the system receive or gather on its own large volumes of client information. For a given client, the system is adapted to retrieve client information and, depending upon the circumstances, other information as well. Inherent advantages of using an automated environment to undertake these tasks is the tremendous speed with which computers can retrieve, process and store large volumes of information.

The data input module of this embodiment and method inputs data into the system from one or more of the input devices for the system, such as modem 20, tape drive 22, or bar code reader 24. The details of the data input module will depend to a certain extent upon the type of data to be input.

With further reference to FIG. 5, as data is inputted, the data input module stores it in a temporary storage area within processor 12. If necessary or appropriate, the data is converted to a format compatible with the system. For example, as is known in the database arts, it is sometimes necessary to import or export files to convert one database format to predefined database structure. In this embodiment, the data input module also may tag and identify client records as they are inputted, and perform general and routine "house keeping" tasks on the data.

Once these tasks have been performed by the data input module, the properly-formatted client information is transferred to the database module. In the preferred embodiment, the database module comprises a relational database essentially equivalent to commercially-available database packages.

The database module of the preferred embodiment stores client information for general use by the system, as explained more fully below. The database stores client information so that each client is represented by a record in the database, and the various items of information to a given client are contained within fields under the record for that client. Examples of the structure and contents of a client database for life insurance, for example, may include the following fields:

Name
Address (including zip code)
Age
Tobacco user v. non-tobacco user
Marital Status
General Health The contents of a representative client database record for marketing of individual mortgage life insurance may include the following:

| Borrower | Co-Borrower |
|---|---|
| Name | Name |
| Address | Address |
| (including zip code) | (including zip code) |
| Age | Age |
| Tobacco user v. non-tobacco user | Tobacco user v. non-tobacco user |
| Marital Status | Marital Status |
| General Health | General Health |

The contents of a representative client database record for a commercial bank may include the following:
Name
Address (including zip code)
Account Type Account Number
Account Balance
Spouse
Occupation
Employer
Income The database module also may include information other than client information. For example, this module typically may include a listing or database of financial products and/or financial product information. The financial product information typically would include not only the identification of the products, but information about pricing, conditions on availability (e.g., "issue constraints"), etc. Product availability conditions or constraints as used here refers generally to limitations on the availability of the product, e.g., geographic availability constraints, age range constraints, face value or amount constraints, and so forth. The product-related database also may include descriptions and explanations of the products, e.g., in the form of text information. This will be explained in greater detail in connection with the sales presentation and output module.

Figure 6A:
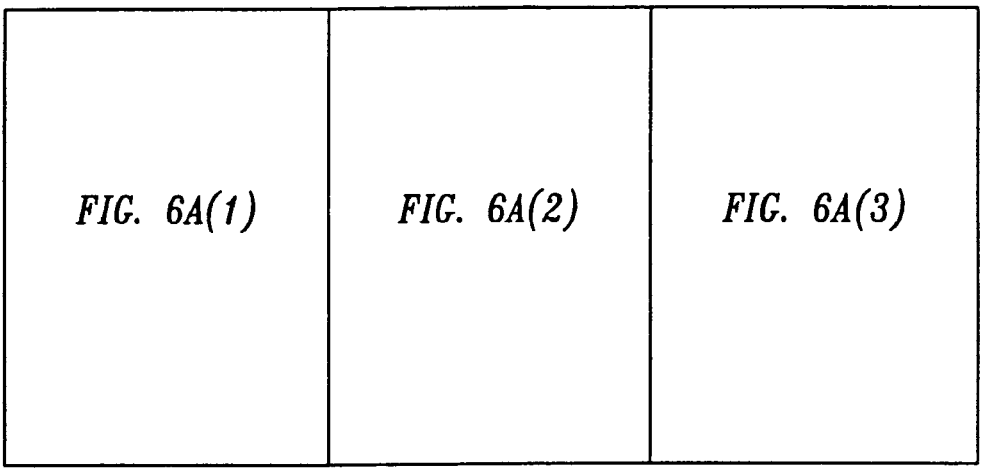
FIG. 6 (including 6A and 6B) shows the organizational structure of various illustrative database tables managed by the database module according to the preferred embodiment and as used in connection with the preferred method of the invention.
Figure 6B:
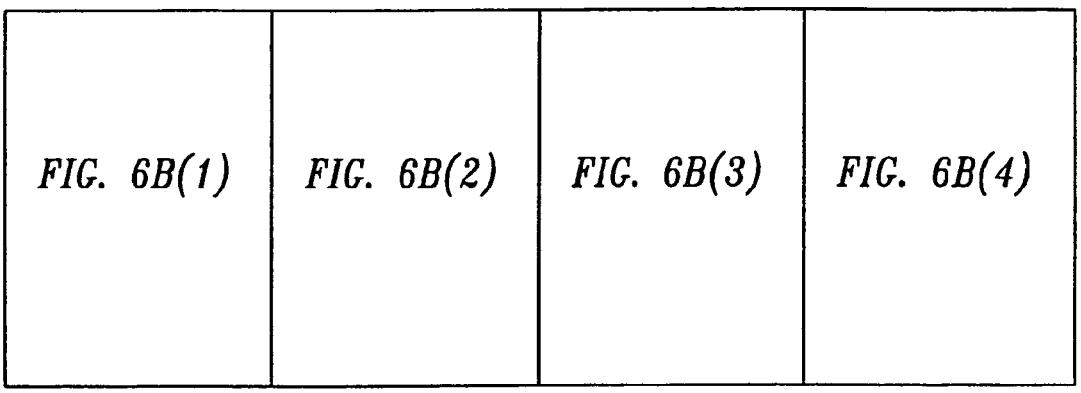

A sample set of tables for use in preparing and delivering client communications pertaining to life insurance products is presented in FIG. 6 (including FIGURE parts 6A and 6B). These tables may be inter-related depending upon the specific design of the database or databases for a given application.

According to the method, the decision information is used or processed to automatically select variable information. In the preferred method, the decision information is used to select a subset of the variable information for inclusion in the variable portion or portions of the client communication corresponding to the variable portion or portions of the client communication format. The apparatus according to the invention similarly includes processing means operatively coupled to the storage medium for using the decision information to automatically select a subset of the variable information for the client, or for each client where processing involves a plurality of client records. The subset of variable information for a given client then may be used in the subsequently-prepared communication for that client to individualize or personalize the communication. As implemented in the preferred embodiment, the processing means comprises processor 12, including CPU 26 and related components, operating under the control of processor module computer software, as shown generally in FIG. 2.

The specific identity and nature of the variable information selected by the processing module may be varied from application to application depending upon a number of factors, the most important of which is the decision information as selected by the system user. The processor module provides tremendous flexibility. It may be adapted, for example, to handle a wide variety of classes of financial products, such as term life insurance, permanent life insurance, combinations of term and permanent life insurance, health insurances, disability insurances, long term care insurances, and the like. The processor module can accommodate any type of client information that can be incorporated into the client database. In addition, the processor module has great flexibility in the specific analytical and decision making methods and procedures used. Specific yet merely illustrative examples are provided below.

Figure 7:
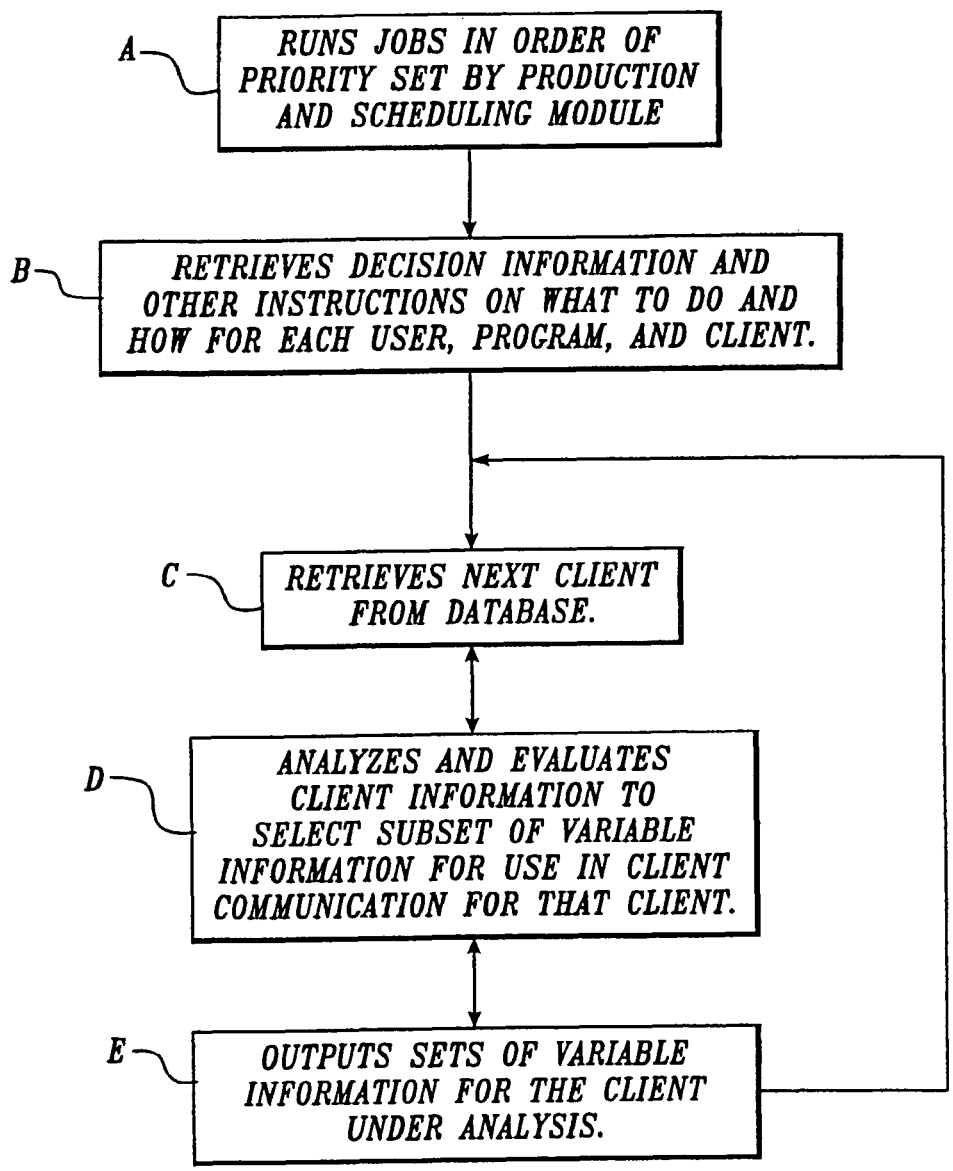
FIG. 7 is a flow chart diagram illustrating the processor module of the preferred embodiment and method of the invention.

A flow chart depicting the general organization and logic flow of the processor module for the preferred embodiment and method is presented in FIG. 7. As indicated at block A, the processor module is scheduled by and operates under the general instruction of the production and scheduling module (described more fully below). The production and scheduling module would determine, for example, which of several competing jobs or client databases would be processed and in which order. The processor module flow then moves to step B, in which it retrieves decision information and other instructions delineating the tasks the system is to perform and upon which information.

The processor module flow at block C retrieves the information, in this case a client record (client information), which is to be used with the decision information in selecting the variable information. By operating upon the decision information, such as database query commands based upon the client database fields, the system processes the client information and uses it to select the variable information. The type of information retrieved by the processor module will depend upon the type of analysis under consideration, and for which the system has been adapted. Illustrative examples of such input data are described above with reference to the data input module and the database module. The processor module is described herein as processing data files sequentially, one record at a time. This is not necessarily limiting. For example, the processor module may be configured so that it processes more than one record at a time through such generally known approaches as multi-tasking or parallel processing, and/or by means of networked machines operating in parallel or otherwise concurrently.

In step C, depending on the particular application, the processor module may undertake some pre-sorting or other manipulation of the client information prior to the principal analysis of it. For example, there may be categories or items of information within a given a client record that are not utilized in the analysis and decision making procedures to be undertaken by the processor module in that application. Therefore, it may be appropriate to modify the retrieved client records to eliminate such categories or items before further processing in undertaken in the processor module.

In step D of the processor module, the processor module uses the decision information to analyze and evaluate the client information for that record to select the subset of variable information for that client. The selected variable information is outputted as step E. This may occur as each client record is processed or, preferably, for a plurality of records. The process returns to block C to retrieve the next client record, and processing is repeated at block D. This looping process is continued until all client records to be processed in fact have been processed in this manner.

Figure 8:
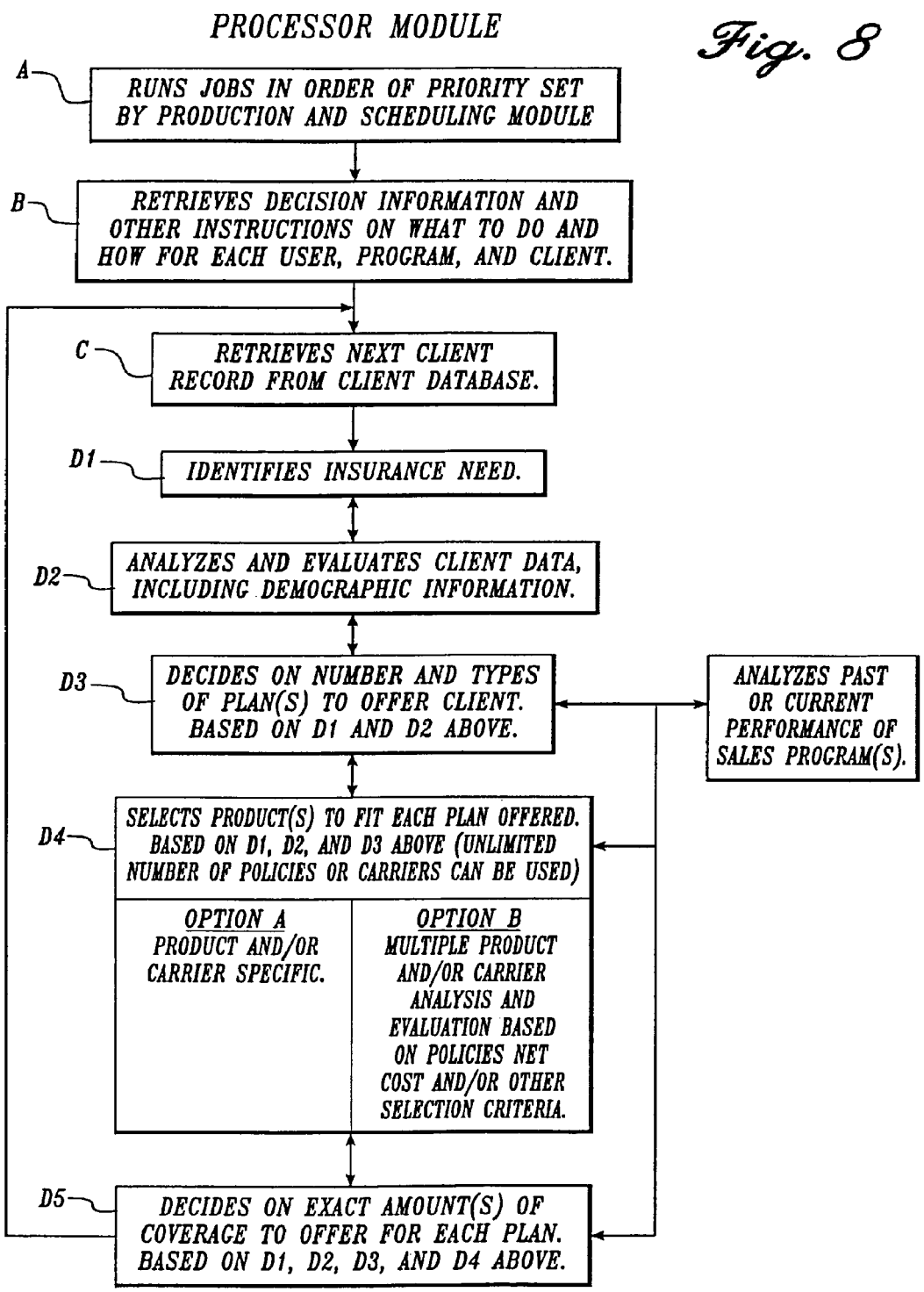
FIG. 8 is a flow chart diagram illustrating the processor module of the preferred embodiment and method of the invention similar to that of FIG. 7, but which is specifically adapted for processing of insurance products.

A slightly more complicated application or process flow for the processor module of the preferred embodiment and method is illustrated in FIG. 5. FIG. 8 is similar to FIG. 7, but is specifically adapted for preparing client communications in connection with the marketing of life insurance. Blocks A through C of FIG. 8 are essentially identical to those of FIG. 7. Bock D of FIG. 8 shows considerably more detail as to the process which occurs in this example. In substep D1, the insurance need of the client is identified. This may be done, for example, based upon information in the client record such as age, marital status, financial information pertaining to the client, etc. Substep D2 involves analyzing and evaluating the client information, such as demographic data, to make the selections described in the subsequent steps. In substep D3, the processing flow decides on the number and types of insurance plans to offer to this particular client. In substep D4, the processing flow selects the financial product or products to fit into each plan offered. This would be accomplished as part of the decision information and its programming. Two sample options are illustrated in the drawing figure. Option A involves presenting only certain products and/or the products of certain product carriers. Option B provides greater leeway in selecting products and plans. In substep D5, the processing flow uses client information, such as for example the client's age, financial income, and the client's zip code, to determine an amount of coverage to be offered in each plan presented to that client. The process returns to block C to retrieve the next client record, and processing is repeated at block D. This looping process is continued until all client records to be processed have been processed in this manner.

Variable information may be selected using client information, i.e., the decision information may include using client information to select the variable information for inclusion in the client communication. This is generally true regardless of the nature or content of the information actually selected as the variable information.

In step D3 of the processor module flow depicted in FIG. 8, the module decides on the number and types of plans to be proposed to the client, which represents financial product variable information. This decision is based upon the insurance needs of the clients as identified in the decision information, on the client information in the client record, and possibly on other information such as demographic information, geo-coding information, etc. This step involves making an informed intelligent decision regarding the possible solution or solutions to the product or protection needs of the customer. Factors which may be considered by the module in this selection process may include the client demographic information (e.g. age, gender, tobacco usage, and occupation) mortgage information, financial information such as income, marital information, existing policy information, family-related information, and other factors selected by the system user and incorporated into the processor module decision making criteria.

The processor module in conjunction with the decision information selects the variable information, in this example the financial products, which satisfy the decision making criteria being employed in the module. Under this substep, the processor module draws from the available product pool the most appropriate product to fit each plan selected as a candidate in this substep. Preferably the processor module has the ability to select from a large number of products and product providers. In performing this step D3, the processor module may take into consideration factors such as: the premium for the product, the compensation paid to the system user or other provider including primary and secondary compensation, legal issues, underwriting requirements, demographic information pertaining to the client, and the net cost of premiums over a specified period of time. As to legal issues, all local, state, and federal laws regarding insurance sales, for example, and additional constraints imposed by product providers may be considered.

There are numerous examples in which client information may be used to select client information. To illustrate this approach, the decision information may include the criteria of selecting a first text string describing a financial product ("text string A") if the client has an annual financial income of greater than a certain amount, e.g., $50,000, and selecting a second text string ("text string B"), if the client's income is less than $50,000. This example uses client information (annual income) to select variable information (alternative financial product descriptions) based upon decision information (income greater than or less than $50,000). The client's age easily could be used instead of annual income, as could virtually any other item of client information.

To further illustrate the types of decision making procedures and criteria which may be embodied in the processor module, we will use the example of individual mortgage life insurance. Pursuant to the example, assume that each client record includes the address of the property subject to the mortgage, the amount of the mortgage, the monthly mortgage payments and the following information for each borrower and co-borrower: Name, age, and gender. As part of the analytical and decision making criteria information retrieved by the processor module, a set of scenarios are provided for characterizing the client and the surrounding circumstances. Illustrative examples of the scenarios would include the following:

Scenario 1: Single individual borrower.
Scenario 2: Two borrowers of different gender, which may include a husband and wife, business partners, etc.
Scenario 3: Two borrowers of the same gender, which may include a parent and child, siblings, business partners, gay partners, etc.

Figure 9:
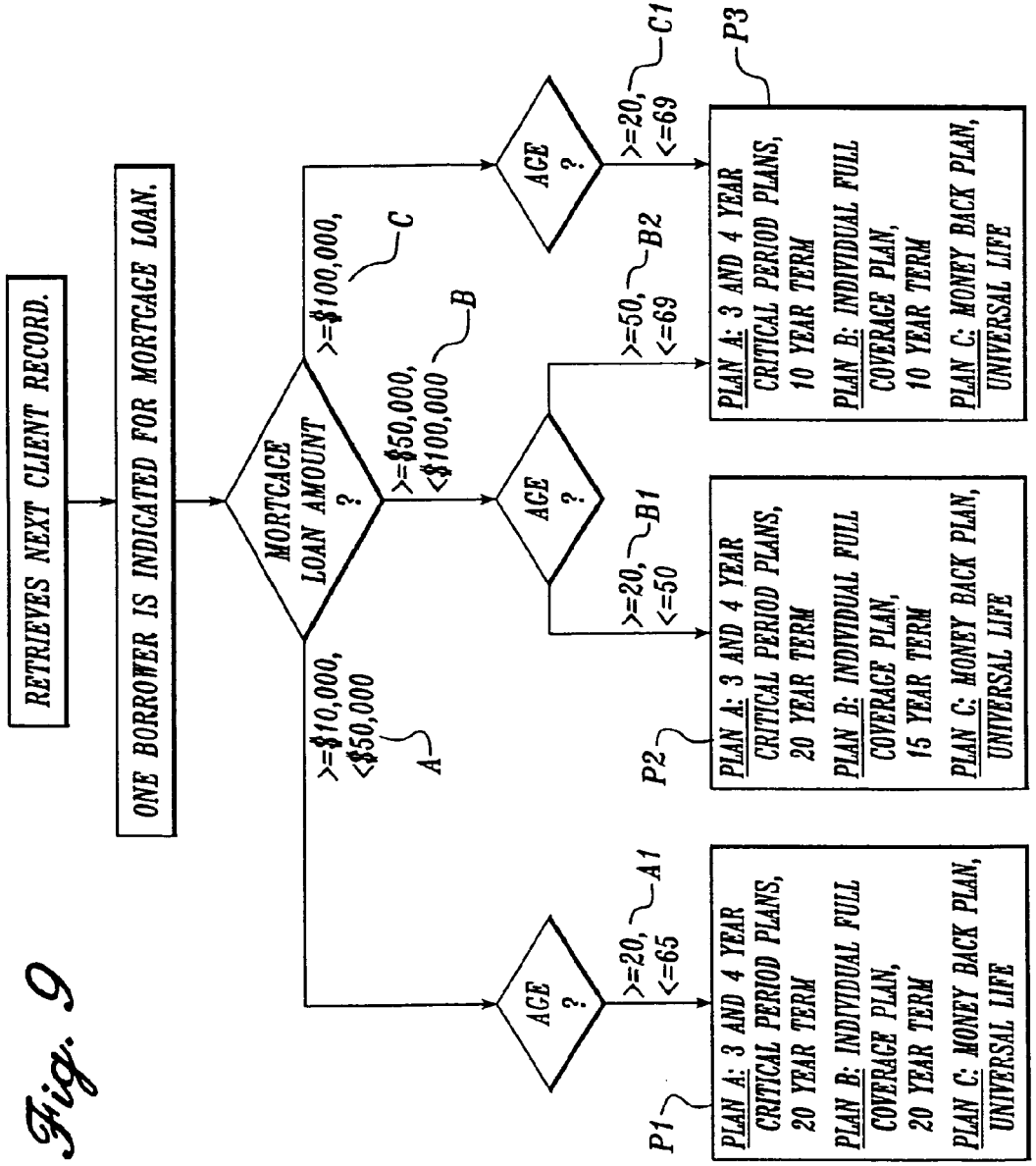
FIG. 9 is a flow chart diagram illustrating a specific example of the organization and flow of the processor module specifically pertaining to a mortgage life insurance-related communication.
Figure 10:
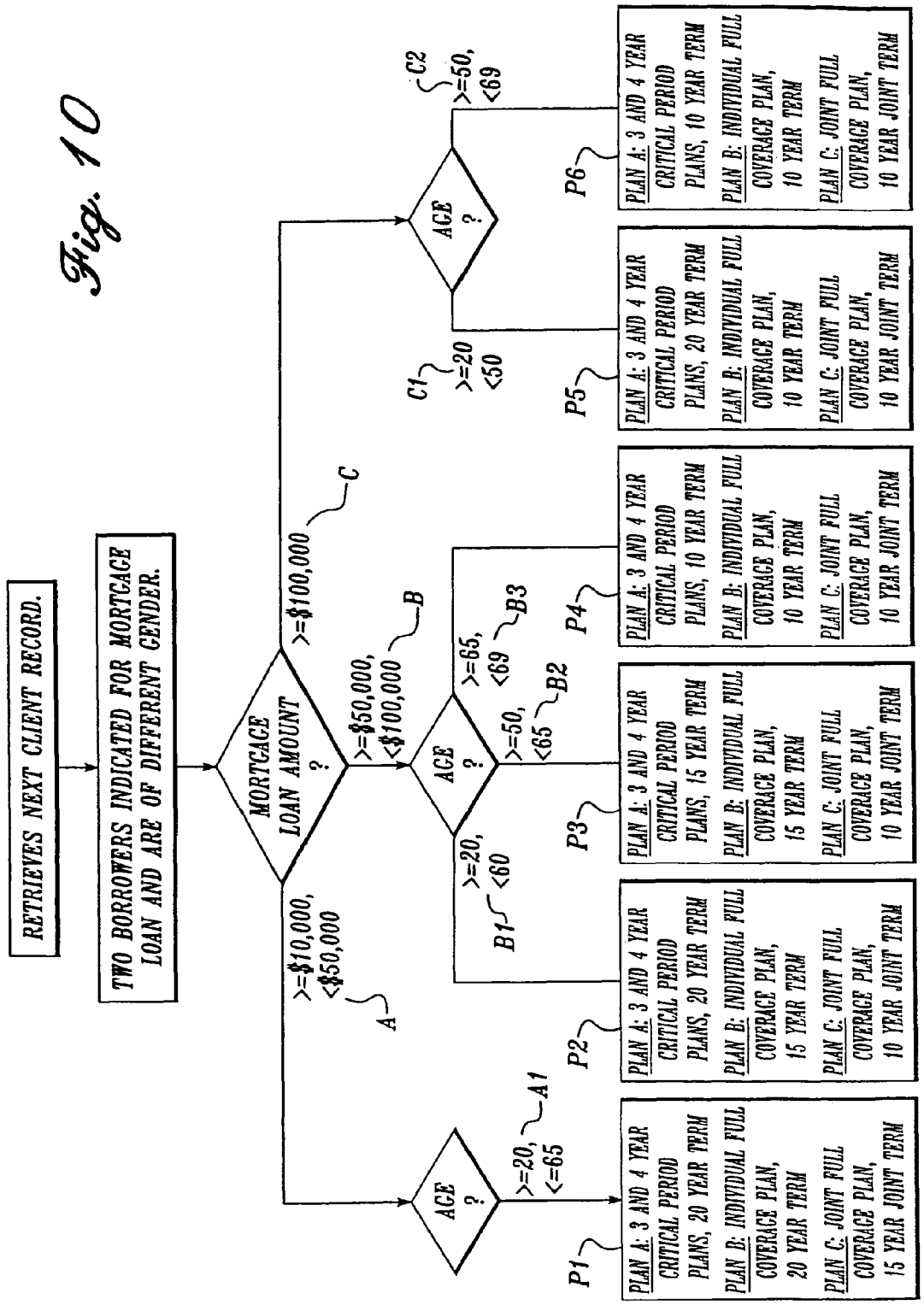
FIG. 10 is a flow chart diagram illustrating another specific example of the organization and flow of the processor module specifically pertaining to another mortgage life insurance-related communication.
Figure 11:
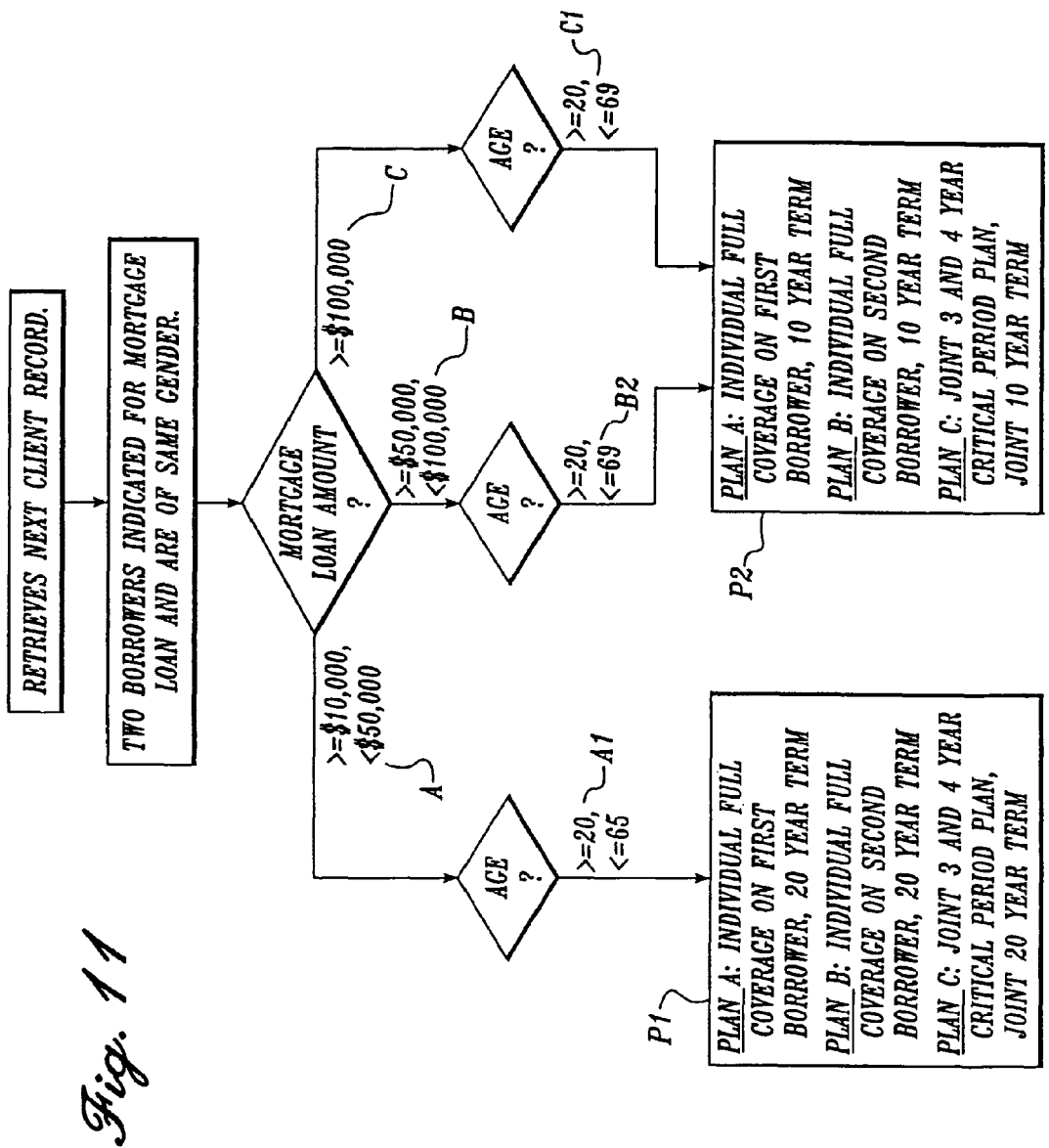
FIG. 11 is a flow chart diagram illustrating a specific example of the organization and flow of the processor module specifically pertaining to another mortgage life insurance-related communication.

As part of the retrieved decision making criteria, the processor module would retrieve the information depicted graphically in FIGS. 9 through 11. If the client record under consideration reflected a single borrower, the processor module would employ the decision making criteria (decision information) reflected in FIG. 9. According to those criteria, the processor module would determine into which of three mutually exclusive categories the mortgage falls based on the loan amount. In this example, loan amounts of at least $10,000 but less than $50,000 would fall into category A. Loan amounts of at least fifty thousand dollars but less than one hundred thousand dollars would fall into category B, whereas loan amounts of at least one hundred thousand dollars would fall into category C. At a second level of decision making, the age of the borrower would be considered. For borrowers in category A between the ages of twenty (20) and sixty-five (65), the processor module would select product package number 1 (P1), which includes three alternative plans, i.e., plan A, plan B, or plan C, as described in the box for package P1 in FIG. 9. Note that for any age or mortgage loan amounts outside the ranges indicated in FIG. 9, no proposal would be made because of issue constraints.

To the extent the client record falls into category B based on loan amount, the agent borrower similarly would be used to further categorize the record. In this illustrative example, category is segregated into two age categories, i.e., B1 and B2. Category B1 includes borrower of at least twenty (20) but less and fifty (50). Category B2 includes ages greater than fifty (50) but less than sixty-nine (69). Those records qualifying under category B1 would result in the proposal of a package P2. This package P2 would include three optional proposals, as described in the box for package P2 in FIG. 9.

For category B2, a package P3 would be proposed. Package P3 similarly includes three optional plans, as described in the box for package P3 in FIG. 9.

For those records falling within category C, i.e., involving loan amounts of at least $100,000, package P3 would be proposed.

The processor module would analyze each client record to recognize scenario #2, i.e., two borrowers of different gender. The decision making criteria and processing undertaken for records qualifying under scenario #2 is depicted in FIG. 10. Processing under this scenario would be very similar to that described above with regard to FIG. 9. At the initial level, each record would be categorized based on loan amount. Segregation at a second level would occur based on age of the first or principal borrowers.

Similarly to FIG. 9, those clients qualifying under scenario #2 and falling within category A1 would be proposed a package P1 which includes three optional plans, i.e., A, B and C. A package P2 would be proposed to those clients qualifying under category B1 in FIG. 10. For those clients qualifying under category B2, a package P3 would be proposed. For those clients qualifying under category B3 of FIG. 10, a package P4 would be proposed. For clients qualifying under category C1, package P5 would be proposed. For those clients qualifying under category C2, a package P6 would be proposed.

Where the client record indicates there are two borrowers of the same gender, scenario #3 would be implicated. The decision making criteria and processing for this illustrative example is shown in FIG. 11, which follows the same logic and processing of FIGS. 9 and 10.

In these illustrative insurance examples, two methodologies may be employed for selecting the variable product information, i.e., a product and/or product provider-specific methodology and a "best policy" analysis methodology. Both of these methodologies taken to account the information from substep D3. The first methodology considers each of the various factors which may be used to evaluate the attractiveness of that product for the particular client. Such factors considered by the processor module may include the premiums, issue constraints, compensation paid to the system user, product provider, etc., and underwriting requirement.

The "best policy" methodology evaluates and analyzes a potentially large number of product providers and products which best meet a specified set of criteria, for example, by picking the product having the lowest premium for the client.

In step I of processor module processing according to this embodiment and method (FIG. 8), the module analyzes the past or current performance on a real-time basis of various sale programs. It identifies on a real-time basis who is buying on any geographic or any demographic basis. This step involves determining what the individual client is most likely to buy, making the end users aware of that fact, recommending changes, and if given permission, or appropriately coded, automatically implementing the changes, which may occur even during the running of the module.

To better illustrate the organization, operation and flow of the processor module, another example, i.e., one involving the logic associated with the marketing of life insurance, will now be explained with reference to FIG. 12. Steps C, D, E, . . . of FIG. 12 correspond to the similar steps of FIG. 8. In step C, the processor module retrieves a client record for analysis. In step D, the module identifies the insurance need for the client, e.g., to replace lost income.

In step E, the module analyzes and evaluates client information for this client, including all pertinent client demographics available to the system. The system also may retrieve and use additional demographic data, for example from a geo-coding module.

The database module of this preferred embodiment includes a geo-coding module which includes geo-coding data. This geo-coding data can be organized by zip code and includes statistical information regarding location, average income, average education, average property values and the like within that zip code area. It can obtain in real-time any field of demographic information for use contained within the United States census.

Figure 12:
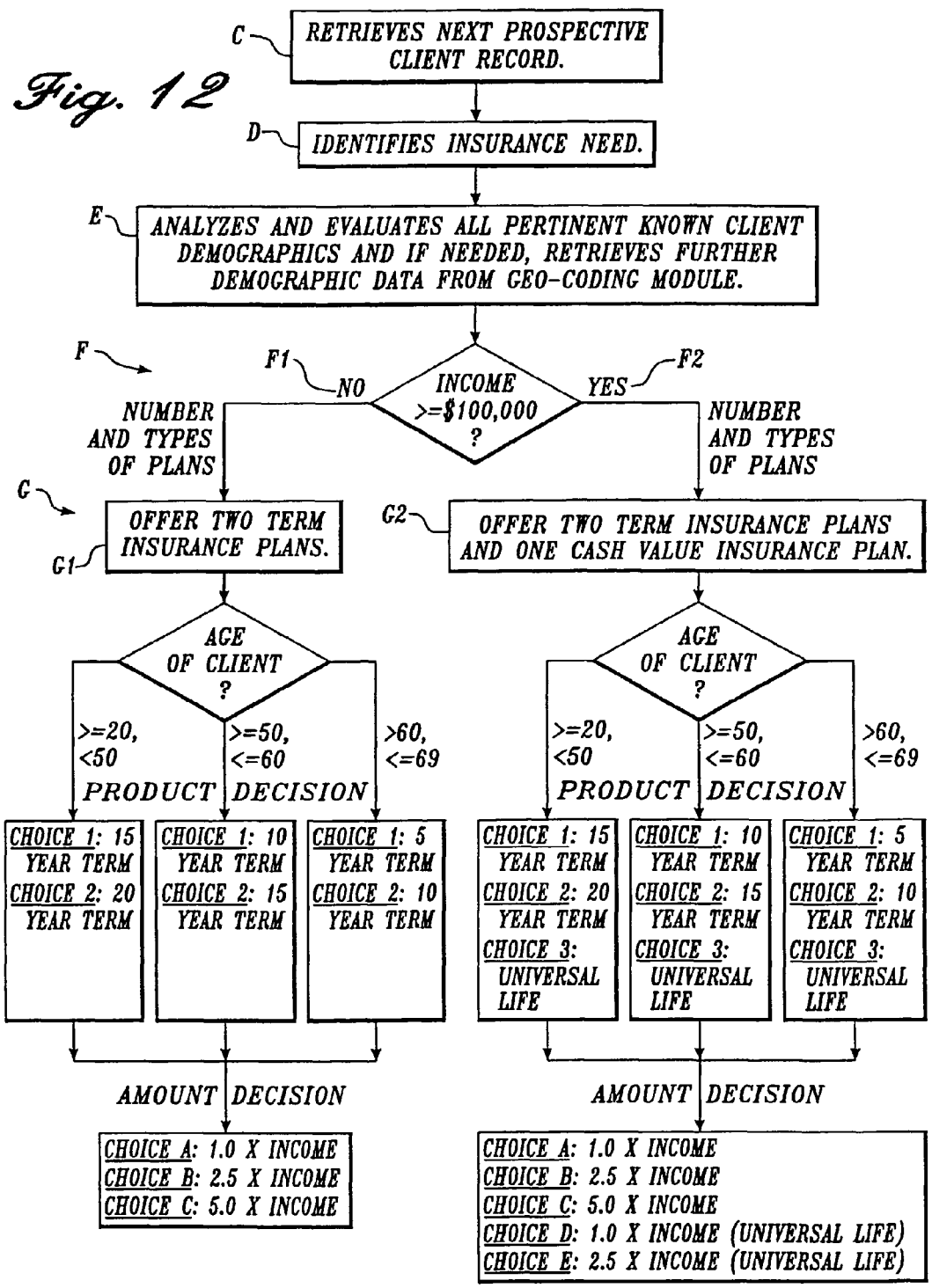
FIG. 12 is a flow chart diagram illustrating a specific example of the organization and flow of the processor module specifically pertaining to a basic individual life insurance-related communication.

In this illustrative example shown in FIG. 12, step F involves segregating client records by annual income. For client records reflecting an annual income of less than one hundred thousand dollars, processing continues along a path F1. For client records reflecting an annual income of at least one hundred thousand dollars, processing proceeds along a path F2.

In step G of FIG. 12, clients falling under category F1 are offered two optional term insurance plans, depending on the age of the client. For those clients having an income of less than one hundred thousand (path F1), two term insurance plans would be proposed, but specifically which two would depend upon the age of the client. For clients at least twenty (20) years old but younger than fifty (50) years, their choices would include a 15 year term policy and a 20 year term policy. For clients aged at least fifty (50) but less than sixty, the choices would include a 10 year term policy and a 15 year term policy. For clients older than sixty (60) but not over sixty-nine (69), the two choices would include a 5 year term policy and a 10 year term policy. In each of these instances, three separate coverage amounts for each of the two policies proposed would be presented. In this illustrative example, the system user may select between an Option A and an Option B. Under Option A, only specified products and/or specific product providers may be considered. Under Option B, a variety of products and product providers may be considered in selecting the appropriate plans and products for selection.

In step H of the processor module flow of FIG. 8, the module selects a specific amount or amounts of coverage to propose under each plan. This decision is based on the information as compiled in step D as described above.

These three coverage amounts are determined by multiplying the annual income by a multiplier and rounding (e.g., to the nearest $5,000 or $10,000). The multiplier for path F1 would be 1.0, 2.5 and 5.0 for plan A, B and C, respectively.

For those clients who have annual incomes in excess of at least one hundred thousand dollars (path F2), the processor module optionally proposes two term insurance plans and one cash value insurance plan. The specific plan again depend on the age of the client among other things. For clients at least twenty (20) but less than fifty (50) years old, the choices include a twenty year term policy, a 15 year term policy, and a universal life policy. For clients at least fifty (50) but no more than sixty (60), the choices include a 10 year term policy, a fifteen year term policy, and a universal life policy. For clients older than sixty (60) but less than sixty-nine (69), the choices proposed are a 5 year term policy, a 10 year term policy, and a universal life policy. In this example the processor module also selects an amount of coverage based on income. Specifically, five alternative levels of coverage are proposed corresponding to annual income multipliers of 1.0, 2.5 and 5.0, respectively.

Financial product information also may be used to select the variable information. To illustrate, a particular financial product may be offered at one price in some states and at another price in others. As part of the decision information, the system and method may use this pricing information to select text and/or pricing information as variable information for inclusion in the respective client communications.

In some instances it may be useful or otherwise desirable to use separate software packages or "link programs" to provide financial information. A link program, for example, may be used to calculate insurance premiums based on a selected set of client information. The premiums then would be imported back into the system software of FIG. 2 and used as financial product information, such as product pricing data.

The subset or subsets of the variable information selected for a given client is adapted to be inserted into or provided as an integral part of the corresponding variable portion or portions of the client communication for that client. Depending upon the manner in which the tasks are segregated, the output of the system software therefore may comprise the completed client communications ready as they are delivered to the clients. Short of this, however, the system output may comprise an intermediate product such as the subset or subsets of the variable information themselves, ready for inclusion or integration into the client communication or communications, but not yet so integrated or merged.

In the latter instance, i.e., where the system output comprises unintegrated subsets of the variable information themselves, ready for inclusion or integration into the client communications, these variable information subsets preferably would be stored and provided as part of the client information database, e.g., as was provided as part of the initial system and method input, or as a separate database. Each record of the database would include the subset of variable information for that client, as well as an identifier to identify the client, such as client name, account number, etc. This client output database could be stored, for example, to RAM 28, mass storage 30, or other suitable storage medium.

As an optional but preferred step in the method, the variable information is automatically inserted into the client communications. This step preferably involves generating the client communication according to the communication format, wherein the generating step includes inserting the subset of variable information into the variable portion of the client communication corresponding to the variable portion of the client communication format. The variable information preferably is inserted or merged into the format or other text of the client communication without unwanted gaps or spaces, so that the entire document appears to be created from a single source, or the entire document appears to be an integrated whole. The merged subset or subsets of the variable information may be formatted with the same font or a compatible font to achieve this end.

A primary objective is to deliver the finalized client communications to the clients. Accordingly, the preferred method includes a step of generating the client communications according to the communication format. The generating step includes inserting the variable information or a subset of the variable information for a given client into the variable portion of the client communication for that client. The preferred embodiment of the invention similarly includes output preparing means in operative communication with the processing means for preparing the client communication and automatically inserting the variable information or variable information subset into the client communication. In the preferred embodiment, the output preparing means comprises a computer, such as processor 12 and its CPU 26, in conjunction with and operating under the sales presentation and output module ("output module). The output preparing means of this embodiment also includes laser printer 32, modem 20, and similar means for creating the final form of the client communications, whether they be in the form of printed paper, electronic mail, or other form. Where the client communication is to be transmitted on a network or other electronic medium, for example, the output preparing means may comprise another computer.

The output module uses the information obtained from the processor module and optionally from other sources to generate, design, individualize and particularize all of the client communications. Marketing solicitations, ads, product- or service-related notices, presentation letters, follow-up letters, and reminders all would be examples of such client communications. The output module automatically prepares and outputs a client communication, for example, in a form of a marketing solicitation, which provides information sufficient to enable the client to make informed, intelligent decision regarding the purchase of the plans or products selected by the processor module, or sufficient to gain the interest of a clientive buyer and motivate him or her to seek additional information. The processor module creates these client communications in a manner using a format which personalizes and individualizes the information presented to the client.

The output module of the preferred embodiment and method does not merely insert client information in the header of the client communication, nor does it merely import product information from the generic product information directly from the product-related database into the communication. The output module instead selectively can use substantial portions of client information, product information, and in many instances other information as well to generate a particularized communication tailored to the particular client for whom the communication is to be sent. The communications therefore typically will vary from individual client to individual client.

Client communications generation according to the preferred embodiment and method involves organizing, formatting and outputting client communications using information received generally from the processor module. As explained, the processor module uses client information, information about available financial products, and perhaps other available information to recommend products, plans, and the like specifically tailored to each client. The output module allows the system user to define a particularized communication format for classes of customers, such as for potential individual mortgage insurance clients. It then generates highly individualized communications specifically tailored to present that client with individualized plan and product presentations, reminders, follow up, etc.

The output module is adapted to present its output in a variety of forms. For example, the output can be displayed on display 14 for visual inspection by the system user, or client, etc. The output also may be in the form of a printed communication or document using a printer such as a laser printer. It may be in the form of an automated document or data file or both, and it also may be in a form suitable for transmission, for example, over modem 20 or to a network, with or without simultaneous video conferencing and for transmission via the internet.

The particular format of client communication outputs will depend upon the specific circumstances, such as client demographics, plans and products offered, and marketing objectives of the particular application. Examples of client communications prepared using the preferred system and method and employing individual mortgage life insurance programs and using a procedure similar to that described above with respect to FIGS. 9-12 are attached as Appendix 1 and Appendix 2.

Figure 13:
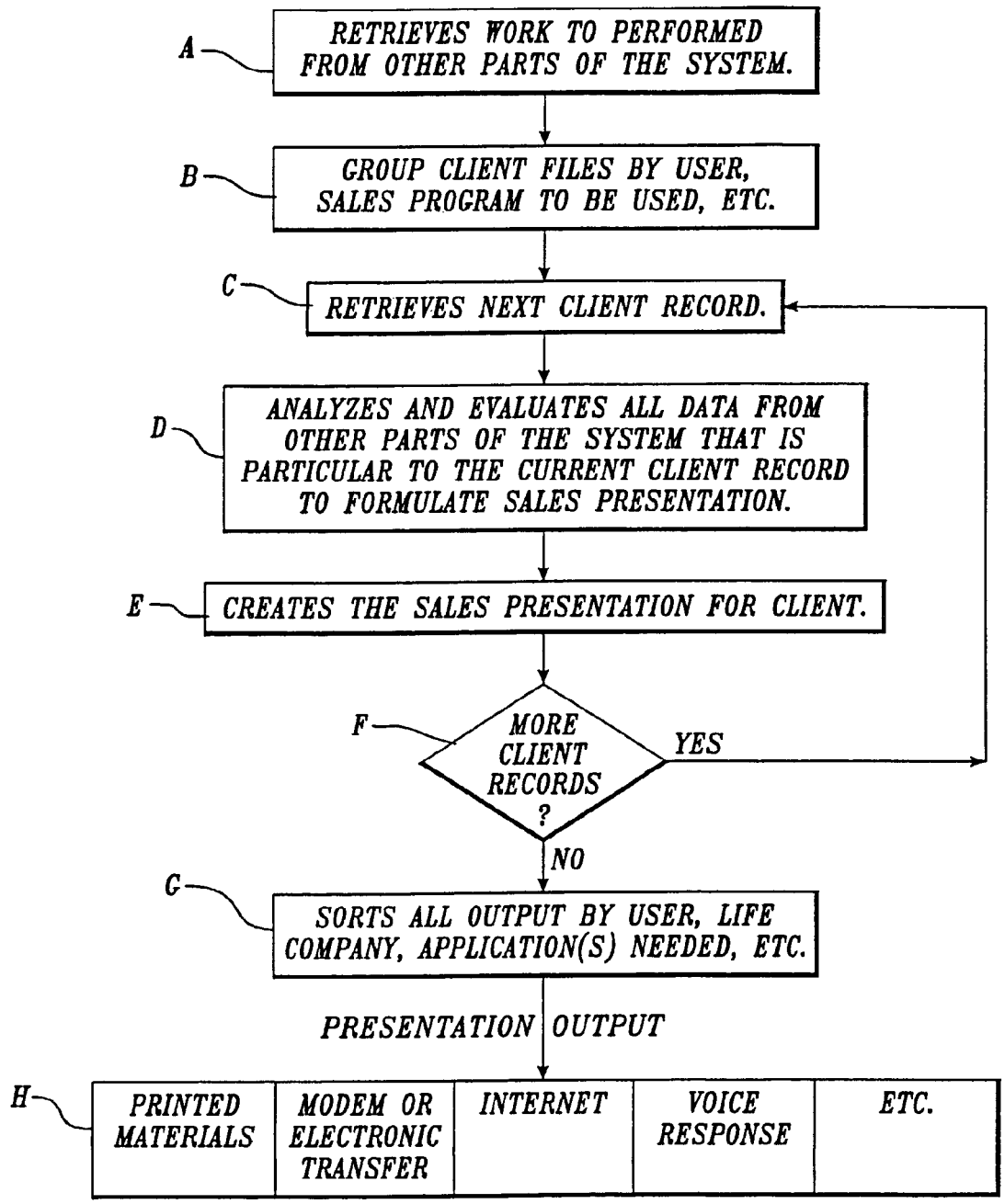
FIG. 13 is a flow chart diagram illustrating the organization and flow of the sales presentation and output module of the preferred embodiment and method as depicted in FIG. 2.

FIG. 13 presents an illustrative flow chart diagram of the logic flow of the output module for the preferred embodiment and the preferred method. In step A of FIG. 13, the output module retrieves work to be performed from other parts of the system. For example, after a set of client records has been processed with the processor module as described above, the output module would retrieve those files and store them in temporary memory locations so that a client communication, for example, can be prepared for each client record. As part of step A, the output module retrieves instructions which would be used in preparing the client communication or other communications output. The specific nature and content of these instructions will depend upon the specific type of client communication to be prepared and the specific format for the client communication. The specific examples to be presented below also provide a description and explanation of the types of the instructions used by the output module in preparing communications.

In step B of FIG. 13, client files are grouped by user, or by the sales program to be used, or by other criteria specified by the system user. Grouping criteria preferably would be selected by the system user during a setup phase, and would remain unchanged indefinitely until a different set of grouping criteria is desired.

The processing of a set of client records to generate and output a corresponding set of client communications primarily takes place between step C and F of FIG. 13. More specifically in step C the output module receives a client record for processing. In step D, the output module analyzes and evaluates the client information from the client record, the corresponding output from the processor module for that client record, and other data or information needed to construct the communication. Other forms of data or information which might be retrieved at this point could include geocoding data, demographic data, and the like.

In step E, the output module uses the instructions for preparation of the communication, together with the data and information from step D, to prepare the client communication. The specific manner in which the instructions and the information are used to construct the communication will vary depending upon the application, the specification of the system user and other factors. To better understand and appreciate this aspect of the invention, however, we will refer to the client communication attached hereto as Appendix 1, which is a sample communication presenting individual mortgage life insurance. Appendix 2 provides another very similar example, to which the description of Appendix 1 generally applies as well.

The sample format used for this client communication includes eight sections. Each section may or may not use information variables and insertion logic to construct the text or presentation of the section, and decisional logic (decision information) is employed to determine what if any states the variable is to assume. In other words, the instructions and/or decision logic may be employed in various places throughout a section and throughout the entire communication to adapt the communication to the particular circumstances of the client. The following discussion will provide more concrete examples of these features.

The output module may include any one or any combination of at least four types of logic or variables, including (1) customer information logic, (2) words/paragraphs/sentence ("text") logic, (3) product/plan/amount of coverage/payment mode/underwriting logic, and (4) pricing logic. "Logic" or "variable" as referred to herein may involve the placement of a particular word, number, phase, or item of information in a particular place within the communication. Insertion of such items within a blank space in a sentence would be an example. Client information logic refers to the place of the selective placement of client information in a particular location, blank space, or gap in a communication. "Text logic" refers to the insertion of Words, Paragraphs, Sentence etc. other than client information, product type and related information and pricing information, which is selectively placed in a specific location, blank space or gap in the communication. Products/Plans/Amount of Coverage/Payment Mode/Underwriting Logic ("product logic") refers to information pertaining to any of these topics, which is to be placed in particular location, blank space or gap in the communication. Pricing logic refers to pricing information which pertains to the product which is to be positioned in a particular location, blank space or gap (variable) in the document.

The purpose and function of each of the illustrative sections as created by the output module will now be outlined and discussed. It should be borne in mind that this sample client communication is merely an example, and that virtually an infinite number of alternative formats and designs is possible.

Section 1 describes the "need" for the proposed product and why the proposal or offer is being made to the client. In the individual mortgage life insurance application, the need is straightforward, i.e., to provide funds to pay the mortgage or liquidate it upon the death of the mortgagee so the family may retain ownership of the home without the burden of a mortgage. In the individual life insurance application, the need may be less apparent because there are so many individual uses of the product, a prime example of which is replacement of lost income.

In terms of variables, in this section, for example, the client name, address, the loan number and the loan amount constitute client information logic gleamed from the client record. The entry at the top of the letter at "Co-Mortgager" as well as the name of the company of the third paragraph of the letter constitute text logic. The mortgage loan amount in the fourth paragraph of the communication again constitutes client information logic.

Section 2 of the sample form client communication presents proposed solutions to the need. This usually involves identifying and presenting alternative plan(s) or financial product(s) to meet the need, and factors such as the provider, coverage and price particular to each plan and product. Referring again to Appendix 1, most of section 2 comprises product logic and pricing logic. The boxed portion in which the client may select the desired plan also includes product logic, for example, in that not all product proposals will include the same plans as has been demonstrated in the examples shown above. Much of the information presented in the footnote supplementing the product presentation involves text logic, but client information logic (e.g., personal information about the client), product logic, and pricing logic also appear in this footnote material. The footnotes both front and back are highly individualized throughout.

In the case of individual life insurance, the proposed plans may include various plans which include term insurance products, and permanent insurance plans such as whole life, universal life, variable life, and the like.

Section 3 of the sample communication format of Appendix 1 explains the various products selected by the processor module for presentation to the client in this presentation. This section may include text logic and product logic, for example, in that is may provide alternative descriptions, explanations, even different tone of writing depending on such things as the age of the client.

Section 4 of the sample communication format of Appendix 1 explains each plan utilized and selected by the processor module. This section typically would include text logic and product logic in that the description would change for the various products and classes of the various plans and products. The description of plans will vary with the plan selected. In addition, for a given plan the explanation may change to more particularly addressed a given client or class of clients. For example, the explanation provided to a client in the twenty (20) to forty (40) year old category may differ from the explanation from for the same product provided to a client in the sixty-five (65) to sixty-nine (69) year old range. Similarly, the explanation for a single male may differ for a given product from the explanation provided for the same products to a married couple.

Incidentally, the location of the various sections as described herein would not necessarily appear sequentially, e.g., section 1, 2, 3, .... The order may be changed or mixed, and information from one section may be intermingled or interposed with information from another section or sections. Sections and what is contained therein also may be subject to change frequently. The number of sections also may vary.

Section 5 of the sample communication format explains to the client if there are requirements to qualify for a particular plan presented, if any. These requirements will be listed in this section 5 (if the plan requires such based on among other things, amount of insurance, age, etc.) if it is necessary to qualify with more than just the standard application presented to the client. Much of the logic here centers around Plan/Product/Amount of Coverage/Underwriting Logic, etc., text logic, and client information logic.

Section 6 of the sample communication format explains in clear, concise and individualized terms how to obtain the coverage. This section typically will include customer logic in personalizing the presentation, e.g., by inserting the clients name in various places in the text, and product logic in explaining the requirements specific to a particular product(s).

Section 7 of the sample communication format presents, in question and answer format, for example, important information and commonly asked questions regarding the plans and products shown in the presentation. This section typically would include text logic, e.g., to refer to the system user or product marketer. It also may include client information logic, e.g., to refer to specific circumstances which the customer may encounter.

Section 8 of the sample communication format is variable in nature, and may be customized for a given application, product set, system user, etc. It may, for example, provide information on how to obtain additional information, help with application forms, additional price quotes, etc. Given its customized format it may include any of the logic forms as variables, as may essentially any other section.

Through designation by the system user in interaction with the system, the output module creates the format to be used, the specific information to be included within the format, and the specific locations in the output format where the specific items of information will be used. It also formats all sections to be easy to read and highly organized, no matter what amount of information is contained in the output.

The method according to the invention also may and preferably does include a step of automatically combining the client communication with the host vehicle to create a combined communication, wherein the combined communication comprises a single document, again using the term document in its broad sense. Where a plurality of client communications are to be prepared, this step includes automatically combining the client communication for each of the clients with the host vehicle for the corresponding and respective one of the clients to create a combined communication for the corresponding and respective one of the clients, wherein each of the combined communications comprises a single document.

In accordance with one method, all client communications sent to the client could be accompanied by an application for the financial product, together with an envelope or other means to facilitate return. For example, the client communication would be accompanied by a application for the products presented therein with a return envelope. This also could include electronic communication forms, such as by return e-mail, etc. This effectively results in a one-step sales process for any or all sales programs and products marketed by the system. In many instances, little or no human interaction or involvement is required in the marketing and purchasing process beyond the initiation of the system to provide the appropriate input information.

Turning now to the administrative and support system as illustrated in FIG. 2, the various modules of this system are intended to provide support functions for the Core System modules. In addition, they include management and administrative support modules to aid management in the system, including operation of the core system, scheduling of follow-ups, future communications, etc., with little or no need for human involvement.

The production and scheduling module automates scheduling of marketing sales, preparing budgets, and the like. A flow diagram outlining the logical organization and flow of the production and scheduling module according to the preferred embodiment and method is shown in FIG. 14.

Figure 14:
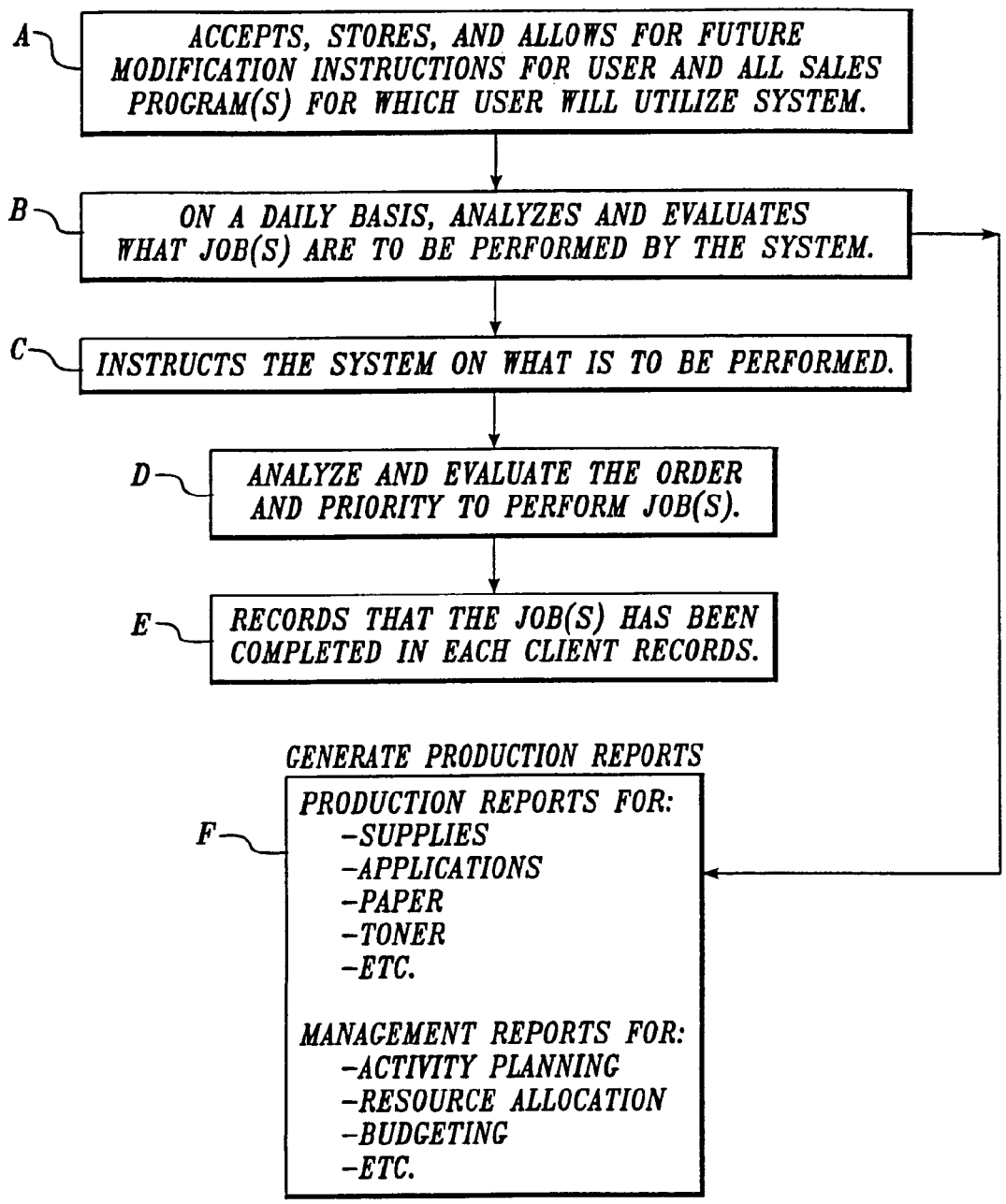
FIG. 14 is a flow chart diagram illustrating the organization and flow of the production and scheduling module of the preferred embodiment and method as depicted in FIG. 2.

In step A of FIG. 14, the production and scheduling module accepts, stores and allows for future modification instructions for system user(s), and for all sales programs for which the system user will utilize the system. Future add-on sales programs can be easily accepted.

As shown in step B of FIG. 14, the production and scheduling module analyzes and evaluates the jobs which are to be performed by the system. This is done on a daily basis. With this information as an input, the production and scheduling module schedules operation of the core system and instructs the system to operate accordingly, as indicated in step C. In the course of this scheduling and the instruction, the production and scheduling module operates according to a set of predetermined criteria to determine the ordering and scheduling of the system operation and job performance.

As jobs are completed, the production and scheduling module causes that fact and others to be recorded in each of the client records for which processing has been successfully completed. This is indicated in step E of FIG. 14.

As an administrative support role, the production and scheduling module is capable of generating hard copy, readable, production reports, e.g., on a daily basis, as indicated in step F. of FIG. 14. Production reports may be useful for system users and operators, for example, for allocating and providing sufficient supplies, paper, toner, etc. The system also is capable of generating management reports which can aid management in activity planning, resource allocation, budgeting, etc.

The production and scheduling module also is useful for automatically following up on pre-defined activities. A key attribute of the production and scheduling module is it's ability to remember a virtually unlimited number of users and user sales program(s) and implement a virtually unlimited number of instructions for the system to begin work at any point in the future.

The sales & financial report and analysis module ("sales and report module") assembles, calculates and outputs sales, test, financial and projected earnings reports. This can be done on a real-time basis with the preferred embodiment and method.

Figure 15:
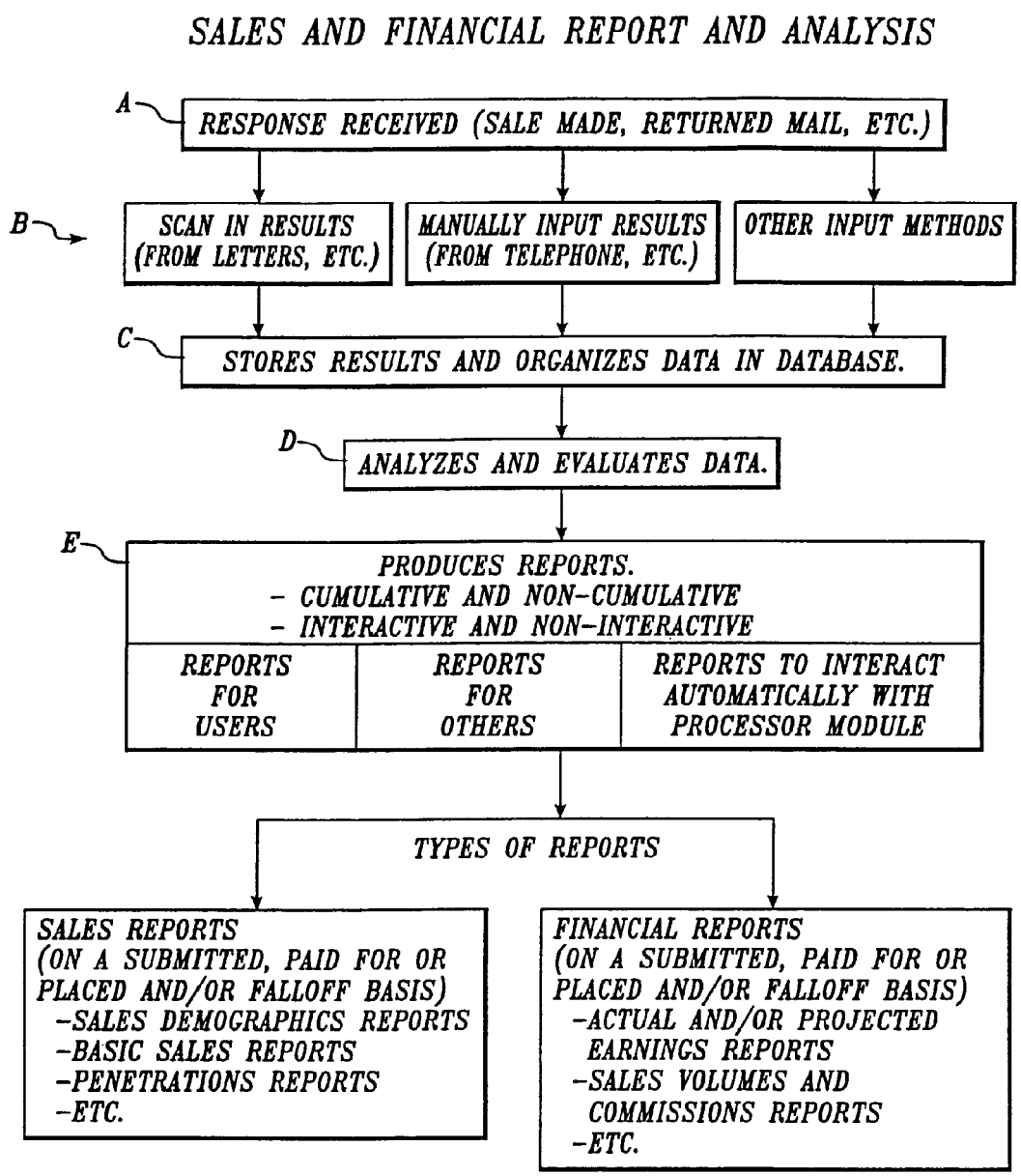
FIG. 15 is a flow chart diagram illustrating the organization and flow of the sales and financial report and analysis module of the preferred embodiment and method as depicted in FIG. 2.

A flow chart which illustrates the organization and flow of the sales and financial report and analysis module for the preferred embodiment and method is shown in FIG. 15. This particular example pertains to the marketing and sale of life insurance products. As shown in that illustrative diagram, step A involves receiving sales information based on sales of financial products actually made. In step B, these sales results are inputted into the system, manually, by scanning, or by other methods described above which regard to the data input module. In step C of FIG. 15, these results are stored and organized in a sales database resident in the database module.

The sales report module analyzes and evaluates this sales data, e.g., by segregating and compiling it in formats and statistical summaries useful in management.

Once calculated, compiled, etc., the data may be incorporated into and reported as sales reports, as reflected in step E of FIG. 15. These reports may be cumulative in nature or they may be non-cumulative, essentially reflecting snapshots in time. The reports also may be interactive or non-interactive, depending on the format selected, the output mode, etc. The reports may be provided to system users, management, etc. These reports also may be used in digital or automated form to interact automatically with other modules of the system, for example, the processor module.

The sales reports may compile such information as sales demographics, penetration, etc. They may reflect such statistics on several basics, such as sales submitted, the number of sales actually placed, as policies and the number of sales which resulted in falloff (for which no policy was issued or taken).

The sales module also is adapted to generate financial reports. These financial reports also may reflect sales on a submitted, placed, and or falloff basis. They may be incorporated with other data to reflect actual and/or projected earnings reports, commission reports, and the like.

Figure 16:
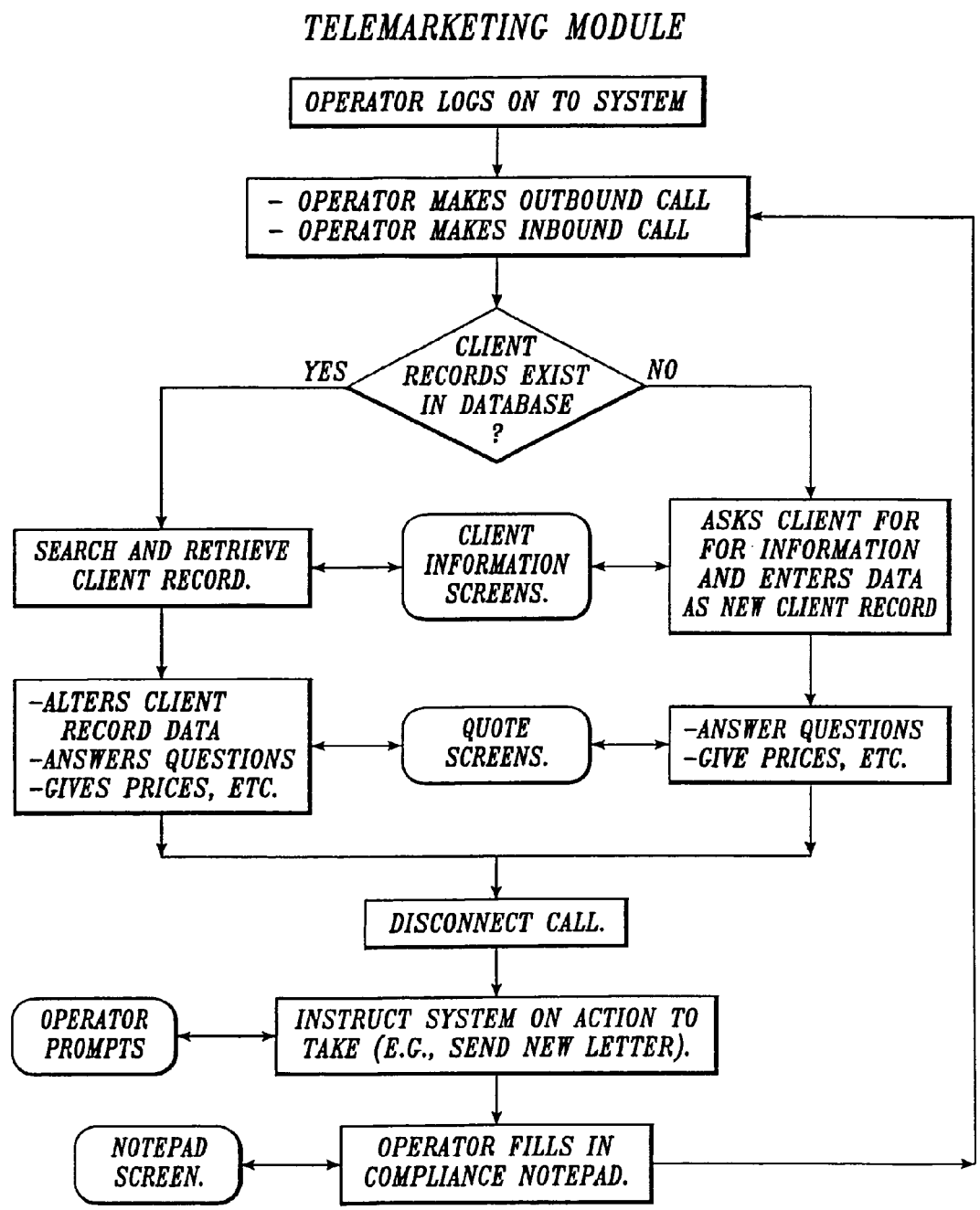
FIG. 16 is a flow chart diagram illustrating the organization and flow of the telemarketing module of the preferred embodiment and method as depicted in FIG. 2.

The system also supports a telemarketing function using the telemarketing module. An illustrative flow chart which outlines the organization and flow of the telemarketing module according to the preferred embodiment and method for the marketing of life insurance products is shown in FIG. 16. In accordance with that flow chart, the operator would log on to the system and thereby gain access to it. Communications between the operator and clients would take place, for example, through inbound or outbound calls. For existing clients for whom a client record exists in the client database, that record would be retrieved and edited appropriately. Where no client record exists, a new one would be created as reflected in FIG. 16. In both instances, information would be entered into the system so that the client record reflects the appropriate client information. When this task is complete, the call is disconnected. At this stage, the operator may instruct the system, e.g., to schedule an input the client record for processing in the core system to generate a client communication. To create a record of the communication the operator would complete the compliance note pad to reflect the conversation and the events which occurred during it.

The automated new business ("new business") module supports the processing for new business. The automated portion of this module supports the future policy holder service and insurance need of the client automatically. Flow chart reflecting the organization and logic of this module is shown in FIG. 17.

Figure 17:
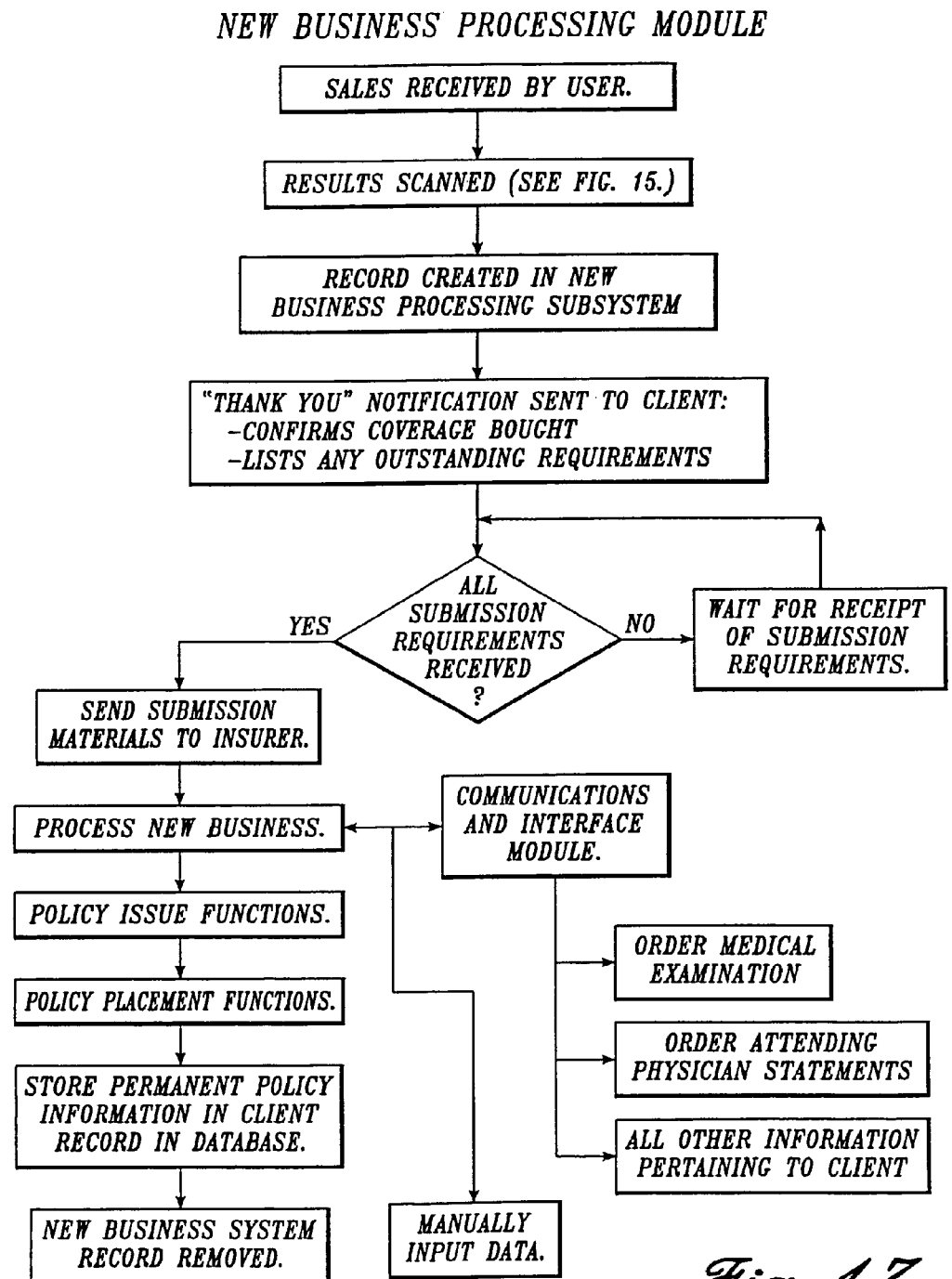
FIG. 17 is a flow chart diagram illustrating the organization and flow of the automated new business processing module of the preferred embodiment and method as depicted in FIG. 2, adapted for use in the marketing and sale of insurance products.

Referring to FIG. 17, as sales are made the sales information is received by the system user. The sale results are inputted, for example, by scanning, or by other input means, e.g., as disclosed in the discussion of the data input module. As new sales are made a corresponding client record is created in this module. The module automatically creates a "thank you" notification, which is particularized for that particular client. It confirms the products that have been purchased and the corresponding coverage. The automatically-generated communications also lists any outstanding requirements the client needs to execute to obtain product.

In addition to generating a confirming notice to the client, the system also manages the tasks, if any which correspond with sales and new business. As reflected in FIG. 17, such follow-up tasks may include sending submission materials to the product provider, processing the new business, e.g., from an accounting perspective, attending to function relating to issuance of an insurance policy, placement functions, etc. Client records and other system files are updated as appropriate to reflect the sales, the correspondence of the client, etc.

In performing these tasks, it may be necessary in some instances to undertake additional communications, which may implicate the communications and interface module. These communication may be required, for example to order medical examinations, to order attending physicians statements, and to obtain all other information pertaining to the client as required under the circumstances. This module will follow-up on these requirements automatically with no human intervention.

Having disclosed the information presented in our prior applications for patent, the following disclosure presents the present invention.

The Automatic Reply System Module

Figure 18:
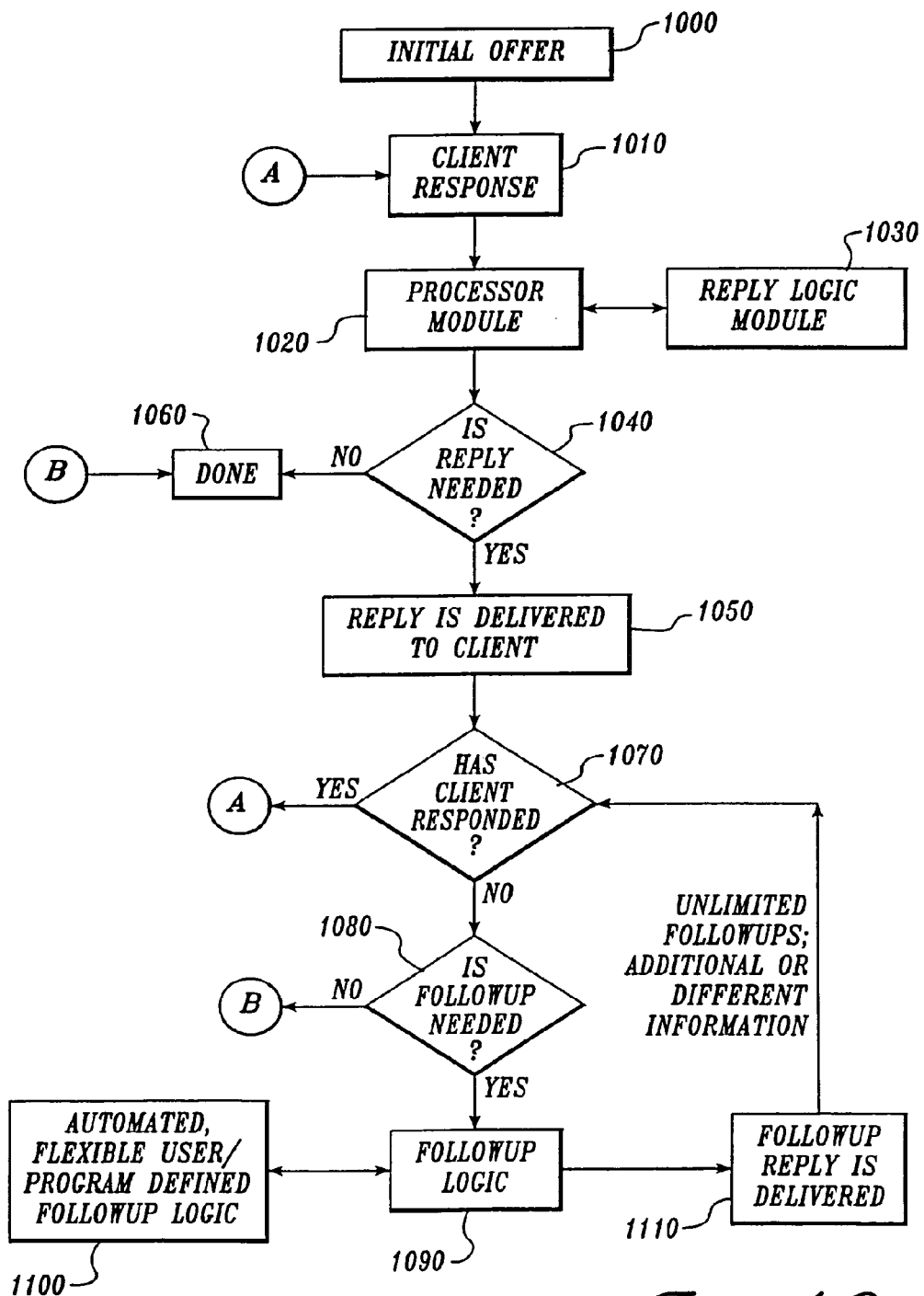
FIG. 18 is an illustrative embodiment of a flow chart of a reply system of the invention.

The invention provides a system that includes software that automatically generates a reply to responses received from clients responding to a mass communication. The invention may better be understood with reference to FIG. 18, a flow diagram illustrating a preferred embodiment of the invention. In this particular non-limiting illustrative embodiment, an initial mass communication is mailed to a plurality of clients (up to tens or hundreds of thousands, or even millions) in step 1000. The mass communication elicits client responses 1010, and these are (preferably electronically) read into a logic system 1020 through an appropriate input device. The logic system 1020 reviews the client response, analyzes the response 1030 and then determines whether a reply letter must be generated 1040. For example, if the client response relates to a solicitation for life insurance, in which several different options were presented, and the client requests further information on either one of the options, or requests an additional quotation, then the system logic 1020 and 1030 recognizes the client response. If the client requires an additional quotation, for example, an additional letter to the client will be needed. If no communication is needed, for example if the client has made a "purchase response", then the response is routed out of the system to step 1060 where the purchase is further processed and a "thank you" letter or additional follow up is generated, as needed. On the other hand, if it is determined from the response that the client requires additional information, an appropriate letter is generated addressing the specific client's requirements. This letter is then delivered to the client 1050, by any one of a variety of means, which could be specified by the client. It is important to note that the system processes responses and automatically (preferably electronically) generates a plurality (thousands, hundreds of thousands, or millions) of replies, each directed specifically to a response from a particular client.

Once the first reply has been delivered, it might be expected a client would further respond by either making a purchase, or continuing to make further inquiries. The system of the invention provides the advantage of permitting a continuing "conversation" with the client, by providing continuing follow-up replies to each response received from a client, until the client either makes a purchase, or fails to respond. In the latter instance, follow-up communications may be sent to determine why the client has ceased responding, and to encourage further communication until a purchase decision is made.

Referring back to FIG. 18, the system tests whether a client has responded to a prior delivered reply in 1070. If the client has responded, the client response is again input and analyzed as discussed above. If the client has not responded, a determination is made as to whether a follow-up is needed 1080. If a follow-up is not required, the communication with the particular client is terminated. On the other hand, if a follow-up is required, the communication is processed through follow-up logic 1090 which generates a follow-up letter that is delivered 1110 to the client by any one of a variety of appropriate means. Once the follow-up letter is delivered, the system retains information in memory, and tests at a later date whether the client has responded 1070. If there has been no response, the system determines whether a follow-up is needed 1080.

Figure 19:
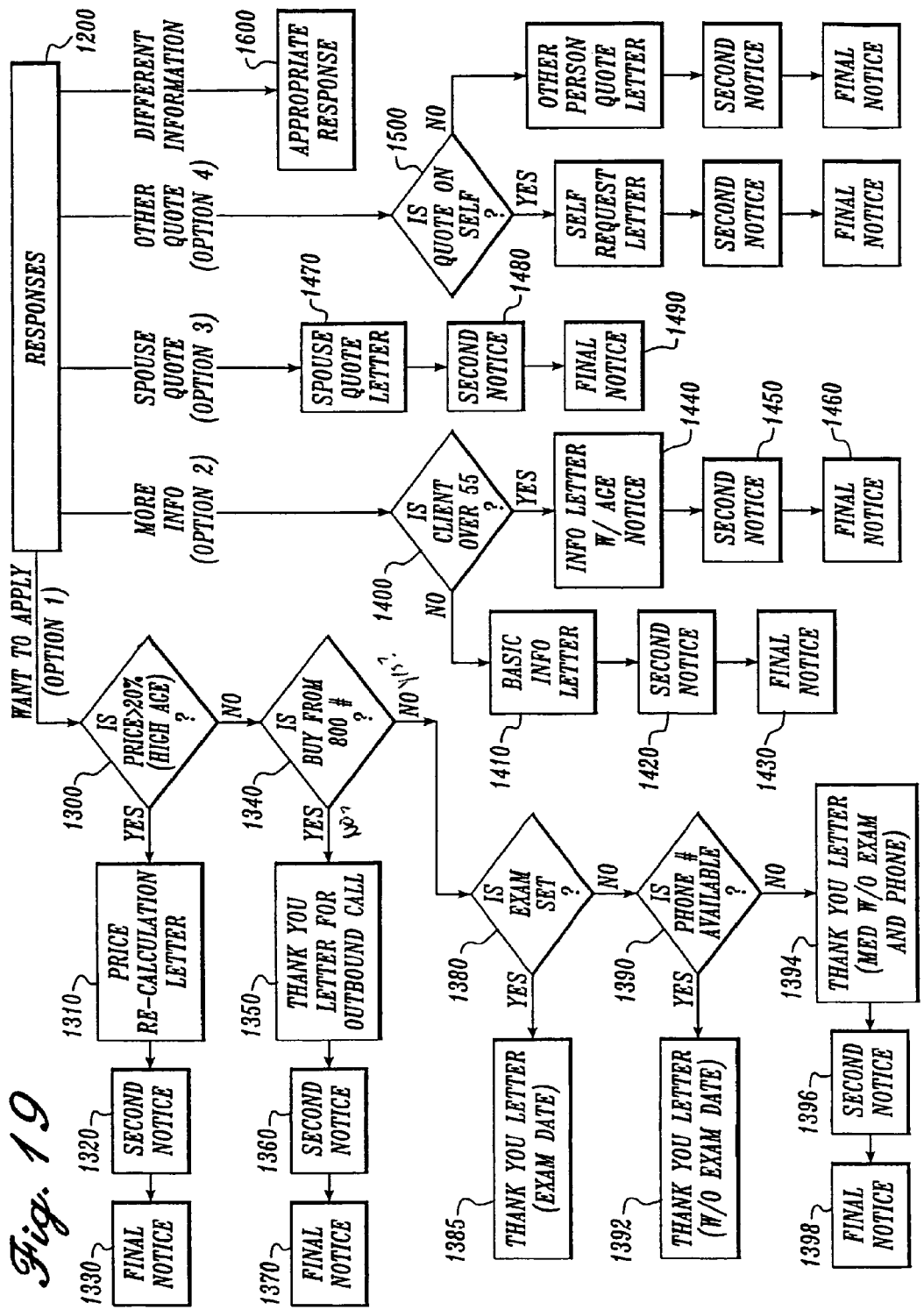
FIG. 19 is an illustrative example of an embodiment of a reply generation system of the invention relating to term life insurance marketing by mail.

FIG. 19 is a non-limiting illustrative example of a system of the invention for generating replies (in this example delivered by postal letter), using term life insurance as an example. As a preliminary matter, a mass communication will have been made to clients regarding term life insurance, whether through appending a communication regarding insurance to a host communication, or simply by delivery of a customized (or generic) term life insurance program (that may include several options suitable for the individual client) by any one of several appropriate delivery means. The original communication will have provided clients with several (or unlimited) options for response, for example, the range of responses may include "purchase (apply)", "need more information", "need more information on option x", "need additional quotation for (spouse, child, etc.)", and any other of a myriad of possible appropriate responses selected by the party initiating the mass communication (in this case the user, insurer, etc.).

The responses to the mass communication to the term life insurance solicitation are then input, preferably automatically, such as by electronic transmission or scanning, into the automated system of the invention. The embodiment illustrated in FIG. 19 shows discrimination between four types of standard responses, and also a handling mechanism for requests for "different information". Clearly, the system can readily be adapted for handling many more or fewer response options. Continuing with the example of FIG. 19, once the responses are sorted in step 1200 those responses relating to option 1 ("purchase option") are further analyzed to determine whether the client's age corresponds to the assumed age in the original communication 1300. If there is correspondence for actuarial purposes, a notification is sent to the client after further checking, as discussed below. If, on the other hand, there is an actuarial discrepancy between the originally assumed age of the client and actual age as disclosed in the response, the system prepares a "price recalculation letter" 1310, which is delivered to the client. Thereafter, at a predetermined interval, a "second notice" is generated 1320 and sent to the client. If a purchase response is not timely received, in order to capitalize on the client's desire for insurance coverage and to avoid loss of client interest. If there is no response to the second notice, then after a predetermined time a "final notice" is generated 1330 and sent to the client.

If, as discussed above, the client's age is an actuarial match to the originally assumed age, the system checks 1340 whether the client has indicated a desire to buy through a "1-800" number. If not, a "thank you letter" is generated 1350, followed-up after a preset time period by a second notice 1360 and thereafter a final notice 1370, as discussed above. On the other hand, if purchase is through the "1-800" number, the system checks whether a physical examination date has been set 1380. If so, a "thank you letter" specifying the exam date 1385 is sent to the client. If the date is not set, the system checks whether a phone number is available 1390. If a phone number is available, the client is telephoned and an examination date is confirmed. A "thank you letter" is then generated and sent to the client with the examination date. On the other hand, if a phone number is not available, a "thank you letter" is generated 1394 that does not specify the examination date and that requests a call back or response to set the examination date (i.e., indicating a need for communication to set an examination date). Thereafter, the system follows-up with a second notice 1396 and, if necessary, a final notice 1398 at predetermined intervals as follow-up to encourage and facilitate the client's desire to continue the application process for term life insurance coverage.

If the system determines in block 1200 that the client response requests "more information", the response may be directed to a first system check for client "test age" 1400, in the case of term life insurance. Thus, if a client is less than 55 years old, the system will generate a basic information letter 1410, and will retain in memory a time to check for response to that basic information letter. If a response is not received within a predetermined time, a second notice 1420 is sent out, which may be followed-up by a final notice, if necessary and appropriate. On the other hand, if the client is over the "test age", a different information letter is generated by the system 1440. That information letter takes into account actuarial factors relating to the client age, as well as other pertinent information supplied or otherwise available. As indicated before, a virtually unlimited number of replies can be sent (based on most demographics) and based on the (almost unlimited) response options. This information letter may also be followed-up by a second notice 1450 at a preselected interval, if no response is received for the information letter. A further final notice 1460 may be generated by the system when there is no response to the second notice letter after a predetermined interval.

When the system determines that the client has selected an alternative response, one that, for example, requests an insurance quotation for a spouse, information regarding the spouse is automatically input into the system, and a "spouse quote letter" is generated 1470. As with other letters requiring responses from the client, follow-up letters are generated at predetermined intervals, a "second notice" 1480, followed up by a "final notice" 1490 if necessary and appropriate.

In the event that the client has selected another option, requiring for example further quotations "for insurance on him/herself" or someone else this is determined automatically in the system 1500. In response, a "self requote" letter is sent, appropriately followed-up by a second notice 1520 and final notice 1530, as discussed above. On the other hand, if the quote is not for the client him/herself, the system reviews data supplied for the other person for whom the insurance quote is required, and generates a "other person letter" 1540. This is appropriately followed-up with a second notice and final notice letter, as discussed above.

The system may also include the flexibility to handle the responses that require additional information, other than standard option responses provided in the original communication, or in any subsequent reply communication to the client. This request for "different information" is segregated and an appropriate reply is prepared 1600. For example, the client response may be to call in and a reply would be generated when or shortly after the call is answered, either by a person, or by voice recognition and response technology.

Figure 20:
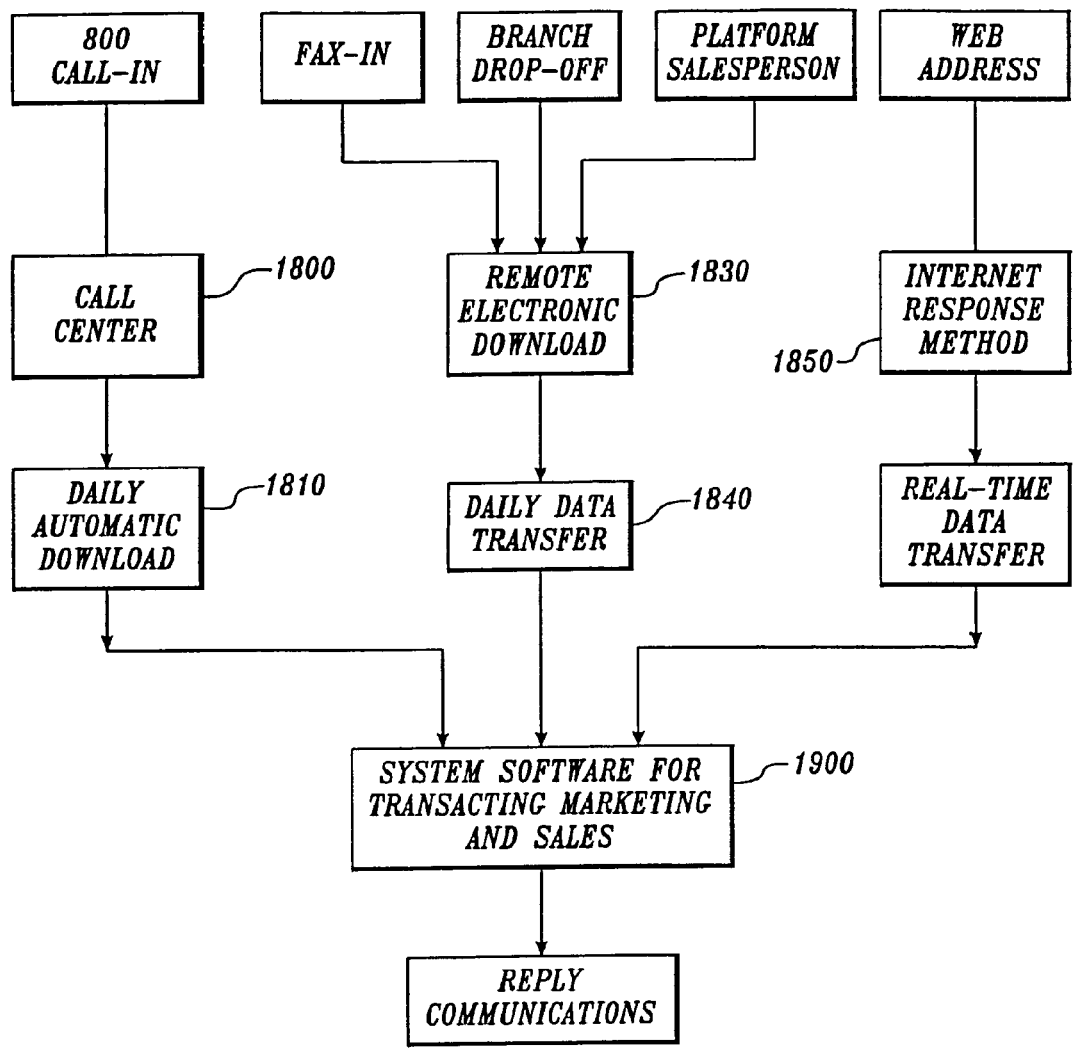
FIG. 20 is an illustrative schematic showing some of the types of input into the system software of the invention and the reply generation system.

The above example of an embodiment of the invention as applied to term life insurance presumes that responses are received from clients to an initial mass communication to a plurality of clients. As illustrated in FIG. 20, there are numerous ways in which clients might be able to respond. The illustration is non-limiting, and shows some of the more common methods for client response, and client response handling that would be appropriate. In the example delivery is by mail. Other methods of response may become more significant as communications technologies evolve.

In response to, for example, a term life insurance offer, clients may individually call in to a call center 800 number where response information is recorded and periodically, for example daily, downloaded 1810 into the automatic reply system 1900 of the invention for generation of reply letters. Otherwise, clients may send their response by fax, "drop off" responses at a branch office, or communicate with platform sales person. These responses may be analyzed, and information retrieved at a plurality of remote branch offices 1830. Appropriate formatted information for each individual client may then be transferred (electronically) en mass, or individually, at preselected intervals (or continuously) 1840 to the reply generation system 1980. In certain instances, it may be preferable to transfer data to the reply generation system 1900 on a daily basis, while in other circumstances more or less frequent transfer may be more appropriate.

As more clients become connected to the internet, client responses using the internet are expected to become increasingly significant. Responses through the internet may also be accumulated with the data transferred at intervals to the reply generation system of the invention. In the illustration of FIG. 20, the internet response 1850 is transferred in real time to the system 1900 which automatically generates an appropriate reply that responds to the client response, preferably also delivered through the internet to the client. Accordingly, the internet related system potentially provides the fastest response, and may be expected to enhance the conversion of solicitations of insurance (or other product) to sales.

Figure 21:
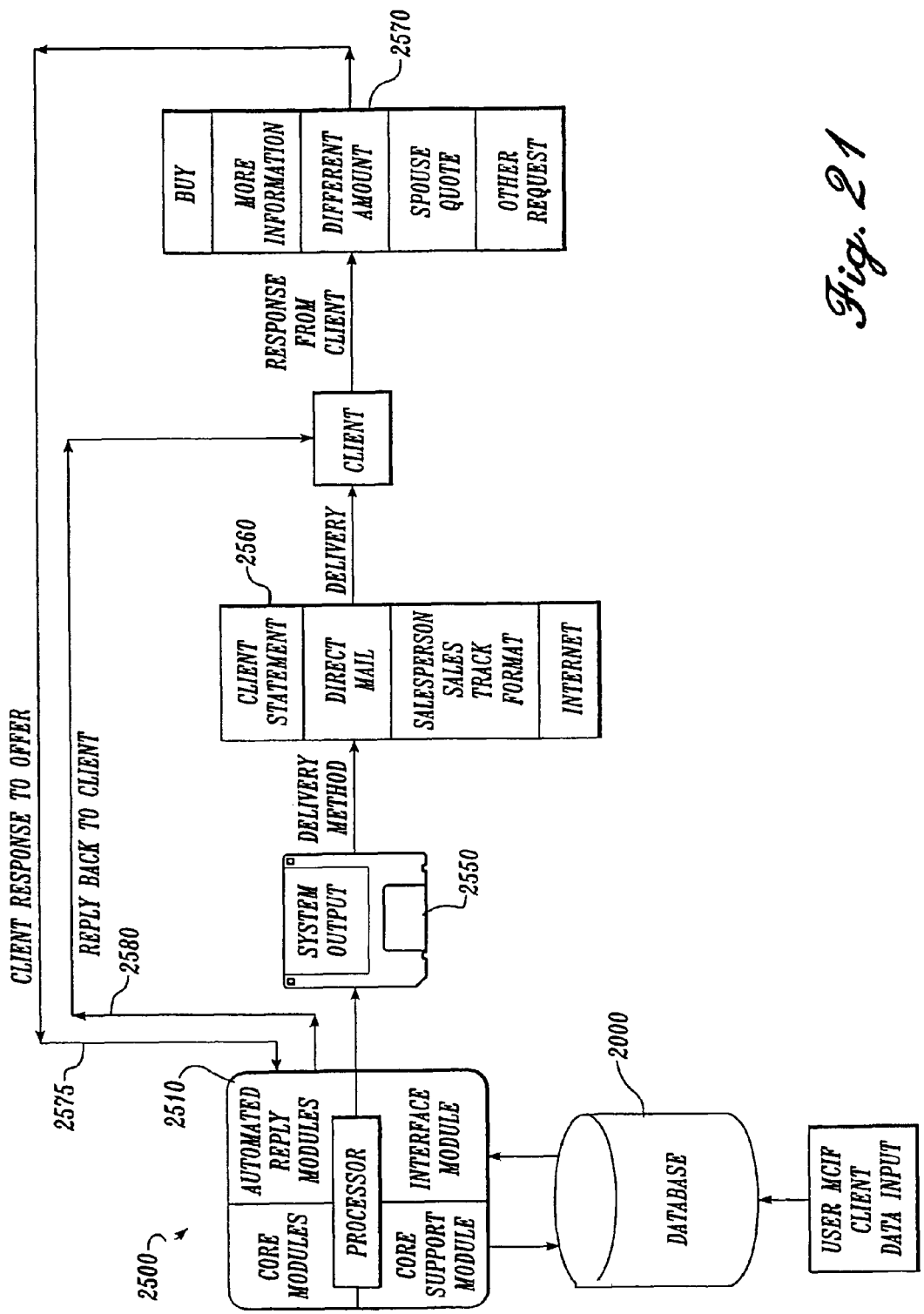
FIG. 21 is a simplified overview of an embodiment of the invention showing important features of the system software and reply generation module.

A summary and overview of an embodiment of the system of the invention is shown in FIG. 21, this overview and summary is for illustrative purposes only, and clearly does not limit the scope of the invention which may include many additional and different aspects, depending upon the application to which the system is adapted.

As shown, the system software 2500 accesses a database 2000 that contains relevant information regarding clients, that may be maintained by a bank, insurance company, retail institution or any other entity that has a large client database. As a preliminary matter, the system of the invention accesses the database and prepares individualized client communications to each of the multitude of clients (or subset of the multitude of clients) in the database. The system software 2500 generates an output 2550 that may be delivered to each individual client by any one of several methods 2560. In the example shown, communication may be sent to a client on a monthly statement, by direct mail, through platform sales tract format, or through the internet. The communication includes response options 2570, and the client response indicating a selected option, of which several non-limiting examples are shown in FIG. 21. The client response 2575 is input into the system of the invention, and the reply module 2510 of the system software 2500 generates a reply 2580 for each response, out of the multitude of responses. The reply is preferably sent directly to the client through an indicated delivery method, which may include direct mail, facsimile, internet, voice telephony, and the like. The reply may generate further client responses, so that an ongoing "conversation" is set up between the client and the automated reply module 2510 of the system of the invention. This conversation continues, as explained above, until it is terminated by either a client "purchase decision", or lack of client response to a communication from the system.

The system of the invention provides, for the first time, a technology that allows mass communication of product or service information customized to each individual in mass communications. Further, the system also provides for flexibility of responses from the clients, by permitting clients to select from a plurality of options and requests for further information, each of which may be automatically analyzed and replied to through the system of the invention. The automated reply feature potentially enhances the number of purchase decisions that might result from an original mass communication, by responding to individual client queries in an economical, efficient and fast manner to retain the client's purchase interest and facilitate sales.

Additional advantages and modifications will readily occur to those skilled in the art. Therefore, the invention in its broader aspects is not limited to the specific details, representative devices, and illustrative examples shown and described. Accordingly, departures may be made from such details without departing from the spirit or scope of the general inventive concept as defined by the appended claims and their equivalents.

What is claimed is:

1. A method of using a computing system for automatically outputting one or more client communications presenting an offer relating to one or more financial products or services specific to one or more clients, the method comprising the steps of:
   receiving incoming data at an interface, the data pertinent to offers relating to one or more financial products or service for a plurality of distinct clients;
   using a processor associated with the interface to obtain variable data from the incoming data specific to a particular client based on decision information selected from the group of information particular to the offers, client information, financial product information, and ancillary information;
   inserting, by the processor, the variable data specific to the client into at least one client communication generated for the particular client; and
   automatically outputting through an output module associated with the processor a single communication for the particular client comprising a host vehicle and the client communication, the host vehicle containing host information for the particular client.

2. The method of claim 1, wherein the client communication comprises an offer portion, a product/service information portion and a fulfillment portion, wherein the product/service information portion comprises data pertaining to the financial product or service enabling the client to make an informed decision regarding the financial product or service, and wherein the fulfillment portion enables the client to obtain the financial product or service, or informs the client on how to obtain the financial product or service, or informs the client on how to obtain information relating to the financial product or service.

3. The method of claim 2, wherein any one or more of the offer portion, the product/service information portion and the fulfillment portion include the variable data.

4. The method as recited in claim 1, further comprising the step of:
   using an output preparing means to receive the single communication and prepare an electronic form of the single communication.

5. The method as recited in claim 4, wherein the output preparing means comprises a remote computing system.

6. The method of claim 1, wherein the using, inserting, and outputting steps are repeated for the plurality of distinct clients to successively output single communications, wherein the successively generated client communications contain different variable data specific to each of the plurality of distinct clients.

7. The method of claim 1, wherein the using step and the generating step are performed within a single automated process.

8. The method of claim 1, wherein the using step further comprises the step of:
   calculating certain variable data specific to a particular client from any of the incoming data.

9. The method of claim 1, wherein the outputting step further comprises:
   automatically adjusting a format of the single client communication depending on information specific to the particular client, the information selected from the group of information particular to the offers, client information, financial product information, and ancillary information.

10. The method of claim 1, wherein the offering on one or more financial products or services specific to one or more clients relates to a primary communication contained in the host vehicle.

11. The method of claim 1, wherein a particular one of the products or services offered relates to products or services referred to or contained in a primary communication transmitted via the host vehicle.

12. The method of claim 1, wherein the interface receives incoming host information specific to the plurality of distinct clients.

13. A system for outputting communications containing offerings relating to one or more financial services specific to one or more clients, the system comprising:
   an interface coupled to a computing system configured to receive data pertinent to offers relating to one or more financial products or service for a plurality of distinct clients;
   a memory containing decision information selected from the group of information particular to the offers, client information, financial product information, and ancillary information;
   a processor coupled to the interface and the memory, the processor programmed to:
      obtain variable data from the interface specific to a particular client based on decision information obtained from the memory;
      insert the variable data into at least one client communication generated for the particular client; and
   an output module coupled to the processor configured to automatically output a single communication for the particular client comprising a host vehicle and the at least one client communication, the host vehicle containing host information for the particular client.

14. The system of claim 13, further comprising an output preparing means to receive the single communication and prepare an electronic form of the single communication.

15. The system of claim 14, wherein the output preparing means is remote to the computing system.

16. The system of claim 13, wherein the output preparing means is coupled to the processor.

17. The system of claim 13, further comprising a second memory configured for access by the computer, the second memory containing the host information for the plurality of distinct clients.

18. The system of claim 17, wherein the second memory is remote to the computing system.

19. The system of claim 13, further comprising a third memory configured for access by the computing system, the third memory containing the data pertinent to offers relating to one or more financial products or service for a plurality of distinct clients.

20. The system of claim 19, wherein the third memory is remote to the computing system.

* * * * *